US012630129B2

(12) United States Patent     (10) Patent No.:   US 12,630,129 B2

Putz et al.        (45) Date of Patent:    May 19, 2026

(54) METHOD FOR BRAKING A VEHICLE

(71) Applicant: STOP-IN-TIME GMBH, Bad Waltersdorf (AT)

(72) Inventors: Michael Putz, Sebersdorf (AT); Thomas Zipper, Vienna (AT)

(73) Assignee: Remmen Technologies, Port Perry (CA)

( * ) Notice: Subject to any disclaimer, the term of this patent is extended or adjusted under 35 U.S.C. 154(b) by 92 days.

(21) Appl. No.: 18/691,533

(22) PCT Filed: Jul. 14, 2022

(86) PCT No.: PCT/AT2022/060249

§ 371 (c)(1),
(2) Date: Mar. 13, 2024

(87) PCT Pub. No.: WO2023/283667

PCT Pub. Date: Jan. 19, 2023

(65) Prior Publication Data

US 2024/0326761 A1     Oct. 3, 2024

(30) Foreign Application Priority Data

Jul. 14, 2021   (AT) ............................... A 60192/2021
Jan. 17, 2022   (AT) ............................... A 60012/2022

(51) Int. Cl.
B60T 7/20       (2006.01)
B60T 8/171      (2006.01)
(Continued)

(52) U.S. Cl.
CPC .............. B60T 8/172 (2013.01); B60T 8/171 (2013.01); B60T 13/586 (2013.01); B60T 2270/604 (2013.01)

(58) Field of Classification Search
CPC .......... B60T 7/206; B60T 8/171; B60T 8/172; B60T 8/1887; B60T 8/323; B60T 8/72;
(Continued)

(56) References Cited

U.S. PATENT DOCUMENTS 5,141,292 A  *   8/1992   Gardell ................... B60T 13/66
                                      303/9.69
11,485,330 B1 *   11/2022   Kulkarni .................. B60D 1/62
(Continued)

FOREIGN PATENT DOCUMENTS

DE        10341677 A1    3/2004
EP         2570312 A1    3/2013
JP       H1044976 A    2/1998

*Primary Examiner* — Erick R Solis
(74) *Attorney, Agent, or Firm* — Miller Canfield

(57) ABSTRACT

The invention relates to a method for braking a vehicle, a brake control device and a vehicle, wherein the vehicle has at least one wheel, a first braking device, a braking-detection device and a brake control device, wherein the detected braking instance is converted into a braking-detection signal by the braking-detection device, wherein a brake actuation signal is generated by the brake control device on the basis of the braking-detection signal, and wherein the brake actuation signal is transmitted to the first braking device by the brake control device to control the first braking device, thereby controlling the first braking device.

14 Claims, 9 Drawing Sheets

(51) Int. Cl.
   *B60T 8/172*       (2006.01)
   *B60T 13/58*       (2006.01)

(58) Field of Classification Search
   CPC . B60T 8/74; B60T 8/76; B60T 13/586; B60T
                  13/746; B60T 13/748; B60T 2270/60;
                                B60T 2270/604
   USPC ........................................................ 701/70
   See application file for complete search history.

(56)                    References Cited

U.S. PATENT DOCUMENTS

| | | | |
|---|---|---|---|
| 2011/0010048 | A1 | 1/2011 | Messih et al. |
| 2018/0265064 | A1* | 9/2018 | Morandi ................. B60T 1/065 |
| 2020/0156602 | A1 | 5/2020 | Wiehen |
| 2022/0379853 | A1* | 12/2022 | Goodarzi .............. B60T 13/662 |
| 2023/0211763 | A1* | 7/2023 | Drewes ................... F16D 61/00 |
| | | | 280/400 |
| 2023/0219545 | A1* | 7/2023 | Pietila .................... B60T 8/172 |
| | | | 701/93 |
| 2024/0017623 | A1* | 1/2024 | Stenbratt ................. B60T 8/172 |
| 2024/0116479 | A1* | 4/2024 | Nguyen ................... B60L 7/18 |
| 2024/0198987 | A1* | 6/2024 | Jiajun ................ B60L 15/009 |

* cited by examiner

Fig.5
Fig.6
Fig.7
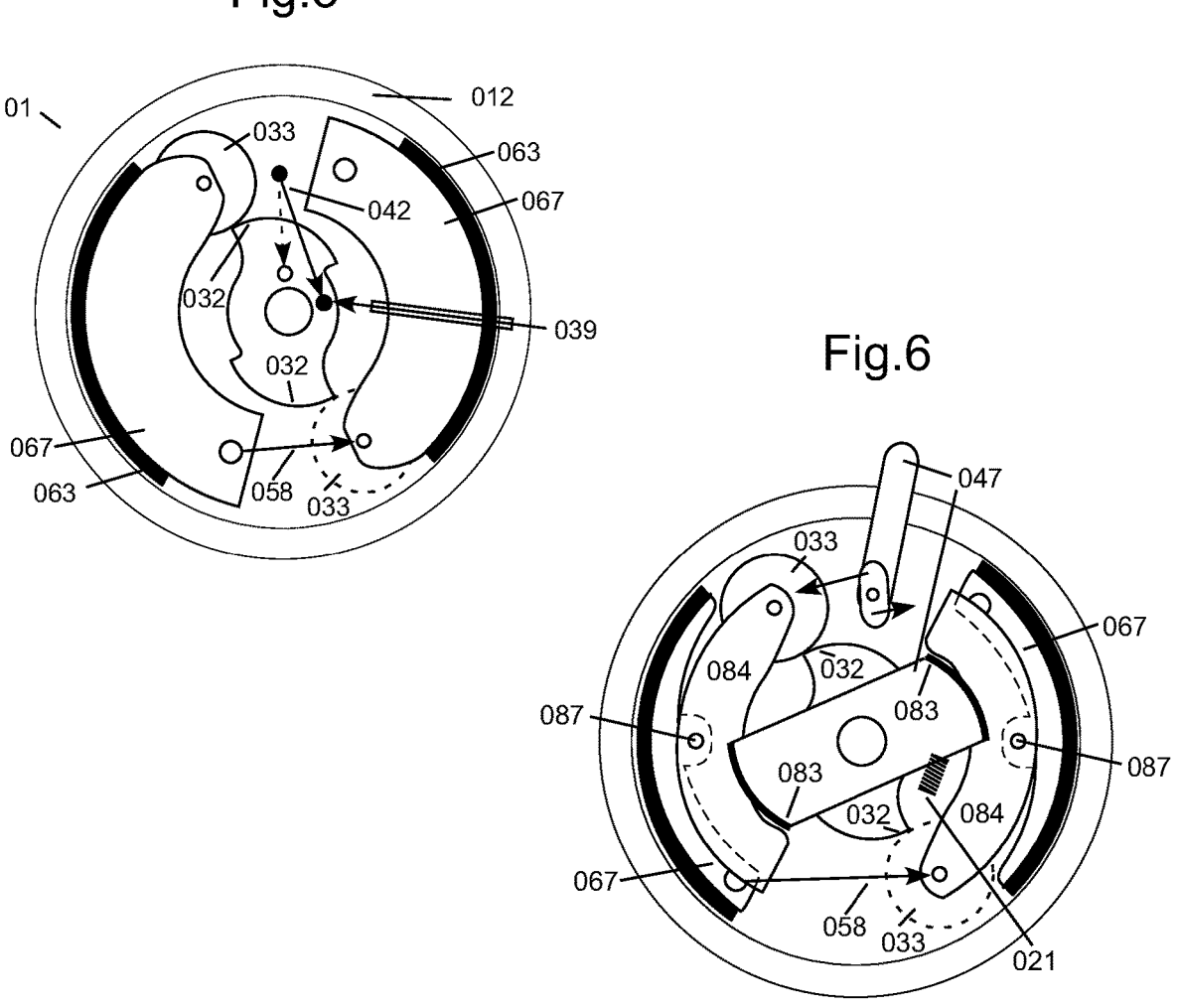
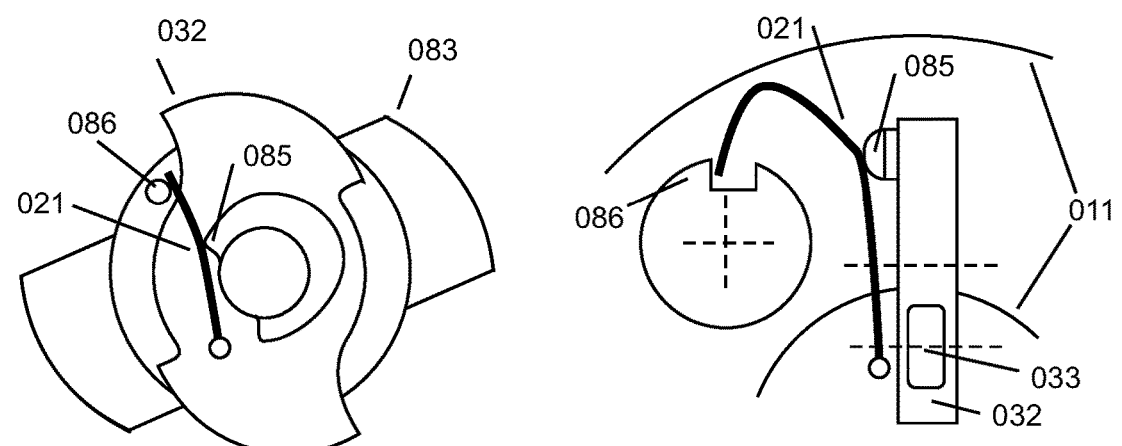

METHOD FOR BRAKING A VEHICLE

CROSS-REFERENCE TO RELATED APPLICATIONS

The subject patent application is the National Stage of International Patent Application No PCT/AT2022/060249, filed on Jul. 14, 2022, which claims priority to, and all the benefits of, Austrian Patent Application No A60012/2022, filed on Jan. 17, 2022, and Austrian Patent Application No A60192/2021, filed on Jul. 14, 2021, the entire contents of which are incorporated by reference herein.

BACKGROUND

Different methods for braking a vehicle are known from the prior art. For example, methods are known in which the braking device of the trailer is controlled, in particular actuated, by an overrun brake. The disadvantage of this method, however, is that such a control only actuates, in particular tightens, the braking device of the trailer when the towed object, in particular the trailer, runs aground. The trailer can therefore not generate any traction with such a method. This reduces the achievable braking effect and vehicle stability.

For example, methods are known in which brake actuation signals are transmitted from the control device of the towing vehicle to the braking device of the trailer. In such methods, the braking devices of the vehicle are controlled, in particular actuated, by the control device of the towing vehicle. A disadvantage of such a method, however, is that the braking devices cannot be controlled, in particular cannot be actuated, if the connection between the towing vehicle and the trailer is interrupted, in particular if the connection is broken off. The object of the invention is to overcome the disadvantages of the prior art. In particular, the object of the invention is to create a method, a brake control device and a vehicle with which the respective brake devices can be controlled in a predictive and/or adapted manner.

SUMMARY

The invention relates to a method, a brake control device, and a vehicle according to the preambles of the independent patent claims.

The object according to the invention is achieved in particular by the features of the independent patent claims.

The invention relates in particular to a method for braking a vehicle, in particular a towing vehicle and/or a trailer.

It is preferably provided that the vehicle has at least one wheel, a first braking device for braking the at least one wheel, in particular a non-linear electromechanical friction brake, a brake detection device for detecting braking of the vehicle, in particular for detecting a braking request and/or for detecting a deceleration of the vehicle, and/or a brake control device, in particular an electronic brake control device, for controlling the first brake device.

Provision is preferably made for the brake detection device to be formed from a speed measuring device, in particular for calculating a deceleration from the changing instantaneous speed of the vehicle, preferably from a wheel speed sensor for measuring the speed of the at least one wheel.

If necessary, the brake detection device can include a speed measuring device, in particular a wheel speed sensor.

It is preferably provided that the brake detection device is formed from a deceleration sensor for measuring a deceleration, in particular for measuring a deceleration effect in at least one direction, preferably in the direction of travel, preferably from a multi-axis, micro-electromechanical system. Optionally, the brake detection device may include a deceleration sensor.

Provision is preferably made for the brake detection device to be formed from an actuation measuring device for measuring actuation of an actuating device, in particular the braking device, for braking the vehicle, in particular the first braking device, preferably a brake lever or a brake pedal of the vehicle.

Optionally, the brake detection device may include an actuation sensing device.

The actuation measuring device can be set up to measure the extent of actuation of the actuation device. In particular, a braking request and/or the driver's deceleration request can be determined as a result.

Provision is preferably made for the brake detection device to convert the detected braking action, in particular the detected braking request and/or the detected deceleration, into a brake detection signal, in particular an electrical signal.

Provision is preferably made for the brake detection signal to be transmitted to the brake control device.

In particular, the brake control device can be connected to the devices of the vehicle, in particular to the sensors, preferably the brake detection device, the first brake device, the second brake device, the further brake detection device, the wheel speed sensor, the vibration sensor, the angle sensor, the position sensor, the locking sensor, the location sensor and/or the pedal vibration sensor, via a connection device, in particular wired or wireless. The signals, in particular the brake detection signal, the brake actuation signal, the additional brake detection signal, the wheel speed sensor signal, the deceleration sensor signal, the vibration sensor signal, the angle sensor signal, the position sensor signal, the locking signal and/or the pedaling vibration sensor signal can optionally be transmitted via a connection device, in particular via a cable connection or wirelessly.

The connection device can optionally connect the brake control device to the other components of the vehicle.

It is preferably provided that a brake actuation signal is generated by the brake control device on the basis of the brake detection signal.

Provision is preferably made for the brake control device to generate a brake actuation signal based on the brake detection signal, in that the brake control device may generate a brake actuation signal based on the brake detection signal using interpolation tables, using conversion functions, using a simulation model and/or using simulation models to actuate the first Braking device is determined and/or calculated.

If necessary, the brake actuation signal for activating the at least one first brake device can be determined using interpolation tables, using conversion functions and/or using a simulation model on the basis of the brake detection signal.

Provision is preferably made for the brake control device to transmit the brake actuation signal to the first brake device in order to control the first brake device.

It is preferably provided that the brake actuation signal, in particular transmitted to the brake device, effects a control, in particular an actuation, preferably an application and/or release, of the first brake device, in particular an actuator of the first brake device, and thereby in particular in braking of the at least one wheel, in particular braking or acceleration of the vehicle, is achieved.

Optionally, the brake control device may consist of one or more components or may include one or more components.

In the context of the present invention, the signals from the sensors, in particular all signals from all sensors, in particular the brake detection signal, the deceleration sensor signal, the vibration sensor signal, the angle sensor signal, the position sensor signal, the pedal vibration sensor signal, the blocking signal and/or the impact force signal can be transmitted directly to the brake control device, in particular by cable or wirelessly Within the scope of the present invention, signals from the sensors, in particular all signals from all sensors, in particular the brake detection signal, the deceleration sensor signal, the vibration sensor signal, the angle sensor signal, the position sensor signal, the pedal vibration sensor signal, the locking signal and/or the impact force signal can be understood as the electrical output signal of the respective sensor.

In the context of the present invention, measurement can also be understood to mean the determination of a certain variable, such as in particular the rotational speed, the deceleration, the actuation and/or the temperature.

If necessary, the brake detection device can also be contained and/or integrated in the brake control device.

In the context of the present invention, a brake detection device can be understood to mean a device which is set up to recognize and/or detect the braking of the vehicle, the deceleration of the vehicle, the driver's braking request and/or the braking request of an autopilot. If necessary, the method can be set up to control a braking device, in particular to control the brakes.

If necessary, the method can be set up for braking a vehicle combination and/or combination, in particular for braking a combination vehicle which includes a land vehicle that is not self-propelled, in particular a trailer, and a pretensioned traction element, in particular a towing vehicle.

If necessary, the brake actuation signal transmitted to the first brake device can be used to control, in particular actuate, the first brake device in such a way that, if necessary, during operation, in particular during normal operation, of the combination and/or while the combination is driving, the trailer brakes the towing vehicle and/or that the trailer decelerates more than the towing vehicle, so that the trailer may pull on the towing vehicle.

In particular, the brake control device generates a brake actuation signal, which controls, in particular actuates, the first braking device in such a way that, if necessary, during operation, in particular during normal operation, of the combination and/or while the combination is driving, the trailer brakes the towing vehicle and/or that the trailer decelerates more than the towing vehicle, so that the trailer may pull on the towing vehicle.

In particular, the at least one first braking device can be arranged on the trailer.

If necessary, a further braking device can be arranged on the towing vehicle. In particular, this further braking device can be controlled and/or regulated by the brake control device, a further brake control device and/or the vehicle control device.

If necessary, the brake actuation signal transmitted to the first brake device can be used to control, in particular actuate, the first brake device in such a way that, if necessary during operation, in particular during the Normal operation of the vehicle and/or while the vehicle is driving, the rear part of the vehicle brakes the front part of the vehicle and/or that the rear part of the vehicle decelerates more than the towing vehicle, so that the rear part of the vehicle may pull on the front part of the vehicle.

In particular, a brake actuation signal is generated by the brake control device, which controls, in particular actuates, the first braking device in such a way that, if necessary during operation, in particular during normal operation, of the vehicle and/or while the vehicle is driving, the rear part of the vehicle brakes the front part of the vehicle and/or or that the rear part of the vehicle decelerates more than the towing vehicle, so that the rear part of the vehicle may be pulling on the front part of the vehicle.

In particular, the at least one first braking device can be arranged on the rear vehicle part of the vehicle.

If necessary, a further braking device can be arranged on the front vehicle part of the vehicle. In particular, this further braking device can be controlled and/or regulated by the brake control device, a further brake control device and/or the vehicle control device.

In the context of the present invention, normal operation can be understood to mean operation of the vehicle, in particular the vehicle combination, in which the vehicle, in particular the vehicle combination, is operated and/or travels on a road.

If necessary, it can be provided that an actuating device for actuating a braking device, in particular the first braking device, preferably a brake lever or a brake pedal, can be arranged on the vehicle, in particular on the towing vehicle.

If necessary, the actuation measurement device can be set up to measure an actuation of the actuation device. If necessary, the brake control device and the at least one wheel, which can be braked in particular by the brake control device and/or the first brake device, can be arranged on the vehicle, in particular on the trailer.

If necessary, the deceleration sensor and the at least one wheel, which can be braked in particular by the brake control device and/or the first braking device, can be arranged on the vehicle, in particular on the trailer.

If necessary, the wheel speed sensor and the at least one wheel, which can be braked in particular by the brake control device and/or the first braking device, can be arranged on the vehicle, in particular on the trailer.

If necessary, the brake detection device and the at least one wheel, which can be braked in particular by the brake control device and/or the first brake device, can be arranged on the vehicle, in particular on the trailer.

Optionally, the brake control device can be arranged on the same compound vehicle part, in particular on the trailer, as the wheel braked by the first brake device and/or the brake control device.

In particular, the deceleration sensor and/or the speed measurement may be arranged on the same compound vehicle part, in particular on the trailer, as the wheel braked by the first braking device.

Because the brake control device and the wheel that can be braked by the brake control device are arranged on the vehicle, in particular on the trailer, the vehicle, in particular the trailer, can also brake automatically on its own, in particular decoupled from the towing vehicle. If necessary, it can be provided that at least one second braking device, in particular a non-linear electromechanical friction brake, is provided on the vehicle for braking the vehicle, in particular the at least one wheel.

If necessary, it can be provided that the at least one second braking device can be actuated in particular independently, preferably independently, of the first braking device.

If necessary, it can be provided that the vehicle has at least one further brake detection device for detecting braking of the vehicle, in particular for detecting a braking request and/or for detecting a deceleration of the vehicle, in particular a further speed measuring device, a further deceleration sensor and/or a further actuation measuring device, is provided.

If necessary, it can be provided that the at least one further brake detection device is optionally independent of the, in particular first, brake detection device.

If necessary, it can be provided that the detected braking action is converted into a further brake recognition signal by the further brake recognition device and the further brake recognition signal is transmitted to the brake control device.

If necessary, it can be provided that the brake control device recognizes, in particular automatically, which brake recognition devices are present on the vehicle.

If necessary, it can be provided that in the generation of the brake actuation signal from the brake control device, the transmitted brake detection signals are taken into account by possibly the brake detection signals according to previously defined parameters, in particular the Presence, the reliability of the detection and/or the validity of the data are weighted.

If necessary, the at least one second braking device is designed in such a way that it is functional and/or operable even if the at least one first braking device fails, so that the vehicle can be braked even if the at least one first braking device fails.

If necessary, the additional brake detection device is designed in such a way that it is functional and/or operable even if the, in particular, first, brake detection device fails, so that braking of the vehicle, in particular the braking request, can be detected even if the, in particular, first, brake detection device fails.

In the context of the present invention, a braking request can be understood as a desired braking operation, in particular the so-called braking request detection, and/or deceleration by the driver, in particular the so-called driver deceleration request, possibly of an autopilot of the vehicle.

In particular, a first braking device and at least one second braking device for braking the vehicle can be provided on the vehicle.

The first braking device can preferably be operated independently, preferably independently, of the at least one second braking device. The braking devices arranged on the vehicle are preferably independent of one another, preferably independently operable.

As a result, the vehicle may be single-fault-safe, since at least two braking devices and/or parts of braking devices are present on the vehicle, so that the vehicle can be braked even if a braking device or part fails. In particular, a brake detection device and at least one further brake detection device for detecting braking of the vehicle, in particular for detecting a braking request and/or for detecting a deceleration of the vehicle, can be provided on the vehicle.

The brake detection device can preferably be operated independently, preferably independently, of the at least one further brake detection device. The brake detection devices arranged on the vehicle are preferably independent of one another, preferably independently operable.

As a result, the vehicle can possibly be single-fault-safe, since there are at least two brake detection devices on the vehicle, so that the vehicle can be braked even if one brake detection device fails.

In the context of the present invention, single-fault security and/or single-fault-safe can be understood to mean that the vehicle can be braked despite the occurrence of a single fault in the vehicle, in particular the failure of a braking device and/or a brake detection device.

If necessary, it can be provided that the measurements of the at least one first and/or the at least one second brake detection device, in particular of all brake detection devices arranged on the vehicle, are transmitted to the brake control device.

If necessary, the method and/or vehicle can be designed to be error-proof in that the vehicle, which is formed in particular from a towing vehicle or a towing vehicle and trailer, has at least one second independent braking device and at least one second brake detection device, in particular a speed measuring device, a deceleration sensor and/or or an actuation sensing device.

In the context of the present invention, "on the basis" and/or "taken into account" can be understood to mean that a signal, a change and/or a value Generation of the brake actuation signal is taken into account by the brake control device and/or included. In other words, the signal taken into account, the change taken into account and/or the value taken into account can go into the function and/or formula for determining the brake actuation signal.

In particular, the brake actuation signal may be a function of the various signals, changes, and/or values that produce a function of the various signals, changes, and/or values.

Optionally, the first braking device can comprise a plurality of first braking devices. Optionally, the second braking device can comprise a plurality of second braking devices.

If necessary, it can be provided that the vehicle comprises a front and a rear vehicle part.

If necessary, it can be provided that the vehicle is a towing vehicle or a trailer.

If necessary, it can be provided that the vehicle comprises a towing vehicle and a trailer.

If necessary, it can be provided that the brake control device generates a brake actuation signal, which sets a predefined behavior of the towing vehicle and the trailer to one another, so that the trailer pulls or pushes the towing vehicle, in particular generates a pushing or pulling force.

If necessary, it can be provided that the brake control device sets a different, in particular higher or lower, braking and/or braking effect of the braking device arranged on the trailer than on the towing vehicle, in particular with the braking device arranged on the towing vehicle. If necessary, it can be provided that the brake control device generates a brake actuation signal, by means of which a predefined behavior of the vehicle parts is set to one another, so that the rear vehicle part pulls or pushes the front vehicle part, in particular generates a pushing or pulling force.

If necessary, it can be provided that the brake control device sets a different, in particular higher or lower, braking and/or braking and/or braking effect of the braking device arranged on the rear part of the vehicle than on the front part of the vehicle, in particular with the braking device arranged on the front part of the vehicle.

If necessary, it can be provided that a sensor, in particular an impact sensor or impact force sensor, measures the force between the vehicle parts and/or the towing vehicle and the trailer, with the measured force being taken into account by the brake control device when generating the brake actuation signal.

If necessary, it can be provided that the vehicle consists of a towing vehicle and a trailer and the trailer is connected to one of the towing vehicles.

If necessary, it can be provided that the vehicle is designed for local to regional traffic with a planned radius of action of a maximum of 100 kilometers.

In particular, the vehicle can be designed as an electrically powered vehicle with a planned radius of action of a maximum of 100 km and/or as a vehicle that can be assigned to the "micromobility" area, such as electric passenger or cargo bikes, small electric or logistics vehicles.

If necessary, it can be provided that the vehicle is an electric passenger bicycle, a cargo bicycle, a small electric vehicle or a logistics vehicle. If necessary, it can be provided that the brake control device is set up to operate the vehicle, in particular in accordance with standards, regulations and/ or as intended, and in particular to control a drive motor of the vehicle and/or the braking device, so that a previously defined speed, in particular a maximum instantaneous speed, is complied with.

If necessary, the vehicle, in particular the control device of the vehicle, preferably the brake control device, can be designed to operate the vehicle in accordance with standards, regulations or regulations. In particular, the brake control device can carry out driving interventions, such as maintaining the speed by controlling the drive and/or the braking device.

If necessary, it can be provided that the vehicle is a multi-standard vehicle and/or a multi-standard composite vehicle, whereby the vehicle may be a bicycle and/or e-bike in the city and a faster vehicle outside the city, in particular a motor vehicle, motorcycle, passenger car and/or truck is operable.

If necessary, it can be provided that the vehicle is designed to essentially meet the safety standards, such as in particular ISO26262 and/or IEC61508, with regard to the equipment of vehicles, safety goals.

In particular, the design of the vehicle can make it possible to operate the vehicle in a fail-safe manner. This means that, if applicable, a single error still allows safe operation and/or safe termination of operation in accordance with the regulations and/or specifications.

In particular, errors based on standards, regulations and/or other considerations can be accepted or ruled out, with any consequential errors caused by an error still count as individual errors overall. In particular, safety-relevant components, such as in particular the braking device and/or the brake detection device, are present multiple times, in particular at least twice, on the vehicle. This means that they are optionally arranged at least twice on the vehicle, in particular on the towing vehicle and/or trailer.

In particular, at least two power generation devices can be provided on the vehicle, with one power generation device preferably storing energy in the form of electrical energy and another power generation device storing energy in the form of non-electrical, in particular mechanical, preferably spring action.

If necessary, at least two braking devices and/or at least one electrical and at least one non-electrical actuating device and/or at least two electrical/electronic assemblies, in particular controllers, actuators and/or wiring, can be provided on the vehicle.

If necessary, the components of the vehicle, in particular the braking device, the brake detection device, the power generation device and/or the drive motor, are dimensioned with a greater safety factor, in particular with greater security against errors, than conventional components.

If necessary, the components of the vehicle, in particular the braking device, the brake detection device, the power generation device and/or the drive motor, are dimensioned in such a way that their probability of failure, in particular taking into account the relevant regulations, is low and/or improbable compared to conventional components, in particular so low and/or improbable that other risks, such as those that occur in particular with average use of the component, are preferably at least ten times higher than risks resulting from a component failure. If necessary, the components of the vehicle, in particular the braking device, the brake detection device, the power generation device and/or the drive motor, are dimensioned in such a way that the consequences of a fault are harmless, especially taking into account the relevant regulations, and in particular do not cause any above-average risks.

If necessary, the vehicle is designed so that at speeds above 5 km/h a braking effect of at least one fifth of the gravitational acceleration g, i.e. the average gravitational acceleration on earth, in particular a so-called g/5, is generated, in particular without battery backup, by possibly stored Energy, in particular mechanical energy, preferably stored in spring action, is used to brake the vehicle.

If necessary, the vehicle is designed so that at speeds above 5 km/h a braking effect of at least one fifth of the gravitational acceleration, in particular a so-called g/5, is generated, in particular without battery backup, by possibly resulting from the driving speed of the vehicle, in particular electrically and/or self-reinforcing energy and/or energy supplied by the driver is used to brake the vehicle.

In the context of the present invention, braking can be understood to mean a braking effect or the like.

If necessary, it can be provided that a speed change of the vehicle, in particular a positive or negative acceleration of the vehicle, is measured with the deceleration sensor.

If necessary, provision can be made for the deceleration sensor and/or the deceleration sensors to be arranged on the towing vehicle.

If necessary, provision can be made for the deceleration sensor and/or the deceleration sensors to be arranged on the trailer. If necessary, it can be provided that the wheel speed of the at least one wheel, in particular all wheels, of the vehicle is measured with at least one wheel speed sensor.

If necessary, it can be provided that the measured wheel speed is converted into a wheel speed sensor signal.

If necessary, it can be provided that the wheel speed sensor signal is transmitted to the brake control device.

If necessary, provision can be made for the wheel slip to be determined in the brake control device on the basis of the wheel speed sensor signal and the speed of the vehicle.

If necessary, it can be provided that the speed, in particular the instantaneous speed, of the vehicle is calculated by the brake control device from a deceleration sensor signal by integrating positive and negative accelerations.

If necessary, it can be provided that the speed, in particular the instantaneous speed, of the vehicle is measured by the brake control device using an acceleration sensor and is transmitted to the brake control device.

In particular, the speed, preferably the instantaneous speed, of the vehicle can be calculated by the brake control device using physical relationships known from the prior art, which can optionally also include mass and an initial speed.

If necessary, the deceleration sensor can convert the measured deceleration into a deceleration sensor signal. If necessary, provision can be made for the speed, in particular the instantaneous speed, of the vehicle to be measured with a speed sensor and/or a speed measuring device and transmitted to the brake control device.

If necessary, it can be provided that the speed, in particular the instantaneous speed, of the vehicle is optionally transmitted from the towing vehicle, in particular the control device of the towing vehicle, to the brake control device.

If necessary, it can be provided that if the determined wheel slip is greater than 5% and/or if the decrease in wheel speed results in a deceleration of the vehicle of more than 8 m/s$^2$ and/or if a wheel decelerates by more than 50% has a higher speed decrease than the wheel with the lowest wheel speed decrease, the brake actuation signal is adjusted by the brake control device, in particular reduced.

If necessary, it can be provided that the brake actuation signal is adjusted, in particular reduced, by the brake control device if the brake control device detects the risk of the wheel locking.

If necessary, it can be provided that the brake actuation signal from the brake control device is adjusted, in particular reduced, in the cases mentioned in such a way that locking of at least one wheel of the vehicle and/or wheel slip of more than 5% and/or a wheel speed decrease difference of more than 50% of at least one wheel of the vehicle is minimized or prevented.

If necessary, it can be provided that the brake actuation signal, in particular the setting position of the braking device, preferably the brake actuator of the braking device, is changed, in particular reduced, by the brake control device, in the cases mentioned preferably the set braking effect, to a value at which the brake control device Wheel slip less than 5% and/or a decrease in the wheel speed, a deceleration of less than 8 m/s² and/or no wheel has a speed decrease that is more than 50% higher than the wheel with the smallest wheel speed decrease, in particular when no risk of locking has been detected and/or was determined.

If necessary, the brake actuation signal, in particular the braking effect, the position of the braking device, preferably the brake actuator of the braking device, can be generated by the brake control device, taking into account the, in particular current, conditions and/or the location, such as in particular the roadway properties, so that a better braking effect may be achieved is achieved than regardless of the conditions.

If necessary, the brake control device can make changes to the brake actuation signal, to the wheel, in particular to the wheels, preferably simultaneously or unsimultaneously.

In particular, changes in the measured wheel values caused by changes in the brake actuation signal, such as wheel slip and/or changes in the ascertained risk of rollover, can be determined and taken into account when generating a brake actuation signal.

If necessary, it can be provided that there is a connection, in particular a data connection, between the brake control device and a further control device, in particular a control device of the towing vehicle.

The connection between the brake control device and another control device can be wired or wireless.

If necessary, it can be provided that vehicle data, in particular the speed, the temperature, the precipitation, the actuation signal of the braking device and/or other brake control data, such as in particular the braking effect, the temperature of the braking device, the energy supply and/or a detected blockage, of the further control device to be transmitted to the brake control device or vice versa.

If necessary, it can be provided that the transmitted vehicle data are taken into account by the brake control device when generating the brake actuation signal.

If necessary, provision can be made for the vehicle data transmitted by the brake control device to be taken into account in the algorithms stored in the brake control device, qualitatively and/or quantitatively, promoting reaction speed and/or accuracy.

As a result, fail-safe operation of the vehicle, in particular of the brake control, can be made possible, preferably in the event of failure of a device, in particular of a sensor, and/or the locking of wheels can be prevented.

If necessary, it can be provided that the actuation measuring device is arranged on the actuation device, in particular the at least one brake lever and/or the at least one brake pedal, of the brake device.

If necessary, it can be provided that the actuation of the actuation device, in particular the brake lever and/or the brake pedal, is measured by the actuation measuring device, in particular directly or indirectly.

If necessary, it can be provided that the actuation measured by the actuation measuring device is converted into a brake detection signal.

If necessary, it can be provided that the brake detection signal is transmitted to the brake control device.

If necessary, it can be provided that the brake control device takes the brake detection signal into account when generating the brake actuation signal is, so that in particular a behavior that is stable at the zero point results and/or there is no braking effect if the actuating device is not actuated.

If necessary, it can be provided that the at least one further actuation measuring device is arranged on the actuating device, in particular the at least one brake lever and/or the at least one brake pedal, of the braking device.

If necessary, it can be provided that the actuation of the actuation device, in particular the brake lever and/or the brake pedal, is measured by the further actuation measuring device, in particular directly or indirectly.

If necessary, it can be provided that the actuation measured by the further actuation measuring device is converted into a brake detection signal.

If necessary, it can be provided that the brake detection signal is transmitted to the brake control device.

If necessary, it can be provided that the brake control device takes the brake detection signal into account when generating the brake actuation signal, so that in particular a zero-point stable behavior results and/or no braking effect occurs if the actuating device is not actuated.

If necessary, the actuation of the actuation device can be detected by the actuation measuring device as a force or pressure, in particular its effect or change, and/or as a setting or position, in particular its change in stages or proportionally.

In particular, the brake lever position and/or brake lever force or values associated therewith can preferably be determined in such a way that zero-point stable behavior, in particular of the braking device, results. In the context of the present invention, zero-point stable behavior can be understood to mean that no braking effect can arise from an actuation measurement if there is no, in particular active, actuation by the driver. In other words, the braking device can be controlled, regulated and/or adjusted in such a way that no braking effect is achieved and/or is present when the actuating device is not actuated, in particular when the actuating device is not actuated.

To control, regulate and/or adjust the braking device, properties of the actuation measuring device and/or parts of a corresponding sensor characteristic can be used, in which a braking request is also given under influences that can be realistically assumed, such as temperature from −20° to +50° and/or sensor aging. is recognizable.

If necessary, the actuating device can transmit a hand force, a foot force and/or a movement and can in particular be designed as a cable, linkage or pressure measuring device.

If necessary, the actuation device and/or actuation measuring device can be retrofitted by subsequently inserting and/or arranging a device that records force, pressure and/or position on the vehicle.

If necessary, the brake control device can generate and/or set the brake actuation signal in such a way that the brake device controlled by the brake control device is controlled in such a way that one part of the vehicle, in particular the trailer, pulls or pushes the other part of the vehicle, in particular the towing vehicle.

If necessary, the force measured between the vehicle parts can be taken into account when the brake control device generates the brake actuation signal. If necessary, when generating the brake actuation signal by the brake control device, environmental conditions, in particular those with an influence on the coefficient of friction of the road surface, such as falling below a previously defined air temperature or wetness from weather data, can be taken into account.

If necessary, it can be provided that a vibration sensor is provided on the vehicle, in particular in the area of a wheel suspension of the vehicle.

If necessary, it can be provided that vibrations, in particular vibrations of the vehicle, are measured with the vibration sensor.

If necessary, it can be provided that the vibrations measured by the vibration sensor are converted into a vibration sensor signal.

If necessary, provision can be made for the vibration sensor signal to be transmitted to the brake control device, as a result of which the brake control device may calculate the mass of the vehicle on the basis of the vibration sensor signal.

If necessary, it can be provided that the brake control device generates the brake actuation signal, taking into account the vibration sensor signal, in particular the calculated mass of the vehicle.

In particular, the mass of a spring-mass system, in particular of the vehicle, can be related to the vibration frequency in a manner known from the prior art and can be derived therefrom.

If necessary, it can be provided that an angle sensor is provided on the vehicle, in particular in the area of a wheel suspension, in particular spring-loaded, of the vehicle. If necessary, it can be provided that an angle change of a part of the wheel suspension of the vehicle is measured with the angle sensor.

If necessary, it can be provided that the change in angle measured by the angle sensor is converted into an angle sensor signal.

If necessary, provision can be made for the angle sensor signal to be transmitted to the brake control device, as a result of which the brake control device may calculate the mass of the vehicle on the basis of the angle sensor signal.

If necessary, it can be provided that the brake control device generates the brake actuation signal taking into account the angle sensor signal, in particular the mass of the vehicle calculated on the basis of the angle sensor signal.

If necessary, it can be provided that a position sensor is provided on the vehicle, in particular in the area of a wheel suspension, in particular spring-loaded, of the vehicle.

If necessary, it can be provided that the change in angle or change in position of a part of the wheel suspension is measured with the position sensor.

If necessary, it can be provided that the change in angle or change in position measured by the position sensor is converted into a position sensor signal.

If necessary, provision can be made for the position sensor signal to be transmitted to the brake control device, as a result of which the brake control device may calculate the mass of the vehicle on the basis of the position sensor signal.

If necessary, it can be provided that the brake control device transmits the brake actuation signal, taking into account the position sensor signal, in particular the mass of the vehicle calculated on the basis of the position sensor signal.

In particular, the brake control device can calculate the maximum possible, preferably maximum possible non-locking braking effect via the spring properties and/or the size of the signal, in particular the change in the force on the spring or the wheel, Axle or vehicle load results, determined and/or calculated.

If necessary, it can be provided that a mechanically and/or electronically actuatable locking sensor is provided on the vehicle.

If necessary, provision can be made for the locking sensor to transmit a locking signal to the brake control device when it is actuated.

If necessary, it can be provided that the brake control device generates a brake actuation signal, which in particular applies the brake device, when the locking sensor is actuated mechanically and/or electronically and/or the locking signal is transmitted to the brake control device.

As a result, unauthorized or unintentional departure from the current location of the vehicle and/or dismantling of vehicle parts, in particular dismantling of wheels and/or parts, can be made more difficult and/or prevented by the, in particular permanent, actuation and/or application of the braking device will.

In particular, dismantling can be made more difficult by the permanently actuated, in particular tightened, braking device, since an actuated braking device makes it difficult to remove a brake drum, brake parts and/or a wheel, in particular recurringly, repeatedly, lastingly and/or with a loss in value. In the case of a bicycle in particular, actuation, in particular application, of the braking device can prevent and/or reduce theft of the wheels, in particular the front wheel and/or the rear wheel.

If necessary, it can be provided that a location sensor is provided on the vehicle.

If necessary, it can be provided that the location of the vehicle is determined using the location sensor and transmitted to the brake control device.

If necessary, it can be provided that the brake control device generates the brake actuation signal taking into account the location, so that in particular the braking effect achieved by the brake actuation signal is adapted on the basis of the location, in particular to the gradient of the road and/or the course of the road at the determined location.

If necessary, it can be provided that the brake control device takes the location into account when converting the blocking signal, in particular in such a way that no brake actuation signal is generated by the brake control device in a predefined area, so that movement in this predefined area is possible.

If necessary, the brake control device releases or restricts various vehicle settings based on the location, preferably by adjusting the braking effect.

If necessary, it can be provided that a pedaling vibration sensor is provided on the vehicle.

If necessary, it can be provided that the pedaling vibration sensor is designed as an acceleration, force or speed sensor. If necessary, the pedaling vibration sensor can be used to detect the pedaling vibrations caused by pedaling, in particular by pedaling bicycle pedals, in particular the pedaling vibrations that produce fluctuating positive and/or negative acceleration.

If necessary, it can be provided that the pedaling vibrations measured by the pedaling vibration sensor are converted into a pedaling vibration sensor signal.

If necessary, it can be provided that the pedal vibration sensor signal is transmitted to the brake control device.

If necessary, provision can be made for the brake control device to generate the brake actuation signal taking into account the pedaling vibration sensor signal, as a result of which a brake actuation signal may only be generated if no pedaling vibrations are detected.

If necessary, a decelerating portion of the pedaling vibration can be disregarded by the brake control device when generating the brake actuation signal.

If necessary, a value that is below the deceleration that can be observed during the pedaling vibration can be classified by the brake control device as, in particular, genuine braking when the brake actuation signal is generated.

If necessary, the pedaling vibrations can be calculated by the brake control device from the brake actuation signal, in particular from a measured deceleration signal, based on their periodic occurrence and the strength of the occurrence.

If necessary, it can be provided that from the vehicle, in particular the vehicle control device, preferably the vehicle control device of the towing vehicle, at least one, in particular a qualitative, vehicle signal, in particular a brake signal, an actuation of the brake pedal, a drive signal, an actuation of a blinker and/or a status, in particular an activation, of the brake light is transmitted to the brake control device.

In particular, a brake signal can be understood to mean a signal which is transmitted from the vehicle control device to the brake control device for braking the at least one wheel.

The transmission of the vehicle signal from the vehicle control device to the brake control device can optionally be wired or wireless, in particular via a connection device.

If necessary, provision can be made for the brake control device to take into account the at least one vehicle signal when generating the brake actuation signal.

If necessary, it can be provided that no brake actuation signal is then generated by the brake control device when a drive signal is transmitted from the vehicle, in particular the vehicle control device, to the brake control device.

and/or if no braking signal is transmitted from the vehicle, in particular the vehicle control device, to the brake control device, in particular the brake pedal is not actuated and/or the brake light is not activated.

In particular, if the brake control device detects that regenerative braking or intentional rolling of the vehicle is desired, in particular when the brake light is activated, braking with a previously defined strength, in particular a quarter of the gravitational acceleration, in particular with so-called g/4, and/or the braking can be controlled depending on the measured deceleration, and/or are controlled by a transmitted braking request from the driver.

If necessary, it can be provided that the brake control device detects an interruption in the connection between the vehicle, in particular the towing vehicle and the trailer, preferably the vehicle control device of the towing vehicle, and the brake control device.

If necessary, it can be provided that, if an interruption is detected, the interruption is taken into account by the brake control device when generating the brake actuation signal, in particular by generating the brake actuation signal, in particular exclusively, on the basis of the deceleration measured with the deceleration sensor or the wheel speed measured with the wheel speed sensor will.

If an interruption is detected, it can be provided that the brake control device uses a predefined and/or situation-related, such as a speed-dependent or load-dependent, brake actuation signal to actuate the first brake device to control the brake device.

If necessary, it can be provided that when an interruption, in particular a so-called torn trailer, is detected, from the Brake control device braking over a third of the acceleration due to gravity, in particular a so-called g/3, is initiated.

If necessary, it can be provided that the brake detection signal, the further brake detection signal, the vibration sensor signal, the angle sensor signal, the position sensor signal, the locking signal, the location, the pedal vibration sensor signal and/or an impact force signal before generation or when generating the brake actuation signal in the brake control device, in particular by filtering, in particular low-pass filtering, preferably digital low-pass filtering of a higher order and/or number of poles. If necessary, it can be provided that the brake detection signal, the further brake detection signal, the vibration sensor signal, the angle sensor signal, the position sensor signal, the locking signal, the location, the pedal vibration sensor signal and/or an impact force signal before generation or during the generation of the brake actuation signal in the brake control device, in particular by filtering, in particular low-pass filtering, preferably digital low-pass filtering of a higher order and/or number of poles, is filtered in such a way that the response time of the braking device and/or the smoothing of the filtering becomes faster and/or or more stable brake actuation signal than with a single-stage low-pass filter.

Within the scope of the present invention, the run-out force signal can be understood to mean the positive or negative force between the various vehicle parts, in particular the towing vehicle and the trailer.

If necessary, it can be provided that filters of a higher order and/or higher numbers of poles are used for filtering.

These filters can optionally be designed using the formulas known from the prior art in such a way that the filtering, in particular mechanical, actuation time of the braking device, in particular essentially, is not extended, preferably less than doubled.

These filters can optionally be designed with the formulas known from the prior art in such a way that the signals are smoothed by the filtering, which preferably results in a target braking torque fluctuation of more than half to less than twice the target braking torque mean value.

If necessary, it can be provided that the brake detection signal, the further brake detection signal, the vibration sensor signal, the angle sensor signal, the position sensor signal, the locking signal, the location, the pedal vibration sensor signal and/or an impact force signal is an input variable of a or the simulation model. If necessary, it can be provided that the brake actuation signal and/or at least one setting variable for the braking device is output as the output variable of the simulation model.

If necessary, it can be provided that the simulation model, in particular the simulation calculations of the simulation model, is carried out in the brake control device.

If necessary, provision can be made for simulation calculations to be carried out on the basis of the brake detection signal, the further brake detection signal, the vibration sensor signal, the angle sensor signal, the position sensor signal, the locking signal, the location, the pedal vibration sensor signal and/or an impact force signal performed in the brake control device and/or outside the vehicle in advance.

If necessary, it can be provided that the results of the simulation model, in particular the simulation calculation(s), are taken into account by the brake control device when generating the brake actuation signal, so that a previously defined state of the vehicle, in particular a so-called self-increasing, "escalating" braking, is reduced and/or is avoided.

In the context of the present invention, "escalating" braking can be understood to mean an uncontrollable state of the vehicle and/or a state of the vehicle that is perceived as uncontrollable.

If necessary, it can be provided that the results of the simulation model, in particular the simulation calculation(s), are taken into account by the brake control device when generating the brake actuation signal, so that the probability of the occurrence of a previously defined state of the vehicle, in particular a so-called self-increasing, "escalating" braking, is reduced and/or eliminated. If necessary, it can be provided that it is determined in advance and/or during operation of the vehicle how braking that has been initiated, in particular by the driver, affects the deceleration measured for brake control and which additional braking can be derived from this without an overall excessively increased braking. Braking, in particular escalating braking, in which a reduced driver braking request no longer leads to a reduction in the overall braking effect.

In particular, it can be avoided that the intensity of the braking controlled by deceleration measurement is limited in advance or during operation or is calculated as non-escalating, the formulas known from the prior art for deceleration, force, mass being used.

If necessary, the simulation model, in particular the simulation calculation of the simulation model, can take into account properties of the at least one braking device, such as in particular the coefficient of friction, the friction radius, the mechanical stiffness and, if applicable, temperature-related changes, so that in particular the brake actuation signal and/or at least one setting variable for the at least a braking device is formed and/or specified.

If necessary, the simulation model, in particular the simulation calculation of the simulation model, can take into account the actuator position and/or actuator force, in particular the actuator torque, and/or an internal control calculation which checks whether this default value under the measured conditions, such as in particular the outside temperature, the temperature of the braking device, the setting of any wear adjustment, pad wear leads to the desired braking effect, i.e. in particular the desired braking torque.

If necessary, the brake control device can initiate measures to more precisely achieve the target braking effect on the basis of the results of the simulation model, in particular by triggering a wear adjustment of the braking device, and/or in particular by changing the actuator specification of the braking device such as position, force or moment, and/or in that the determined, estimated or measured values are used in the sense of a closed control loop, in particular for adapting the actuator specification, and the determined, estimated or measured braking effect is brought up to the target braking effect.

If necessary, provision can be made for the brake control device to carry out simulation calculations to calculate the rollover probability of the vehicle in order to prevent the vehicle from rolling over.

If necessary, provision can be made for the vehicle acceleration, preferably the braking deceleration and/or curve acceleration of the vehicle, to be calculated in these simulation calculations.

If necessary, provision can be made for the brake control device to take into account at least one wheel contact force of the vehicle determined directly or indirectly, in particular via deflection and/or rebound, in these simulation calculations.

If necessary, provision can be made for the brake control device to recognize a movement, rotation or change in the determined wheel contact force as a rollover that is already beginning or is in progress and is used to prevent rollover.

If necessary, it can be provided that on the basis of the simulation calculations to prevent the rollover, the braking device of the vehicle, the drive of the vehicle, the steering of the vehicle and/or the control of the vehicle are operated in such a way that a rollover of the vehicle is reduced and/or prevented, in particular by the brake control device, the brake actuation signal for tightening the braking device of the at least one wheel is reduced with increasing rollover probability, so that The braking effect of the braking device can be increased more slowly, especially with an increasing rollover probability.

If necessary, it can be provided that without risk of rollover, in particular before a risk of rollover and/or probability of rollover is detected by the brake control device, rapid brake actuation is also possible in the direction of increasing risk of rollover, in particular probability of rollover, but with increasing risk of rollover, in particular probability of rollover, in the direction of further increasing Risk of rollover, in particular probability of rollover, only a slower actuation takes place than in the direction of decreasing risk of rollover, in particular probability of rollover.

In particular, the braking device is designed in such a way that the braking effect can be increased more slowly in the area of high risk of rollover and/or high probability of rollover than in the direction of lower risk of rollover and/or lower probability of rollover, in particular by reducing the braking effect by at least 10% faster than an increase.

If necessary, it can be provided that continuously or occasionally a rollover prevention by intervention in the vehicle acceleration, preferably braking deceleration and/or cornering acceleration, from the Brake control device is calculated and/or carried out by the brake control device.

In particular, these calculations can be used by the brake control device when a rollover occurs, in particular when the plumb falls outside the footprint through the center of gravity of a force of weight and acceleration and therefore uses that component or magnitude of that plumb or a magnitude expressing the same effect to pass through Reduction of the component or measured variable, i.e. essentially the corresponding acceleration, to avert the rollover by comparison with a limit value or regulation or limitation to a limit value, with a fixed component or variable serves as a limit value or a situation-related and/or its temporal or location-related change, e.g. following the roadway, and/or that at least one wheel contact force determined directly or indirectly, e.g. via compression or rebound, or a similarly expressing variable is used or included to prevent the rollover, and/or its temporal or location-related change, e.g. following the roadway, and/or that a movement, rotation or change in these values is recognized as a rollover that is already beginning or is in progress and is used to prevent the rollover, and/or that the braking device and/or drive and/or steering or their controls are operated in such a way that a rapid reaction is also possible in the direction of increasing risk of rollover without the risk of rollover, but with an increasing risk of rollover a slower reaction takes place in the direction of increasing risk of rollover than in direction decreasing risk of rollover, so that the braking device is preferably designed in such a way that the braking effect can be increased more slowly in the area of the risk of rollover than it can be released in the direction of a lower risk of rollover, in particular in that the braking effect decreases by at least 10% faster than one Increase.

If necessary, provision can be made for further braking effects, such as in particular the driving resistance, the flow resistance and/or the braking effect of other braking devices, in particular a regenerative braking effect of an electric drive that may be present, of the vehicle to be taken into account when the brake control device generates the brake actuation signal.

If necessary, it can be provided that these additional braking actions are subtracted from the brake actuation signal, preferably from the brake detection signal, so that the brake actuation signal is reduced. If necessary, it can be provided that the vehicle comprises at least one temperature sensor for measuring the temperature, in particular the temperature of the braking device, with the measured temperature being transmitted to the brake control device.

If necessary, it can be provided that the brake control device uses a low-pass filter, the thermal resistance, the thermal capacity and/or a cascaded low-pass filter to simulate the temperature of the braking device in a thermal simulation model.

If necessary, it can be provided that the simulated temperature is transmitted to the brake control device.

If necessary, it can be provided that the braking power, i.e. the thermal power under the respective current conditions, the cooling by relative wind, speed and/or the temperature-dependent black body radiation is included as an input variable in the heat simulation model.

If necessary, it can be provided that the brake control device takes into account the temperature, in particular measured or simulated, of the braking device, in particular the friction pairing of the brake disc and/or the drum with the respective brake lining, when generating the brake actuation signal, so that in particular the temperature-dependent change in braking power the braking device can be compensated and/or overheating of the braking device is prevented or reduced.

If necessary, it can be provided that the brake actuation signal is adjusted with the same brake detection signal in such a way that the braking of the at least one wheel, in particular braking of the vehicle, in the case of a braking device which has a first temperature, is essentially the same as the braking of the at least a wheel, in particular braking of the vehicle, in a braking device which has a second temperature. If necessary, it can be provided that the brake actuation signal is adjusted with the same brake detection signal in such a way that the braking of the at least one wheel, in particular braking of the vehicle, changes by less than 15% in the case of a braking device which has a first temperature, such as braking of the at least one wheel, in particular braking of the vehicle, with a braking device which has a second temperature.

If necessary, it can be provided that low-pass filters, thermal resistance, thermal capacity and/or cascaded low-pass filters are used to simulate the temperature of the braking device.

In particular, the heat simulation model preferably does not consist of values stored in advance, but rather continuously processes the changing influences into new temperature data, i.e. in particular based on the braking power, i.e. heat output, under the current conditions such as cooling by airstream, speed, temperature-dependent blackbody radiation for the respective levels of the multi-level low-pass filter continuously simulate new current temperatures.

The current simulated temperature at the output of a stage can be included in the input of a following stage, so that the brake actuation signal, in particular the braking effect that is possible as a result, can be calculated more precisely.

In particular, the heat simulation model can take into account the thermal expansion/s, in particular the contact pressure conditions changed as a result, the pad temperature, in particular the associated change in the coefficient of friction and/or the heat flow from parts further away from the braking power to parts closer to the braking power.

If necessary, the heat simulation model, as a result and due to its multi-stage nature, can not only simulate or determine a first braking operation with the required accuracy, but also further braking operations and the cooling phases that take place between the braking operations. The heat simulation model can simulate or determine braking, with the coefficient of friction changing as a result of the respective lining temperature, i.e. in particular from approx 150° C. inclusive, in particular 10° C. up to and including 250° C.

If necessary, it can be provided that the vehicle comprises at least one, in particular autonomous, power generation device.

If necessary, it can be provided that the power generation device optionally includes a rechargeable battery, a battery, a photovoltaic module and/or a wheel hub dynamo.

If necessary, it can be provided that the brake system of the vehicle, in particular the first brake device, the brake detection device and the brake control device, can be operated by the at least one power generation device, in particular is supplied with energy, whereby in particular an actuation specified by the brake actuation signal of the brake control device, preferably an application and/or a release of the first braking device, in particular braking of the vehicle, is effected, in particular also when the energy supply from other vehicle parts, in particular from a towing vehicle, fails and/or is interrupted.

If necessary, provision can be made for the behavior of the electricity consumers, the electricity generation device, the electricity storage device and/or the user to be coordinated with one another, so that in particular certain states specified in the "List of measures" below can be covered.

In particular, the non-linearity of the brake actuation and the energy stores such as in particular springs, batteries, accumulators and/or the generation of electrical energy can be adapted to one another by appropriate design in accordance with the physics known in the prior art. If necessary, provision can be made for a "single-fault-safe" power grid to be formed.

In particular, if one of the existing power supplies fails, the "single-fault-safe" power grid can still supply power to the vehicle, in particular the actuator, to generate a braking effect of the braking device, in particular at least a quarter of the acceleration due to gravity, in particular the so-called g/4, the electronics and/or the sensors of the vehicle.

In particular, "single-error-proof" can be understood in relation to the error under consideration.

If necessary, it can be provided that the vehicle comprises at least one drive motor, in particular an electric motor.

If necessary, it can be provided that the at least one drive motor is regulated and controlled by the brake control device.

If necessary, it can be provided that the drive motor is controlled and/or regulated by the brake control device, taking into account the brake actuation signal.

If necessary, it can be provided that the brake control device adapts the brake actuation signal to the driving conditions, such as in particular an incline of the road, a load on the vehicle, a speed of the vehicle and/or the energy consumption of the brake system.

If necessary, it is provided that the brake control device adjusts the brake actuation signal in such a way that a braking effect, in particular exclusively, is generated by regenerative braking with the drive device, so that in particular the braking energy is stored and/or converted Energy in heat, in particular by the braking device, avoided and/or prevented.

If necessary, it is provided that the brake control device adjusts the brake actuation signal in such a way that states of the brake device are avoided and/or prevented in which electrical drive energy is supplied and frictional heat is generated by braking at the same time.

If necessary, it can be provided that the sensor signal is transmitted digitally from the at least one sensor to the brake control device.

If necessary, it can be provided that the brake actuation signal is transmitted digitally from the brake control device to the braking device.

If necessary, it can be provided that the signals from the sensors, in particular all signals from all sensors, are transmitted digitally to the brake control device.

If necessary, it can be provided that the brake control device, in particular when the brake control device is switched on, sends a test signal to the brake device and/or the at least one sensor, in particular to all sensors connected to the brake control device, to check the functionality of the brake device and/or the at least one Sensor, in particular all connected to the brake control device sensors, is transmitted, whereby their functionality is determined.

If necessary, it can be provided that an analog signal from the brake control device is converted into a digital signal.

If necessary, it can be provided that a signal that is already being used for the transmission of analog signals, in particular a pulse width modulated signal, is changed by the brake control device in such a way that it is additionally or exclusively used for digital communication. In the method, a signal that is already used in particular in systems of this type, preferably a pulse width modulation, which can optionally also represent analog values in principle, can change to digital communication when a digital communication option is identified.

The method can preferably be started with the method already used by the system and then at least one digital transmission attempt can be started and, if successful, further communication can take place digitally, optionally also bidirectionally, optionally also addressable to a number of participants.

If necessary, the method can be switched back to analog signal transmission and/or reverted to.

If necessary, a signal already used in such systems, preferably a pulse width modulation, which can possibly also represent analog values in principle, can be used in the method in such a way that it fulfills the options already used, but can also transmit digital information, i.e. in particular in the case of an already used signal Information used mean value of a pulse width modulation, the mean value is essentially maintained, but in possibly other behavior of the pulse width modulation, preferably in the time or amplitude behavior, an additional, possibly also bidirectional, possibly also addressable to several participants digital communication is accommodated.

If necessary, both options can run essentially simultaneously in the method, but there can also be a selection and/or switching option.

If necessary, it can be provided that the first braking device and/or second braking device is designed as a drum brake, in particular as an electromechanical drum brake. If necessary, provision can be made for the first braking device, the second braking device, the wheel bearing of the wheel, a drive motor integrated in the drum brake and/or a dynamo to be removable from an axle journal of the wheel, with the electrical contacts possibly also being detachable when being removed.

If necessary, it can be provided that the first braking device and/or second braking device comprises an, in particular axis-centric, actuating device and at least one, in particular non-linear, actuating cam.

If necessary, provision can be made for the at least one wheel, the first braking device, the second braking device, the brake detection device, the further brake detection device and/or the brake control device to be arranged on the vehicle, in particular on the trailer.

If necessary, it can be provided that the brake detection device and/or the further brake detection device is designed as a gyroscope and/or the brake control device is arranged on the vehicle, in particular on the trailer.

If necessary, it can be provided that at least one exclusively mechanically actuatable braking device is provided on the vehicle to achieve a previously defined minimum braking effect.

In the context of the present invention, vehicle can be understood to mean a motor vehicle, a multi-track towing vehicle, single-track towing vehicles, in particular a bicycle and/or an e-bike, and/or a micromobility vehicle.

In the context of the present invention, a trailer can be understood as a trailer for multi-track towing vehicles, in particular a motor vehicle trailer, a trailer for single-track towing vehicles, in particular bicycles and/or e-bikes, and/or a trailer for a micromobility vehicle. In particular, the invention can relate to a method for determining a target braking effect of a vehicle, in particular a trailer, from a deceleration, which is determined in particular.

The procedure may include any or all of the following steps:

Determination of the braking effect range, the method, whereby the braking effect range for a trailer for multi-lane passenger vehicles, in particular a motor vehicle trailer, is approximately 0.2 times the acceleration due to gravity, in particular so-called 0.2 g, up to and including 0.9 times the acceleration due to gravity, in particular so-called 0.9 g, is, or where the braking effect range for trailers of single-track towing vehicles, in particular bicycles and/or e-bikes, is approximately 0.1 times the acceleration due to gravity, in particular so-called 0.1 g, up to and including 0.6 times the acceleration due to gravity, in particular so-called 0.6 g, amounts, Determination of a tolerable deviation from the braking request: since this method develops an additional braking effect in addition to the braking request initiated by the driver or an automatic device by determining the deceleration caused by it, it is determined by how much higher or lower the overall braking effect is than by the driver or automats, for example by determining whether a driver or automat can solve a braking task satisfactorily using this method, e.g. can stop at a traffic light and evaluate, for example, whether the task solution can be solved satisfactorily or not, or numerical evaluations are carried out, e.g. whether there is a difference in e.g. the average deceleration of e.g. less than ±0.2 g between an unloaded trailer braked in this way, a fully loaded trailer braked in this way or e.g. the towing vehicle braked without a trailer.

Definition of the additional braking effect derived from the determined deceleration, i.e. in particular a number determining the additional braking effect, e.g. a factor that indicates, for example, how much additional braking effect is applied from which deceleration determined or how the application behaves, especially with different strengths Braking and/or different masses or wheel loads and/or wheel slip values occurring with certain brake actuations, in particular those that indicate blocking.

Checking this derived additional braking effect for escalating behavior, i.e. in particular whether the additional braking effect is so strong under the conditions to be examined that the in turn stronger deceleration leads to such a further increase in the braking effect that the procedure no longer meets the driver's wishes or automatic machines and/or an unbraked or less braked state can only be restored after the vehicle has come to a standstill by examining the areas to be covered with the known physical formulas, e.g. whether a particularly heavy but strongly decelerating trailer is connected to a particularly light towing vehicle and, if necessary, selection of the derived additional braking effect so that this condition does not occur and/or inclusion of variables that avoid this condition, e.g. inclusion of mass (es) or wheel load(s), axle load(s).

Specification of permissible operating limits, in particular of permissible masses of towing vehicle and trailer or their permissible ratios]

The invention relates in particular to a brake control device, the brake control device being set up and/or designed to carry out the method for braking a vehicle.

The invention relates in particular to a vehicle, in particular a towing vehicle and/or a trailer.

If necessary, the vehicle can have at least one wheel, a first braking device for braking the at least one wheel, in particular a non-linear electromechanical friction brake, a brake detection device for detecting braking of the vehicle, in particular for detecting a braking request and/or for detecting a deceleration of the vehicle, and/or include a brake control device, in particular an electronic brake control device, for controlling the first braking device. If necessary, the brake detection device can be formed from a speed measuring device for calculating a deceleration from the changing instantaneous speed of the vehicle, preferably a wheel speed sensor for measuring the speed of the at least one wheel.

If necessary, the brake detection device can be formed from a deceleration sensor for measuring a deceleration, in particular for measuring a deceleration effect in at least one direction, preferably in the direction of travel, preferably from a multi-axis, micro-electromechanical system.

If necessary, the brake detection device can be formed from an actuation measuring device for measuring an actuation of an actuating device of a braking device for braking the vehicle, in particular the first braking device, preferably a brake lever or a brake pedal of the vehicle.

If necessary, it can be provided that the brake control device of the vehicle is set up and/or designed to carry out the method for braking a vehicle.

If necessary, it can be provided that the vehicle is set up and/or designed to carry out the method according to the invention.

If necessary, it can be provided that the vehicle has the features mentioned in the description and/or in the patent claims individually or in combination.

If necessary, it can be provided that the brake detection device converts the detected braking, in particular the detected braking request, into a brake detection signal and transmits it to the brake control device, transmitted in particular via a connection device, preferably wired or wireless.

If necessary, it can be provided that the brake control device generates a brake actuation signal based on the brake detection signal, in particular by the brake control device generating a brake actuation signal based on the brake detection signal using interpolation tables, using conversion functions, using a simulation model and/or using simulation models to actuate the at least one first braking device can be determined or calculated.

If necessary, it can be provided that the brake control device for controlling the at least one first braking device transmits the brake actuation signal, in particular via a connecting device, preferably by cable or wirelessly, to the at least one braking device, whereby a control, in particular an actuation, preferably an application and/or a release that brings about at least one first braking device and thereby in particular braking of the at least one wheel, in particular braking of the vehicle, can be achieved or can be achieved.

Further features according to the invention can be found in the claims, the description of the exemplary embodiments and the figures.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

Figures 10, 11:
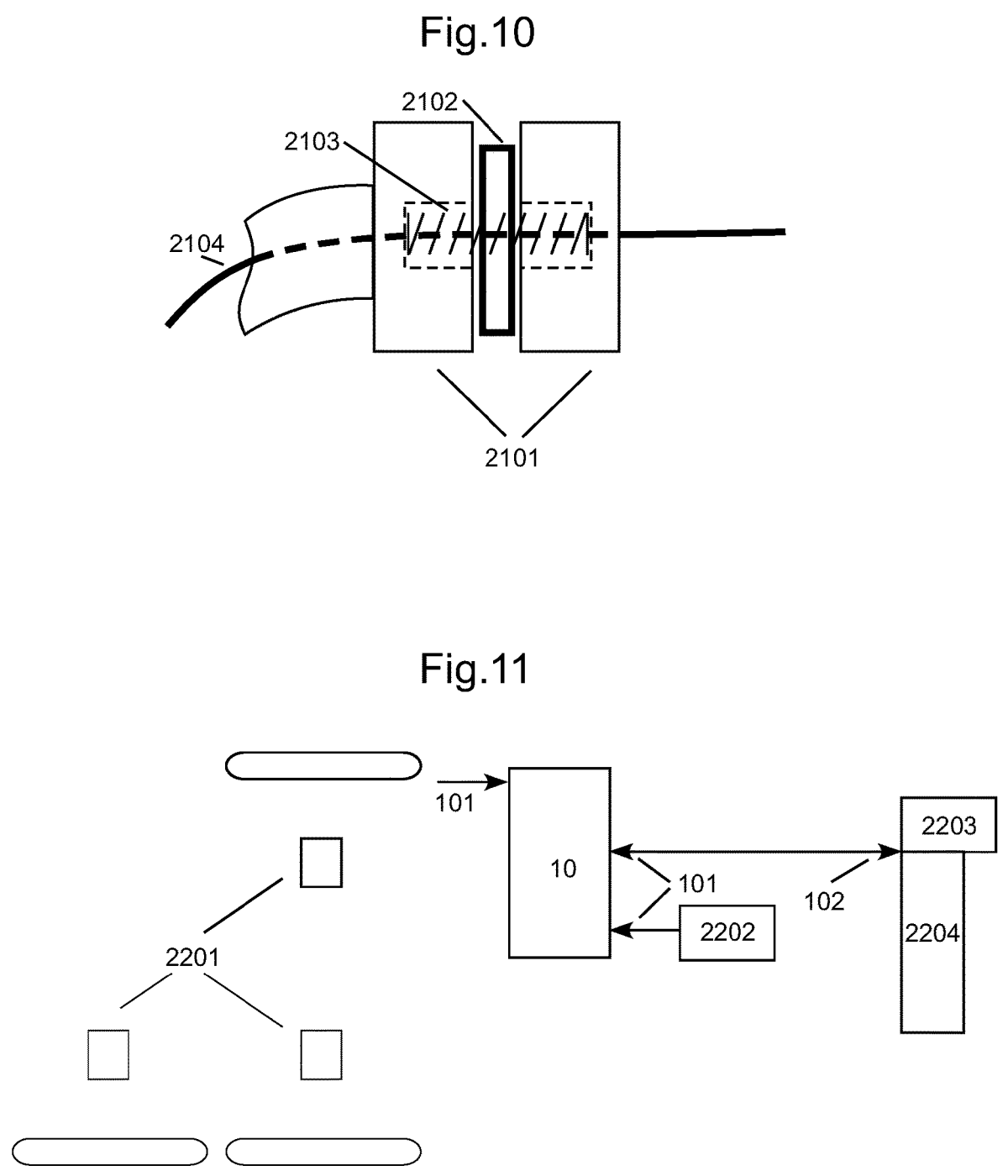

FIG. 10 schematically shows a possible embodiment of an actuation measurement with a force sensor, FIG. 11 shows a schematic of a possible implementation of components on a vehicle, FIG. 12 schematically shows a possible open-loop or closed-loop control, FIG. 13 shows a schematic of an easily retrofittable sensor for actuation measurement.

DETAILED DESCRIPTION

Figures 1, 2:
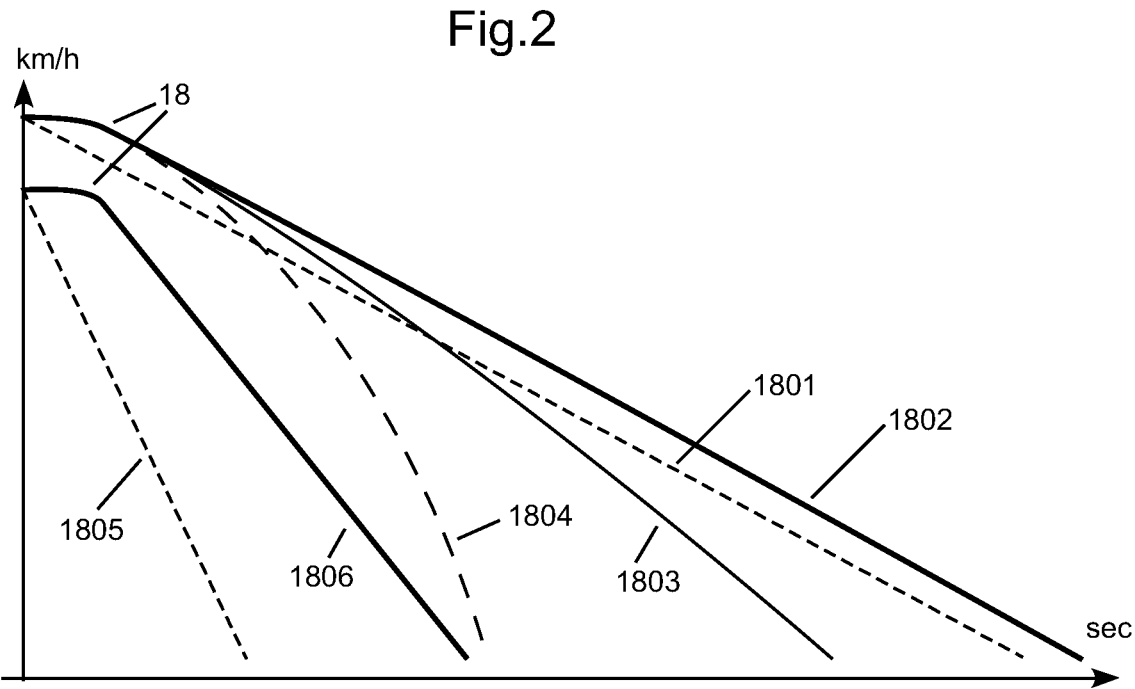
FIG. 1 schematically shows braking deceleration over time.
FIG. 2 schematically shows speed decreases over time.

The invention will now be explained further using the example of exemplary, non-exclusive and/or non-limiting embodiments.

It should be noted that in the different figures and/or embodiments, the same parts may be provided with the same reference numbers and/or the same designations. The disclosures contained throughout the description can be applied to the same parts with the same reference numbers and/or the same designations. The position information selected in the description, such as top, bottom, from the right, from left, side and the like are referred to the figure immediately described and illustrated.

Unless otherwise specified, the reference numbers correspond to the following components:

Brake 01, brake disc 011, brake drum 012, brake actuation 017, actuation transmission 018, compensating part 019

Spring for wear adjustment 021

Actuating cam 032, roller 033, reset 039

Actuating spring 042, parking brake drive 047 actuation transfer 058 brake pad 063, brake shoe 067

Wear adjustment cam 083, wear adjustment lever 084, path-defining movement 085, further turning device 086, pressure pad 087

Controls 10, input data 101, driving states 103, outputs 102, electric brake controls 105, other controls 106, vehicle characteristics 106, non-electric actuation 107

Brake deceleration 17, automatic machine 1701, driver 1702, fastest possible deceleration of the vehicle 1703, deceleration measurement 1704, favorable deceleration of the trailer 1705, Over-rapid deceleration build-up of trailer 1706, dead time in deceleration build-up of trailer 1707 Speed decreases 18, light braking instant request 1801, light braking 1802, a little too hard 1803, escalating braking 1804, heavy braking instant request 1805, heavy braking 1806

Actuation speed of the EMB 1901, slower time response 1902, speed when releasing 1903, behavior of a simple low-pass filter 1904, fast filter response with good smoothing 1905, sensor signals 1906

Brake pedal 20, actuating force 2001, lever 2002, bearing point 2003, limitations 2004, lever play spring 2005, presser 2006 (for pickup 2007), sensor for pickup 2008, pickup stop 2009, first activation force spring action 2010, further activation force spring action 2011, elastic part 2012, lever force, reaction force measurement 2013 2014, transmission force measurement 2015, cable connection 2016, intermediate lever 2017, bolt with clearance 2018, fixed part 2019

Force distributor 2101, force sensor 2102, spring 2103, actuating cable 2104, brake cable 2105, inner cable 2106

Controllable torque 2201, sensor 2202, driver input 2203, output 2204 resistance in supply voltage 2301, resistance in ground connection 2302, internal EMB gnd 2303, internal control variable (e.g. voltage) 2304, control input 2305, internal supply voltage 2306, external control variable (e.g. voltage) 2307, external supply voltage 2308

Release device 2501, electric machine 2502, actuator (e.g. electric motor with or without gear) 2503, axis 2504, armature assembly 2505

Brake detection device 2601, deceleration sensor 2602, deceleration calculation 2603, speed measurement 2604, actuation measuring device 2605, actuation device 2606, brake detection signal 2607, brake control device 2608, deceleration request 2609, brake signal 2610, brake actuation signal 2611, brake device 2612 In the case of brakes on road-legal motor vehicles, the safety requirements are usually strictly and clearly regulated. However, there are also vehicles and vehicle combinations where this is not the case, or not to the same extent everywhere, such as in the area of some trailers or with bicycles, e-bikes, small electric vehicles, vehicles that are only used on private land ("Micromobility") and others. Many of these areas are booming and technical developments, such as electric drives, often mean that speed and load limits are shifting significantly. It therefore makes sense to offer concepts in such cases that offer more security than the minimum required by law.

These concepts are based on a fundamental structure of devices and processes, the special combinations of which offer new possibilities. In particular, these can be realized with the method according to the invention and/or with the device according to the invention.

Figure 18:
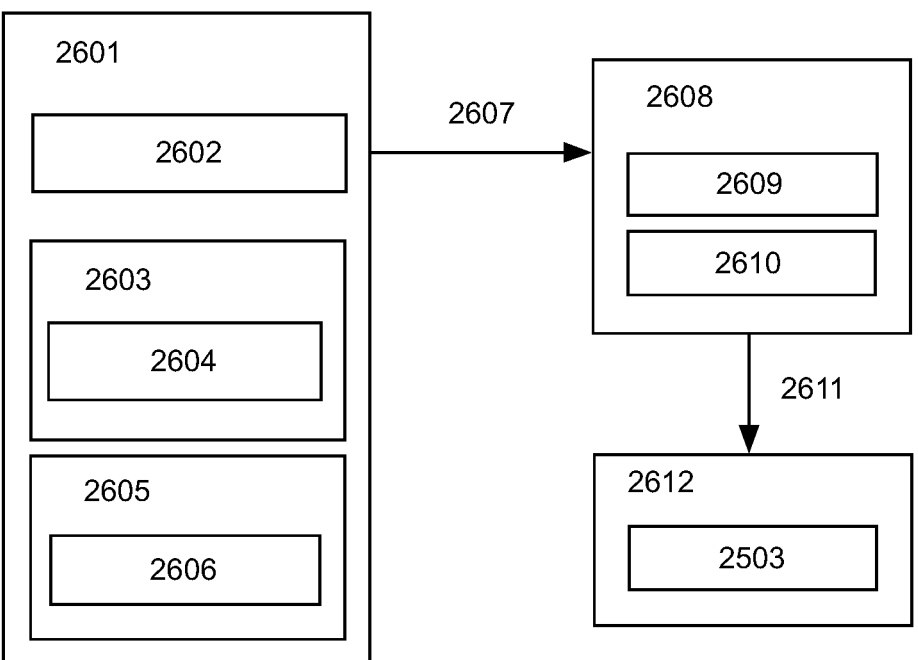
FIG. 18 shows schematically how the signals for controlling or regulating the brake(s) interact according to an embodiment of the method.

Essential components and their interaction are shown in FIG. Names and meanings of components It. FIG. 18 are described below.

According to the embodiment shown in FIG. 18, brake detection device 2601 includes a deceleration sensor 2602, a speed measuring device and an actuation measuring device 2605.

In all embodiments, the speed measurement 2604 can optionally be formed from the speed measuring device.

The actuation measuring device 2605 measures the actuation of an actuation device 2606 of the braking device 2612, preferably a brake lever or a brake pedal. According to this embodiment, deceleration calculations 2603 are carried out, if necessary, on the basis of the recorded signals of the deceleration sensor 2602.

The braking detected by brake detection device 2601, in particular the braking request and/or deceleration request 2609, is converted into a brake detection signal 2607 and transmitted to brake control device 2608.

According to this specific embodiment, a vehicle signal, in particular brake signal 2610, can also be transmitted from the vehicle control device to brake control device 2601.

Brake control device 2608 generates a brake activation signal 2611 on the basis of brake detection signal 2607 and, if applicable, brake signal 2610 by using interpolation tables, conversion functions and/or a simulation model to determine a brake activation signal 2611 for actuating brake device 2612 on the basis of brake detection signal 2607 will.

Brake control device 2608 then transmits the determined brake actuation signal 2611 to brake device 2612 in order to control brake device 2612, which causes a control, in particular an actuation, preferably an application and/or release, of brake device 2611 and thereby in particular a braking of the at least one Wheel, in particular braking of the vehicle is achieved.

Within the scope of the present invention, the brake detection device 2601 can be understood as a device for indirectly detecting braking from actuation measurement, deceleration measurement or deceleration calculation. In the context of the present invention, actuating device 2606 can be understood to mean a device for actuating, preferably an actuating device, a braking device by the driver, in particular a brake lever and/or a brake pedal.

In the context of the present invention, the actuation measuring device 2605 can be understood to mean one or more sensors in or on an actuation device, in particular for force and/or displacement, for measuring an actuation of an actuation device, in particular the extent of actuation, in particular in any sizes or units, e.g. 0-100%.

In the context of the present invention, deceleration sensor 2602 can be understood as a sensor that measures a deceleration and/or provides information about changes in the instantaneous speed of a vehicle, in particular a micro-electro-mechanical system and/or the impact force.

In the context of the present invention, the impact force can be understood as the positive or negative force between vehicle parts, in particular the towing vehicle and the trailer, which in particular consists of deceleration forces and/or acceleration forces due to the masses, e.g. between a towing vehicle and a trailer or in a suspension fork.

In the context of the present invention, the deceleration calculation 2603 can be understood as a calculation of acceleration and/or deceleration based on the change in the instantaneous speed.

Within the scope of the present invention, the speed measurement 2604 can be understood as a measurement of the instantaneous speed of a vehicle in relation to its surroundings, in particular the road surface, preferably referred to as so-called "ground speed", or the ambient air at a specific point in time. In particular, the speed measurement 2604 can take place using any technology, in particular using the rotational speed, a laser, a GPS, a pitot tube and/or a temperature. In the context of the present invention, the brake detection signal 2607 can be understood to mean the signal which is transmitted from the brake detection device to the brake control device.

In the context of the present invention, the brake control device 2608 can be understood to mean a control device, in particular a complete or modular one, which is designed for one or more brakes, for actuating brake devices on the basis of brake detection signals.

Within the scope of the present invention, the braking device 2612 can be understood to mean a device for achieving a deceleration, such as in particular a friction brake and/or a generator.

In the context of the present invention, actuation can be understood as meaning the targeted change in a state of a braking device in order to achieve a braking effect, in particular that of a motor, a voltage of an electromagnet and/or the loading of a dynamo.

In the context of the present invention, the actuator 2503 can be understood to mean a part/s of a braking device which bring about a specific change in the braking effect achieved, in particular an electric motor.

In the context of the present invention, deceleration request 2609, driver deceleration request or braking request can be understood as an expected value derived from the measurements of the brake detection device for the overall deceleration of a vehicle to be achieved.

In the context of the present invention, the brake signal 2610 can be understood to mean the representation of a braking effect which is required for a brake on a vehicle, in particular the weight, the number of wheels and/or the brake diameter of the vehicle to achieve a specific deceleration, in particular the braking torque, preferably in Nm. Within the scope of the present invention, brake actuation signal 2611 can be understood as a signal for specifying the extent of an actuation, which can differ from the brake signal in terms of unit, value and/or dynamics.

Micromobility

Based on Wikipedia, "micromobility" could refer to small, light vehicles up to a typical speed of 25 km/h (e.g. bicycles, e-bikes, pedelecs), with e.g. up to 500 kg, possibly without a combustion engine and e.g. below 45 km/h. In the present case, multi-track vehicles (e.g. trikes) and trailers for micromobility (e.g. for bicycles or pedelecs) are also understood and the above limits are extended to make sense. For example, with well-braked vehicles, there would be nothing to prevent a e.g. 120 kg eBike from pulling a trailer with e.g. 500 kg at the appropriate speed and e.g. a moped-like vehicle with the appropriate driving safety also being able to drive over 45 km/h or e.g. Sight-seeing vehicle with e.g. 2-3 passengers and an additional driver driving through a pedestrian zone at an appropriate speed. In the case of multi-track vehicles, the limits mentioned can still be significantly exceeded when transporting goods or people. Of course, there may be the possibility of getting a car or truck registration for such a "micromobility vehicle", for example, such and similar cases will be discussed here in the "multi-standard vehicle". In view of this, the brakes can, for example, definitely require braking torques in the large car rear wheel area (e.g. due to large wheel diameters). However, due to the speed and weight, the braking performance is significantly below (usually less than half) that of a conventional car.

Unfortunately, however, it has turned out that the usual possible combinations (bicycle alone, ABS, e-bike, with or without a trailer with or without brakes, approval requirements, speed and weight ranges) also lead to possible combinations of solutions and therefore also to combinations in the patent formulations: For example, an electric handbrake lever could also allow mechanical cable actuation for safety, but the cable can not be routed practically to the trailer, for example, and therefore makes it advantageous to independently determine the braking effect on the trailer, for example but in turn can be supported by an electrically operated trailer brake in a particularly dynamic and easily controllable manner, for example by manual actuation of the electric brake lever.

In these possible combinations ("micromobility"), the following explanations are favorable technical solution proposals for the safety goal, but can of course also be used for other weight classes. You must also take into account that such towing vehicles are usually operated with or without a trailer in varying combinations (e.g. which trailer on which towing vehicle), because it would appear impractical, for example, for a specific braked trailer to brake only on a defined towing vehicle. For practicability, it must also be taken into account that for energy reasons one also wants to brake regeneratively or mixed with friction braking. It is also clear that a deceleration control can also act with a different sign than a drive control and, for example, controls the brakes (e.g. regenerative or friction) when deceleration is detected and the same control can also support pedaling with an electric motor when acceleration is detected. The more these processes, which are no longer really easy to separate, are considered together, the more effective the practical benefit. For the user, the only question is comfortable driving. From the user's point of view, it is difficult to decipher how the brakes are applied or how the drive is supported, so the technical solution must include the required components. single-fault security "One-fault-proof" is generally understood to mean that a system does not have a safety-related malfunction due to one (1) error to be considered due to the design of the system (e.g. redundancies) (but e.g. restricted quality or usability can occur), whereby this error also possibly triggered consequential errors are assigned to this single error case. Errors to be "considered" can be in the form of a definition, standard, list, etc., or they can also be "reasonable" (e.g. 1 exploding battery is validly defined as a single error case, but 1 meteorite impact is not mentioned as a treatment value). Since vehicles without a safety requirement are also dealt with here (e.g. light bicycle trailers for which no brakes are prescribed), "one-fault-proof" is also understood to mean the quality, so that, for example, a trailer without a prescribed brake is "better" with a brake signal from the towing vehicle (e.g. stronger, more accurate, faster etc.) and can still brake without this signal, e.g. more slowly or with a longer reaction time. Such operation (e.g. without a quality or safety-enhancing signal) cannot be prevented here either, so such use can also be brought about frequently or deliberately by the user (e.g. the trailer can be deliberately attached to a bicycle without a brake signal). Of course (as could also be the case in other single-fault-safe systems), further redundancies can be present, such as 2 EMBs, 2 power supplies, 2 deceleration sensors, etc., whereby one could of course use single-fault safety, such as an aircraft engine with double ignition can have, even if the plane has 2 engines.

Compound Vehicle

A compound vehicle is understood here to mean that parts of a moving whole are preferably relatively rigidly connected and have very similar or mathematically related velocity vectors, such as a towing vehicle and a rear car in a curve. What is shown serves as preferred for e.g. braking of wheels on a vehicle, articulated vehicle (e.g. bus), articulated lorry, road or railroad train, but in principle also if the connection is established by a controller, such as platooning of road vehicles (electronically controlled vehicle train without mechanical connection), aircraft swarm, but since the mathematical relationships are known, in principle also for objects connected with ropes such as ships or glider tows. Compound vehicle and trailer are seen as equivalent in the following text, and terms such as bicycle trailers (also one-wheeled or single-track), semitrailer, train are seen in the sense of compound vehicle (as a generic term).

Brake

Here, in simplified terms, we speak of braking a wheel, but this means that the control (or regulation, which is used here as equivalent) of all objects integrated into the network by introducing forces is understood to be equivalent, because the general formulation of the task can also be implemented. A drive can often also brake (e.g. engine brake, regenerative braking) and there can be different brakes or types of braking (e.g. friction brakes, retarders, etc.). Here everyone is understood in principle, because it is fundamentally for here mentioned braking effect is irrelevant how it comes about. Prerequisite for certain suggestions made here is only a corresponding accuracy of the effect (in order to be able to meaningfully implement the suggestions). In a certain sense, drive and braking only differ in the sign, so drive is also understood here if only braking is mentioned. Mixed forms such as drive(s) and braking(s) are also included because they can be combined with the correct sign. Although what is mentioned here generally refers to any form of brake and drive, it is recommended as particularly advantageous that, if at least one friction brake is used, it is at least a so-called electro-mechanical brake (EMB), preferably a so-called "non-linear", which can or should also be designed to be particularly energy-saving and can or should also be designed in the course of the non-linearity in such a way that it takes the type of braking into account, i.e. e.g. consumes less power during longer braking (e.g. only as little power as e.g. can be generated, e.g. from dynamo(s)) or with short braking then possibly more current. This can be achieved, for example, by the course of the non-linearity or by springs that can help with the brake actuation. braking request As the highest-quality solution, it is proposed here that a driver's braking or deceleration request or automatic driving (both are always understood here) is picked up as directly as possible from the driver, with a driver's drive request also being picked up as directly as possible. The most direct possible pick-off points would be, for example, the brake lever or pedal and throttle grip or pedal or pedaling process (e.g. rotation, chain movement, moment, chain force, supporting force, etc.), with the best value being the combination of driver wishes, e.g. the combination of e.g. both that represents the braking wish Brake levers or a back pedal (e.g. for front wheel, rear wheel). Control commands from a corresponding machine are also to be regarded as equivalent.

A flat part inserted in the area of the rest position or rest stop of a brake lever can be used to retrofit the brake request detection(s), which distinguishes the rest position from the non-rest position, for example by changing the resistance (e.g. to ground) (e.g. a sheet metal that is isolated from ground), which gets a ground connection from the brake lever in the rest position) or it can be a potentiometer with a thin wire sensor, for example, between the brake lever and its Remove the lever movement in the rest position, or insert a sensor that records the distance between metal parts. All of the mentioned and similar parts (whatever the receiving parts are based on) can be glued on, for example, held in place by tension (e.g. clastic bands, clips, etc.). With a displacement transducer (e.g. potentiometer), the task can be that on the one hand an actuation path is measured, but on the other hand the range from the beginning of manual braking (e.g. by cable pull, hydraulics) can lie in different actuation paths depending on the brake setting. As a solution, it is also proposed that the braking effect is measured on the one hand for brake detection (e.g.

deceleration, drop in wheel speed, etc.) and on the other hand the resulting lever travel or travel range or in which lever travel range no braking effect occurs and from which point it does. This can also be done mathematically or statistically, e.g. by correlating which braking effect occurs with which path, e.g. by calculating the contribution of the electrical braking and thus, for example, an adjustment to different air gap settings of the non-electrical brake is possible. This can also be done with two brake levers, e.g. by also correlating or determining the behavior of the (respective) driver (e.g. with which distribution the two brake levers are operated). Regardless of these increases in accuracy, the electric brake can of course always contribute with sufficient braking effect or favorable braking effect or contribute in a deceleration-controlled manner.

Data Transmission

This ideal solution for the most direct driver requests can be recommended here, e.g. for the "All-Electric-Bike" shown below, by the brake levers e.g. only emit electrical brake control signals and an electric drive motor emits a drive signal to the combined vehicle control, with the transmission to e.g. a bicycle trailer for easy uncoupling, e.g. wirelessly, e.g. via infrared, magnetic fields, sound, radio.

Alternatively, it can also be recommended as advantageous that towing vehicle values such as brake actuation inputs go conductively (e.g. electrically also via e.g. contact (s) on the trailer coupling, light) to the trailer control (also brake control) and that an interrupted connection between towing vehicle and trailer can also be detected (can of course also be recognized differently or additionally, such as a rope with a switch) or conclusions can be derived from it or carried out, such as trailer braking, actions on the towing vehicle.

It is hereby recommended that not a "brake or brake control signal" is transmitted, but rather an overall signal which contains partial values such as drive signal, braking request, additional information such as brake light, cornering request (e.g. turn signal activation), possibly time stamp, location, with these values as instantaneous values and/or actuation speed are transmitted. It is hereby recommended to transmit this overall signal in a pulsed manner in order to save electrical energy on the one hand and to obtain a good signal-to-noise ratio on the other. Of course, other variants (e.g. via wire, not pulsed) are also possible and protection against the evaluation of incorrect or foreign signals not intended for the controller is recommended, which of course can also include short pulses with higher power to suppress interference. The preferred transmission of the overall signal is recommended here because there may be illogical inputs such as simultaneous brake actuation and pedaling and because the drive of a trailer or an axle, for example, should also be controlled and because e.g. turn signal activation or location (e.g. GPS) for the composite vehicle control proposed here can make a useful contribution, as well as, for example, the speed of the input actuation (e.g. it is suggested that in the case of above-average faster or noticeably different brake actuation or a change from a drive request to a brake request, braking should be designed differently, e.g. faster and/or stronger).

This actuation speed evaluation is particularly advantageous here if the overall request proves to be difficult to interpret: A possible situation would be, for example, that the rider of a bicycle with a trailer pedals slowly (even without a drive effect) and rolls downhill at a relatively constant speed with the brakes applied very lightly. The overall evaluation (as described here later) would, for example, come to the conclusion that "no trailer braking" best accommodates this driver behavior. It is therefore proposed here that a rapid change (e.g. of the braking request) can also be transmitted or produced, so that, for example, the rapid increase is now interpreted by the network vehicle control system for trailer braking or also other driver requests are transmitted, such as an activated or deactivated brake light switch or sensor.

Braking Force Adjustment in the Compound Vehicle

As a possible sub-task of the compound vehicle control, it is described here how a braking force can be adjusted on at least one wheel in an almost inelastically connected combination of towing vehicle and coupled vehicle, which of course also includes the drive force setting with a different sign: A trailer is used here as a possible example shown on a bicycle or electric bicycle, in which the braking force should be controlled as easily as possible, which requires a simple signal connection (e.g. non-electric, i.e. via deceleration measurement or impact force detection or wireless such as infrared, Magnetic field, sound, radio) but also less practical via e.g. plugs. Overrun sensors must be built into the drawbar, so they require additional parts in addition to the sensor in order to get access to force or displacement for measurement. In order to save at least the force or displacement sensor, it is suggested that a switch can also be used, e.g. with 3 positions: "pulling", "neutral", "pushing", but also, for further simplification, e.g. only "pushing" and "Pulling", whereby the switch here can quite simply consist of 2 stops (e.g. against the electrical ground), depending on whether the pulling or pushing one hits (which even allows the position in between to be recognized). Of course, springs, dampers, etc. can play a part in this. With impact sensors, a so-called zero force control is also proposed, with which the impact force is regulated towards 0 and the trailer thus "disappears" for the towing vehicle or the driver in a certain sense, at least no longer particularly pulling or pushing. Zero force is also understood here to mean that a certain impact or withdrawal can be desired or pleasant. This is also possible with the switch if you mainly regulate the "neutral position" and e.g. similar.

Everything presented here is also very much about the user perception (e.g. occupants), which of course very much includes an "adjustment" (e.g. model parameters, training, etc.) made in any way towards one that is perceived as "good", i.e. apparently a lot has to do with psychology and less with basic physics. Nevertheless, it is hereby expressly recommended to also include the physical relationships in a very decisive manner in this control, above all if they bring clarity to uncertain states, e.g. if a situation "from a physical point of view cannot be any other than What of course still leaves open the fact that the assessment based on a false assumption: e.g. a cornering acceleration of 10 g can be worked out as physically impossible, but e.g. actually occur as an impact if e.g. a curb is hit, or if e.g. a side impact accident of another vehicle has an effect. So basic physics is also dependent on assumptions here. H ere an example is suggested in which basic physics can contribute a lot (also to an overall pleasant feeling of the control): A braking request signal from autonomous driving or assistants can, for example, actually start suddenly (such as 1701 in FIG. 1), if, for example, a sudden emergency braking is requested. However, a braking request from a lever or pedal can only change with the fastest possible actuation time (such as 1702 in FIG. 1) and will normally be within a normal time response range, which can also be used to distinguish, for example, a driver's emergency braking request from his usual braking. An overrun brake signal from a switch can, for example, come suddenly or not at all (if, for example, there was already sufficient overrun for switching). "Not at all" would of course be a bad braking signal and therefore an algorithm would be proposed which, for example by using less drive or more braking, avoids that a constantly accumulating state obscures the real braking. In contrast to the switch, an impact sensor or deceleration sensor can never output an excessively rapid increase in the brake request: No matter how abruptly the towing vehicle receives a brake request, its deceleration (and that of the trailer, since this can only be brought to the brake increase later with a fine time resolution) only build up the braking effect with a certain rate of build-up, which comes, for example, from deflection of the wheel suspension, deformation (also of the tires), weight shifts or delayed deceleration of masses (also occupants) or similar. In modern cars, for example, for the above reasons, 1 g of deceleration is only built up in roughly 0.5 seconds, even with a significantly shorter "time to lock" (TTL, time in which a wheel brake torque has been increased to the locking limit). It is therefore proposed, firstly, to use the above facts in a helpful way (among other things, for example, for signal plausibility checking or filtering), but secondly, to refer to the reaction following a signal.

In FIG. 1, the braking deceleration 17 over time shows that, for example, automatic emergency braking (automatic device 1701) can change from zero to an emergency braking command in a short time (lines are deceleration commands, dashed lines are actually built-up decelerations). A driver can, e.g. in an emergency braking situation, quickly set a deceleration command 1702 on the pedal or lever (e.g. in less than 200 ms). Whether the resultant trailer braking that is as abrupt as possible is pleasant must be taken into account for the control and possibly slowed down. Dashed 1703 would follow the "fastest possible deceleration build-up of the vehicle", which, e.g. due to dead times of the electronics and overcoming the air gap, only leads to the onset of deceleration with a slight delay, then can increase with the actuating speed of the brake, but e.g. roughly close to half an emergency stop only the "dynamic wheel load shift" needs ("until the weight presses on the front wheels") and only increases more slowly, even if the front wheel is already beginning to lock up, essentially cannot increase faster than the "dynamic wheel load shift". A trailer sensor 1704 (impact sensor, deceleration sensor, deceleration measurement) can therefore not issue a braking request more quickly than is caused by the vehicle deceleration, which of course means that no faster deceleration build-up on the trailer seems possible proportional to this trailer sensor request, because the effect can only be felt after the command come. That would correspond to a favorable deceleration structure of the trailer (dashed curve 1705), which always runs behind the trailer sensor. If there are further significant dead times in the trailer brake, the trailer braking effect is shifted accordingly in time.

From this, the following recommendations for the trailer brake are suggested here: if a very rapidly increasing braking command signal is available, it can be followed as quickly as possible, possibly even faster than the towing vehicle can decelerate. If (only) a trailer sensor signal is available, the trailer brake only needs to be applied as fast as the sensor signal (including filtering, if applicable) can increase in order to be able to follow it. A trailer brake that can be actuated more quickly would not do anything up to this point, because the trailer sensor signal does due to cause-effect can lag only slightly behind the vehicle deceleration time behavior unless a glimpse into the future is possible. But you could use a "trick" and react with the trailer by over-braking 1706, i.e. increasing the trailer braking effect disproportionately quickly. This can possibly also be recommended here insofar as it could convey a quick effect, possibly combined with a possibly pleasantly perceived "pulling" of the trailer. Even the opposite could be perceived as pleasant, namely that under-braking takes place at a certain time in order to convey to a driver that he feels a trailer. This could be combined with the above overbraking, so that, for example, first a slight push emotionally supports the presence of the trailer and then, for example, conveying a stable driving behavior by "pulling". In any case, there is room here for settings that are perceived as pleasant, whatever these will be exactly. One should also assume that such sensations can take place in an astonishingly short time, even below the resolution of time and conscious perception, and the impressions conveyed are not necessarily rationally or physically understandable. Here, as in other settings, it will probably be possible to provide for the driver's wishes to be incorporated in whatever way, be it via (also driver-specific) parameters, learning (e.g. also with actuation, what is perceived as "good"), etc On the other hand, a regulation can also be very attractive, with which one can get along well "right from the start", which of course does not exclude driver wishes, but only recommends a good default state. It can also be attractive for everything shown here to include weather influences (e.g. temperature, data connection, etc.), so that braking or driving is different, e.g. weaker, on snow and ice.

Dead times in the trailer brake actuation, such as in 1707, are recommended to be avoided here, because they only bring (even pointless) deceleration, which does not have to be offset by any recognizable benefit, the cause can actually be an incorrect brake, for example, and therefore a cheap brake is suggested: with an electro-hydraulic brake, for example, more than 70 ms can elapse before any significant pressure is built up at all. With a so-called non-linear EMB, the pad actuation speed in the air gap and with weak braking is as fast as possible, so the braking effect sets in very quickly present. However, this is not offset by a physical advantage (such as less power consumption) in the slow behavior of a hydraulic brake.

It must be noted here that there are at least 2 different "optimal" trailer braking methods: Firstly, the zero-force trailer, which has a pleasant effect on the driver or the towing vehicle as it does not exist in the overrun direction, and secondly, the intentionally pushing trailer in order to brake with engine braking effect or even regeneratively to brake to charge the battery. Both are recommended here and both can be achieved here by including additional information such as the brake light or correspondingly increasing braking, which is also supported by the trailer. If the trailer can brake itself regeneratively, the optima can collapse into one as a simple solution. If regenerative braking is only possible on the towing vehicle or its engine braking is desired, the trailer naturally needs a basis for decision-making (e.g. the brake light) in order to fulfill these wishes.

A mixture of overall braking from several (e.g. regenerative and friction brakes) is known as "blending" and the methods mentioned here can of course also be understood to mean overall braking or the cumulative effects of several braking effects, regardless of how they are achieved. The following is also included in these methods: Certain braking actions can be set as preferred, such as preferred regenerative braking on certain wheels. This clarifies here that the other brakes take over the rest of the braking. The methods mentioned here are seen in this sense: There can also be specifications for certain braking or drive effects and the methods shown here are then applied to the remaining.

Other interventions are also seen as such specifications: For example, a stability control system can request more trailer braking (e.g. sway control, for example to pull back a lurching trailer) or also request more on certain wheels, also together with e.g. drive on certain wheels or also e.g. together with steering intervention or e.g. suspension or shock absorber adjustment. Such interventions are possible here and can, for example, completely or partially overlay, influence or disable the methods shown, or also function cooperatively with the methods shown, so that the methods shown continue to contribute a remainder. Mathematically, an overrun brake can also be completely dispensed with an overrun sensor (which is also recommended here as particularly advantageous): Since a force from acceleration or deceleration is equal to mass times acceleration, the pushing force of the unbraked trailer when decelerating is equal to its mass times deceleration, whereby the deceleration can also come from a component of the gravitational acceleration (e.g. when driving downhill). If you subtract the total braking force you just set, you are left with the overrun force. Exactly this approach is also suggested here as a good option, which will be further expanded and improved in the following. Of course, the same sign always applies to the drive, with the correct sign. To do this, you need brakes (whereby in addition to regenerative braking, an EMB is also proposed in particular) or a drive for which the braking force or driving force can at least be reasonably estimated and an estimate of the trailer mass.

A car and trailer rolling downwards at a constant speed would see a force or deceleration component in the direction of travel, which could lead to constant braking, which is a known problem with overrun brakes, for example (even if engine braking would be sufficient and even preferred by the driver, overrun brakes then brake and wear out accordingly). This can also be very undesirable with bicycles if you want to take advantage of the unbraked rolling downhill. For this purpose, a local solution algorithm that works independently, e.g. in the trailer or on a wheel, is proposed here: from the change in the speed over the ground (here called ground speed, GS) and the acceleration (e.g. in the direction of travel and/or in several axes to or from it) . . . from the impact force), as shown here, a number of things can be calculated, especially if sensible assumptions are also used, such as the fact that a road gradient rarely changes suddenly. It is therefore recommended, for example, to deduce the position of the actual horizontal (to earth) from the acceleration or impact force when the GS remains approximately the same. However, a better model is also proposed that also allows changes to the GS and suppresses disturbances such as vibrations in the GS or acceleration or impact forces or vibrations caused by e.g. paved roads.

The method proposed here can also take into account whether you prefer Optimum 1 (zero force trailer) or Optimum 2 (certain pushing effect for e.g. regenerative Braking or engine braking on the towing vehicle) is aimed at, for which purpose the brake light switch can be used, for example, or, for example, the motor or generator state of the electric motor (the vehicle drive) and it can or should also be taken into account that below a certain speed the electric motor does not have sufficient voltage to charge the battery delivers more and therefore the friction braking effect should even be increased in this area, especially if, for example, the charging current decreases or even turns into countercurrent braking.

Since the driver generally perceives a zero-force state "no trailer can be felt pushing or pulling" as advantageous (or at least not obviously disadvantageous except for engine braking), it is proposed that the algorithms mentioned here, for example, assume this zero-force state if no better decision is made, if, for example, there is no brake light or brake request signal. It is also recommended that this assumption may also depend on data (e.g. about the road, whether e.g. whether a curve is to be expected) or on statistics (e.g. at what gradient and what speed such vehicles are usually operated and how, e.g. coasting unbraked or braked more or less hard). A trailer brake system of the proposed type can therefore find a comfortable (or, as far as possible, safe) brake or drive setting without any kind of data reference from the towing vehicle.

Another particularly advantageous method is to deliberately adjust the trailer braking (friction brake and/or other brakes, e.g. via an electric machine) partially, completely or predominantly in the area of pulling drawbar force, whereby the driver's request can also be included in the strength of the trailer braking effect (e.g. via brake levers, pedal, brake light switch, determination of deceleration or force or forces) and/or stability control or ABS. Pulling trailer braking (also taking into account the driver's braking request) can promote stability, especially in the case of, for example, single-track, light towing vehicles or those that tend to have stability problems. Since a pulling trailer brake can overtax the stability of the trailer prematurely, in particular can cause the trailer wheel(s) to lock, it is beneficial to prevent this with ABS and/or ESC. This can be easily brought about, promoting overall stability, that at least the trailer brakes strongly in the overall network up to optimal at the stability or blocking limit.

It is therefore proposed for braking purposes (the same can also be used for drive purposes with the correct sign), as is known for trailer braking, to determine at least one force pointing in the direction of travel, e.g. an overrun force or deceleration force, or to measure deceleration, here is now only used equally for all "delay". Since vehicle deceleration and gravitational acceleration cannot be distinguished up to this point, the GS (e.g. via wheel speed) is also measured here. A deceleration that results from an uphill or downhill gradient can thus be distinguished from a deceleration achieved by braking, although the assumption is also made here that the uphill or downhill gradient does not change quickly. There are many ways in which this calculation can be performed accurately, e.g. one can build a slope model that explains the measured deceleration and roughly constant velocity. If braking is added, this can be seen on this model, but only as a change in relation to roughly the same speed and incline. From this and from the slope model, the following is now derived: A slope is detected: With this, e.g. a certain trailer braking effect can be activated, which can depend on influences such as e.g. trailer mass (e.g. determined via wheel or axle loads or deflection) and e.g. the brake light Only release this braking when it is signaled that you want to drive down the slope with the brakes applied and not, for example, with engine braking or air resistance. Of course, this model can be refined as desired, e.g. that it also allows variable speeds and gradients, and assumptions may have to be made. The connections between e.g. distance, speed, acceleration, time, force etc. are all known. Of course, basically everything can contribute to determining the gradient, such as data (also with GPS) and/or e.g.

magnetic field sensors, which come to an evaluation via the angle of the earth's magnetic field lines to the vertical.

Determination of spring deflection is, of course, usual for trailers with brakes, for example, in order to adjust the braking effect to the weight. Here, of course, the electric output is preferred. In order to reduce the susceptibility to failure, complexity and costs of further sensors, it is proposed here that a previously planned for this system A multi-axis sensor (such as that used in mobile phones) or, of course, an additional one can also be mounted on the wheel suspension: When loading (e.g. getting in) it could be determined that the angle of a wheel suspension part changes slightly and while driving it could also affect the vibration behavior of this partially react. Nevertheless, deceleration or acceleration components can still be made available in the quality required for this control, e.g. by filtering out vibrations or calculating a specific component, e.g. in the direction of travel, or the sensor can also be attached in such a way that the desired component (e.g. in the direction of travel) is also available simply or without calculation with sufficient accuracy. As an interesting possibility, it is also proposed that the vibration behavior of the trailer (or vehicle) is evaluated: It must be a damped spring-mass system that has a corresponding, known vibration behavior, although of course in principle in known contexts with more mass a lower vibration frequency occurs. An analysis of the vibrations (e.g. when boarding, on bumps, etc.) thus allows conclusions to be drawn about the mass. This analysis does not necessarily have to be a complex Fourier analysis, for example. A simple model can also be adjusted until you achieve congruent behavior, for example by adjusting a simple low-pass filter in the time response. Of course, something similar can also be done in other components, for example using drive force (brake force) and vehicle reaction to estimate mass or vibrations or transients in this or another direction.

To refine the brake control, the drive could also signal that there is no drive and therefore, for example, the brake can be released. If, as proposed, the GS is also used, an additional braking effect that occurs can advantageously be recognized and supported by actuating the trailer brakes. The GS, which is now reduced by a real deceleration in terms of speed, can in turn contribute to the model in such a way that the state of deceleration, gradient and vehicle speed reduction can be converted into a correct model. As a result of the deceleration observation, an additional deceleration that can be determined can now also be transferred to the control of trailer braking and, for example, heavy braking or even emergency braking can be brought about. Now the additionally created braking effect would do that Destabilize overall behavior because this results in more overall deceleration and even more additional trailer braking would be set. It is proposed to stabilize this by subtracting out or compensating for the proportion of additional trailer braking. This method can be used to control or regulate trailer braking without detecting the braking force of the driver (e.g. through pedal force, lever force, position), which has the advantage of not having to intervene or query or transmit the braking request. Since the conditions in the combination vehicle are the same or similar enough everywhere, the above term "trailer" refers to every point in the combination vehicle, including, for example, a towing vehicle axle that has not yet been braked. Of course one can include the desire of a driver or autonomous driving or the change or rate of change or strength in order to improve the method shown here.

In the case of a bicycle compound vehicle (e.g. trailer), the solution to the problem of acceleration, deceleration and change in GS caused by pedaling is still proposed here: These vibrations could cause periodic, unwanted braking of the trailer. The following methods are therefore proposed to avoid this: First, the periodic acceleration-deceleration can be determined and it is therefore proposed to compensate for it by calculation. Secondly, it is proposed that the assumption is also used that pedaling accelerates but does not decelerate, or that the deceleration comes only from the total driving resistance and incline. Based on this knowledge, it is proposed to use any deviation from this knowledge to activate the trailer brakes: if there is suddenly no more drive vibration, this does not necessarily mean that the driver wants to brake, for example. If, however, taking into account the incline model and possibly the pedaling vibration model, more is recognized than the absence of the drive vibration, this can be worked out as a braking request according to the proposal. Accordingly, it is also proposed that one (possibly based on additional assumptions) can also detect additionally initiated braking with a minimum or maximum finding, e.g. under the assumption that every greater deceleration than in the non-occurring phase is caused by an additional braking will come. This allows you to immediately recognize an intended braking and does not have to wait for a period of a pedaling vibration to elapse in order to compensate for the pedaling vibration.

In addition or as an alternative to the above control, it is recommended to react to significant events as promptly as possible, e.g. to apply the trailer brake accordingly in the event of strong or sudden deceleration, because it could be interpreted as emergency braking, for example. Likewise, a similar decreasing deceleration can be interpreted, for example, as a general release of the brakes and can also be directed to the trailer brakes. There are many evaluation or categorization measures to classify such. For example, an attractive possibility would be the delay integral (or similar values): this would give a short strong delay a high evaluation, as would a longer but weaker one. Here, too, the use of additional information is suggested, such as the brake light or the actuation speed or strength of the brake lever or e.g. sudden loss of drive, which can be categorized similarly to deceleration as described above.

Up to this point, the scientific principles have been applied, but for acceptance, the feelings of customers and drivers will have to be taken into account. Therefore, it is suggested that the above solution can or even should be solved differently than by modeling or calculation: one can use a kind of fuzzy logic, for example, which is based on fuzzy values such as "strong", "weak" etc. or we do it here even recommended a method that seems to work without a basis: for example, a neural network or "deep learning" can be trained to solve the above task. However, the above task was nevertheless solved in physical terms, it is just not recognizable how the functions are distributed. (By the way, even with a more complex machine code, the actual functionality is difficult to no longer reasonably fathomable.) This method is also proposed, for example, to avoid having to install constant improvements and changes to the model representation or calculation for vehicles. Instead, with adaptive implementations, for example through training, more and more cases can be solved in such a way that customers and drivers find them pleasant without constantly developing improved models. This ability to learn can also be maintained to a certain extent, so that further adjustments, for example at the customer, remain possible. Here, too, it can be suggested that additional information influences, such as brake light, driving force, brake request, etc. In terms of a neural network, everything can of course be understood that results from the setting of internal parameters or weights from the input data to the output result, including the simulation of a neural network with software on a processor or a program, which fulfills this function. Such a controller 10 or regulation is shown in FIG Go, digitally, via bus(s) into the controller 10, which can also output 102 outputs such as lights (e.g. lights, brake lights, indicators), sounds, images and can communicate with other controllers 106 such as drive, suspension and also electrical Can carry out brake controls 105 and also consider vehicle properties 106 or can determine. A non-electrical actuation 107 can be present, which acts, for example, if the electrical fails, or for support, for example, from a hand lever, a foot pedal or overrun force.

Since user acceptance (of at least one person in the towing vehicle or towed vehicle) plays a very important role here, it is also proposed that important influencing variables for user acceptance can also be used in this method or can also be set or changed by users and/or (also automatically) can be learned from the process. This includes, for example, whether the trailer should give the impression of being slightly withdrawn, slightly procrastinating, or completely neutral, or whether this behavior should change, e.g. with speed, or whether, for example, the driver should be given a more constant braking experience, although the control could actually come to a different conclusion: Here it is suggested, for example, that a bicycle braked almost to a standstill could possibly be relieved (e.g. by putting your feet on the ground or even dismounting) and with a relieved bicycle much less accumulated force of a trailer can be absorbed and thus control systems (or regulations) based on acceleration or deceleration would come to the conclusion that less braking would be required. Now, for example, the unloaded bicycle could be pushed away from under the driver, even if the residual speed may be very low. It is therefore proposed to influence this in itself although physically conclusive behavior so that, for example, braking up to standstill is maintained and possibly even after standstill, so that it should not come as a surprise that suddenly the brakes are released and the thrust or traction occurs again. Another suggestion for influencing is, for example, that more trailer braking effect is set depending on the weather: with slippery leaves, wet, slippery road surfaces (possibly even on ground markings), for example, more trailer braking effect on a two-lane trailer, for example, can produce a more stable behavior of the entire combination, if e.g. with the single-track bicycle there is less braking and a tendency to lock up.

Figures 12, 13:
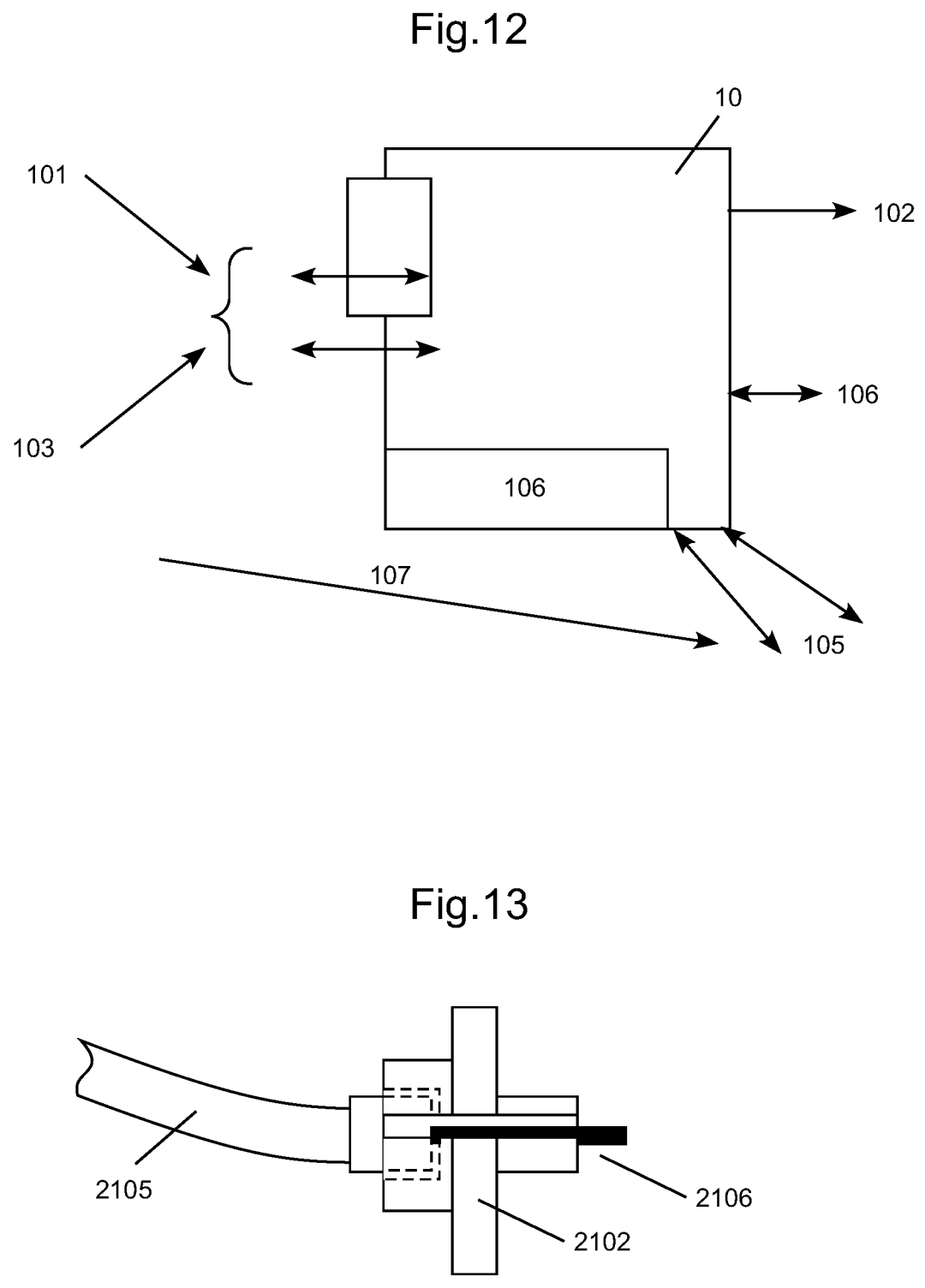

A driver braking request detection, e.g. in the form of an actuation measuring device 2605 as in FIG. 18, on the pedal or lever can either already be present, such as the hydraulic pressure of a brake or the pedal travel. An easy upgrade could be e.g. as in FIG. 13 with a small slotted part that can be pushed over an inner brake cable 2105 and on one side can accommodate the nipple of a cable (on e.g. an inner cable 2106) and on the other another offers a nipple shape that can fit e.g. in a brake lever or e.g. a brake:

This part according to FIG. 13 may contain a force sensor 2102 as in FIG. 10, which measures the force which the nipple on the outer sleeve of the brake cable (left) generates when the brake lever pulls on the inner cable. Of course, you could also simply convert other parts, such as using a brake cable that changes electrically and measurably on tensile force. A U-shaped, hollow second brake lever open at the U could also be placed over the handbrake lever, so that there is a force-dependent body in between, which changes in an electrically measurable way.

It is stated here that the at least one EMB can be used here both without non-electrical actuation and with non-electrical actuation: An EMB can therefore be controlled purely electrically or (e.g. for safety reasons) also have mechanical or pressure actuation. The non-electrical actuation can, for example, only take effect if the electrical actuation is not or not sufficiently actuated, e.g. a cable pull or pressure cylinder can only actuate the brake if, for example, the lever or pedal is more traveled than with a functioning electrical actuation. A force simulator that forms a familiar actuating force even with electrical actuation will be preferred. Both the force simulator and the transducer for the In principle, electrical actuation can be anywhere, e.g. on/in the lever, on/in the brake. As another variant, it is proposed that the electrical actuation acts as a support to the other (mechanical, pressure), i.e. similar to a current servo brake with vacuum, adding a support force resulting from the pressure difference to the driver's force. Here, the support power is of course generated electrically with the EMB and a regulation or control determines how much support the driver gets. The force simulator can possibly be saved because the driver always has to bring in some force himself. Of course, at least one purely electrically actuated brake (EMB) can also be used, which does not allow any other actuation, or non-electrically actuated brakes can also be present. The non-electrical actuation does not have to come from the driver either, it can also come from an overrun or deceleration force or movement, for example. Advantageously, the control or regulation described here is also designed in such a way that it can also cope with inputs or sensors that have failed or are classified as "strange", for example by using default values, mean values, substitute values or values that are found to be favorable from other data are identifiable, used.

Of course, the control or regulation described here advantageously also uses the "vehicle mass" (e.g. for braking effect control), which is more precisely referred to here as "vehicle property", because it can also be used with better resolution than, for example, axle load, wheel load, center of gravity, etc. They can be determined as described, for example, or from other sources such as wheel slip, premature locking or spinning (also related to the set braking or driving effect), vehicle behavior under forces or accelerations, i.e. e.g. inclined positions, acceleration under driving force or deceleration under braking force.

So-called "sensor fusion" is also recommended for the input variables used here, i.e. the improvement of values through the use of several input variables or the generation of values in this way. This can also be done using fuzzy logic or neural networks or deep learning or the like, because these methods are well suited to processing or linking different variables. Of course, all values can refer to the entire compound vehicle as well as to parts of it, for example the trailer, regardless of how they were obtained or where they come from. It is also recommended to differentiate between braking effect and brake light: A brake light switch can be in the hydraulic circuit of the brake, for example, and can respond at a certain pressure and thus be associated with a braking effect. Especially with me. When the brakes are actuated, however, the switch is usually triggered very early on when the lever or pedal is moved, so that it also triggers reliably in the event of tolerances, and the switch often gives a brake light signal before the brake becomes effective and has nothing to do with the strength of the braking effect, yes, strictly speaking, not First of all, that braking will follow, because the driver could also let go again. Nevertheless, it is recommended here to use any usable type of brake light switch for trailer brake control, as well as a meaningful signal via drive if possible.

Figure 14:
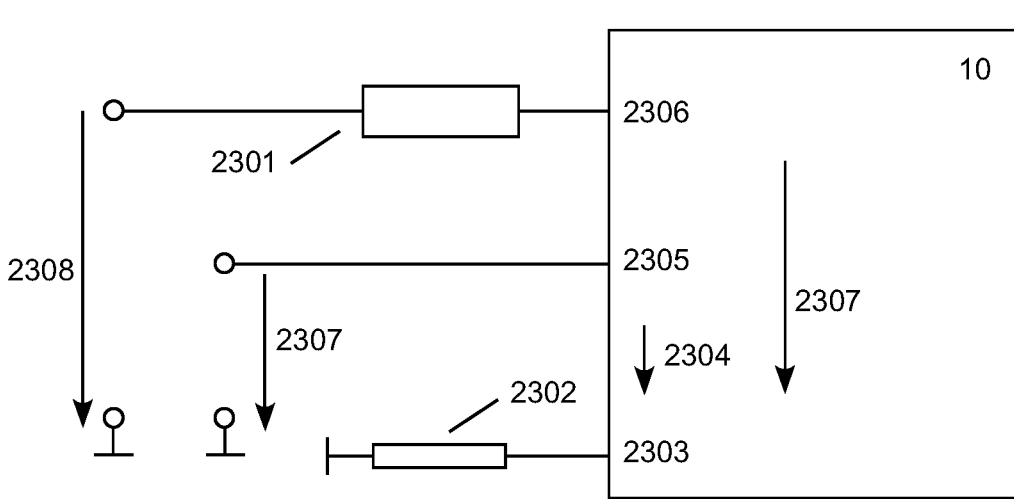
FIG. 14 shows a schematic of voltage drops and unavoidable resistances.

Finally, a brake-determining value, e.g. the brake actuation signal 2611 as in FIG. 18, is applied to the brake (or its control or regulation) from all the input variables determining the braking effect, which can be digital or analogue and can of course also include wireless routes. Analog would be e.g. as amplitude or pulse duration of a PWM. It is recommended here to secure digital signals, e.g. using checksums or alive counters. Analog signals can, for example, be protected by valid value ranges. In FIG. 14 it is also recommended to reduce the following possibilities of interference with analog signals:

14 shows that the EMB supply voltage (external supply voltage 2308, internal supply voltage connection 2306, internal supply voltage 2307) contains unavoidable resistances that are combined in one (2301) for this purpose. There are also unavoidable resistances in the ground line or connection (combined in a 2302 for this purpose), which, for example when using the vehicle ground, can be smaller than those in the supply. If the EMB now requires more current through actuation, the internal EMB gnd 2303 moves to a slightly increased voltage due to the increasing voltage drop at 2302 and from the point of view of the EMB, the control variable 2304, e.g. analog voltage, recognizable inside at the control input 2305 would now be lower, although the external control variable (e.g. voltage) 2307 has remained the same. This can lead to instabilities and oscillations because the EMB would now reduce braking (from the point of view of the external control variable), and if the power consumption of the EMB should now drop, more internal control voltage can be used to control it again. Here it is suggested that To model the current dependence of the internal control voltage in the EMB electronics (and to find the model parameters when driving the EMB) and to apply the best possible canceling compensation. The reaction of the internal supply voltage 2307 can also be included and tests are proposed, such as short-term changes in the EMB supply current, in order to observe and model the resulting change in the internal control voltage or to derive a favorable compensation. The short-term change in current could be caused, for example, with the motor of the EMB, in which, for example, the EMB (minimal if cheap) is released in the range of fractions of a second or shorter and then operated again quickly (minimal if necessary) or, for example, another short current impulse is triggered. Of course, a current change occurring during the brake actuation (or the release) can also be used, for example due to a slightly abrupt change in the motor position. Short pulses are recommended because the braking effect specification can be assumed to be quite constant during this time. A current that varies as little as possible via the brake actuation in turn helps to reduce the resulting voltage drop and thus the undesirable behavior-which is why the use of a transmission ratio that can be varied via the actuation is recommended here. For particularly good compensation of the effect of increasing the EMB ground, it is suggested that this resistance is of course kept low on the one hand, but on the other hand that the EMB electronics also know about the current in the EMB, can measure it or use internal current values (e.g. phase currents, Iq). (also by including the supply voltage) and from the current measurement and the modeled or otherwise taken into account Rgnd can correct the internal control variable measurable in the EMI in such a way that the external control variable can be deduced and instabilities can be compensated or prevented will. There are, of course, other ways of recognizing and reducing the effect of Rgnd, e.g. a model Rgnd could be changed in the model (for compensation) until the unstable behavior disappears or appears. It is mainly about correctly understanding or depicting the relationships in this behavior and then taking the physical countermeasures. It is recommended that the effect of multiple EMBs is also considered and compensated for based on the above. For this purpose, for example, several EMBs can be supplied from one EMB electronics, whereby the above effects are also treated for several connected EMBs as described above, or an EMB electronics works and compensates as described above and forwards the control signal digitally (whereby the digitally controlled from are freed from this problem), or the EMB electronics include the effect of the other EMBs, e.g. by exchanging data such as the current current. It is also recommended to provide a hysteresis in the voltage measurement input of the EMB-Electronics: put simply, a voltage (or quantity) is only recognized as falling if, after rising, it falls below the hysteresis value for "falling" and only then as rising if, after falling, it exceeds the hysteresis value for rising. This suppresses interference that remains within the hysteresis, including those from the Rgnd effect. Of course, if the hysteresis is to be small or zero, the above compensation becomes important.

As an alternative or in addition to the above, the braking can also be controlled by controlling the current and the control current can be measured in the EMB, which favorably should be little or not affected by the increase in the EMB's internal reference ground.

If a pulse duration is used as an analog control variable, the above problem of voltage measurement does not arise. However, it may be the case that the conditions for time measurement are unclear or cause interference, e.g. In particular, control units can generate a supposed PWM for controlling magnets in brakes, for example, which causes a current that varies on average, but cannot be evaluated well as PWM. In this case, it is proposed here to also average these curves again for EMB control in order to avoid misinterpretation due to pulse time measurements. We particularly recommend, for example, low-pass filters of a higher order or number of pole pairs, because they can be used to combine good smoothing with a short throughput time through the filter.

However, the advantage of the voltage independence of the pulse duration would be lost as a result of this variable mean value signal and the averaging. Therefore, the inclusion of the above procedure is recommended, but also the Use of the following information: Such mean-value variable voltage curves are usually generated from a supply voltage, so that finding a peak value allows conclusions to be drawn about the supply voltage. If the control signal measured in the EMB changes due to the resistance in front of the EMB's internal ground reference point, the knowledge that the peak value already played a role in the production of the signal can be corrected by also measuring the peak value of the Signal is used, for example by a peak value rectification or sampling method. The amplification of a low-pass filter for averaging is of course taken into account when comparing it with the peak value or, for example, designed in such a way that it delivers the same value as the peak value for lower frequencies or DC voltage.

Figure 15:
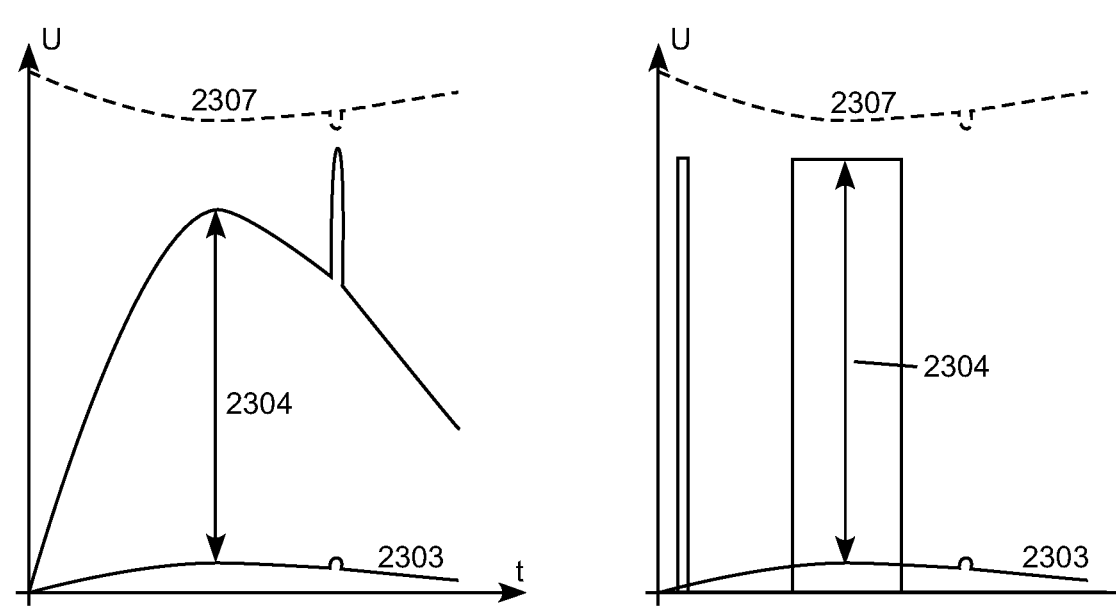
FIG. 15 shows schematically how analog voltages (left) and pulse duration control behave, FIG. 16 schematically shows an advantageous embodiment of a drum brake with components, FIG. 17 schematically shows possible actuation speeds of the brake(s) as a delay over time.

In FIG. 15 on the left, the voltage (y-axis) over the current (x-axis) shows how the control voltage 2204 (double arrow) visible in the brake with analog brake control voltage apparently decreases because the mass of the brake (internal EMB gnd 2303) is raised by current. This can be counteracted, since the voltage drop at Rend is current times resistance and the current can be measured, estimated or known and the short-term change in a control voltage that is assumed to be constant for a short time can be constantly observed for a change in current. This allows Rgnd to be determined or estimated and compensated for. Of course, the calculation or estimation can also take place differently in terms of the known physical relationships.

The right of FIG. 15 shows that this problem does not occur when the braking effect is controlled by pulse duration control, because the time duration and not the voltage is used. However, it can be very advantageous to average or integrate the pulse durations (whatever) or similar, in order to be able to cope with the curve shape. The voltage problem then occurs again in the averaging and can of course be compensated for as described above. In addition, the assumption can be used that the peak values of the pulses could actually always be the same, and the seemingly smaller pulse peak (due to Rgnd) can be used as compensation in relation to the pulse peak that actually remains the same.

The behavior of the supply voltage (here internal supply voltage 2307) can also be included in the above method. For example, there may be a current measurement in the overall supply of the brakes that shows the Performs procedures and compensations and could also pass on the brake signal digitally. However, the brakes could also communicate with each other and communicate values such as currents, so that each one (or in groups or as a whole) can apply these compensations and processes. The assumption that the pulses had the same or similar peak values when they were generated can of course also be abandoned, rejected or improved, for example in connection with the described determination of the Rgnd from the current or from other observations such as the supply voltage. The use of hysteresis is also recommended, which means that changes below this have no effect. Other consumers (e.g. indicators, brake lights, lighting, etc.) also cause voltage drops at resistors located in the ground connection, for example. It is recommended that these influences are also determined (as far as possible), e.g. under the assumption that sudden changes in the supply voltage recognizable in the control unit are due to consumer currents that can be distinguished, for example, by knowing their own current. For example, the current from the brake lights can cause a change in the supply voltage first, and then the current from the brake(s). It can therefore also be a recommendation to record all (or all relevant) currents in a device or alternatively or also the mass current. It is easier to use consumers with low power consumption, such as LEDs.

It can also be expected that a brake control unit will send short test pulses in order to test the line to the brake or EMB electronics for freedom from interruptions or even short circuits or faults. These test pulses can be so short that they have no particular braking effect, but they can cause noise, such as periodic ticking. As a countermeasure, it is recommended to keep such an impulse away from the brake control. In addition, an expectation time can be used, for example, in which no more test pulse is expected. After this time has elapsed, a short impulse would again be classified as a test impulse and kept away from the brake control, and during the time lapse all curves would always act as a control. In addition or as an alternative, the possibility is also proposed not to classify certain time or amplitude profiles as intentional braking and to keep them away. For example, it can be assumed that a real braking Time course of the increase and a test pulse is, for example, steeper. Of course, this course detection can also be combined with the above time-controlled keeping away. A (possibly variable) hysteresis can also be additionally or alternatively recommended in order to avoid or reduce this instability described above.

If averaging described above (e.g. low-pass filter) is used, it is hereby recommended that when a test pulse is detected, the averaging or filter is reset to clear the value caused by the test pulse. There is (e.g. US trailers) a standardized or established control connection from the towing vehicle to the trailer, which actually uses a controllable current for solenoid-actuated brakes as trailer brake control, which today is usually transmitted as 12V pulse duration modulation. Now it is suggested that in such or similar cases or if other analogue signals are used, this established control connection can also be used for digital signals: As soon as a digital connection between the brake control unit and the electronics of the EMB becomes possible, it can be used, otherwise it will previously used signal. For this purpose, for example, a digital communication attempt can be made between the brake control unit and the electronics of the EMB (e.g. also when switching on or at other times), or a digital communication signal can be modulated onto an analog one, for example, or pulse width modulation can be designed in such a way that digital communication data is also included in it can be accommodated, for example by recognizable pulse lengths. The electronics of the EMB could, for example, also send a digital communication signal and thus invite the brake control unit to switch to digital communication or to use it additionally. The test pulse described above can also be designed as digital communication in order to determine the ability of the brakes to communicate. Not all brakes have to be operated with digital communication, some can continue to be operated as established. It is also possible for just one brake controller to communicate analogously or digitally with the towing vehicle, but in any case a digital exchange and comparison between several brakes can take place (either all with equal rights or master-slave). With digital communication, the electronics of the EMB can of course also report states in the EMB (e.g. temperatures, braking torque, errors, diagnostics, etc.) and it can, for example, be a brake control unit Address the brakes in a targeted manner, individually or in groups, for example to brake for individual wheels, for example for ABS. Of course, this can be done on all vehicles, not just US trailers, and how digital and analog communications can run side by side opens up many possibilities.

Advantageously, values that have already become known during operation of the EMB (e.g. current, speed during e.g. actuation) can be used in order to use changed settings or parameters in the future (e.g. to release the brake more slowly in order to be able to stop the release movement more easily). In the case of measured values with poor resolution (e.g. if only certain HAL sensor positions can be measured), calculation methods can produce better values (e.g. "Observer"), but in particular with variables that are difficult to derive (e.g. slow speed from jumping HAL sensor positions), the actuator motor control can also be used be brought into another, suitable operation, which e.g. only rotates the rotary field without using a determined speed for this. The current can also be increased, for example, until the rotor rotates.

"All Electric Bike"

To use the EMBs on bicycles, bicycle trailers, etc., it is proposed here to set up a stable on-board voltage network, similar to that of motor vehicles, with the only difference that it preferably comes from at least one electrochemical voltage source (e.g. rechargeable battery, battery) and preferably also from generators is fed, which use available energy sources such as drive-driven generators (e.g. wheel hub dynamo), photovoltaics, electrical, magnetic or electromagnetic fields (e.g. magnetic stray fields from power lines in coils e.g. the wheel hub dynamo coils induce a small voltage that can be tapped with high resistance). An advantageous embodiment is, for example, with small photovoltaics, for example on a fairing favorable to the relative wind, two wheel hub dynamos and two lithium batteries, with the double design offering security against power failure (other combinations can also be used or a simple design) and the photovoltaic feeds both, for example. An advantageous circuit is, for example, such that an unusable battery (failure, short circuit, safety shutdown) does not impede the entire vehicle electrical system in a safety or functionally relevant manner, i.e. other electrical sources classified as important, for example functions can operate. If necessary, the consumers are also distributed among the vehicle electrical systems in such a way that not all vehicle electrical systems are affected at the same time in the event of problems in consumers (e.g. short circuit, overload, etc.) and at least a required minimum of safety functions (e.g. braking effect) is maintained. Consumers that are connected to all vehicle electrical systems should advantageously be designed internally in such a way that they do not impair all of these vehicle electrical systems in the event of internal malfunctions (e.g. short circuits). Consumers can be adapted to the performance of at least one vehicle electrical system, such as non-linear EMB, possibly self-boosting (including drum brakes, servo drum brakes), with at least one spring that interacts with the electric actuator. The non-linearity can be designed in such a way that the electrical power consumption is low during long continuous braking, even so low that it can be supplied by the ongoing power generation, such as from the at least one wheel hub dynamo. In return, short, sharp braking can take place through the design of the non-linearity from an electricity storage device, e.g. a battery, which is then recharged. In addition to this at least one on-board power supply system, preference is also given to using an on-board data system which connects the individual functions to one another, for example at least one CAN or other bus or wireless transmission. Here, too, more than one bus or data transmission system can be used for safety reasons; one bus can also be openly accessible for other devices and another bus exclusively for safety-related functions.

This vehicle electrical system will supply the most electrified actuators possible, such as electric friction brakes (e.g. electromechanical, electrohydraulic), electric gear shifting, the controls thereof (e.g. ABS, parking brake, interaction of several brakes, automatic gear shifting or automatic translation adjustment, "blending"—i.e. the interaction of regenerative braking and other brakes such as friction brakes, if necessary drive control (e.g. electric motor) and lights such as headlights, parking lights, rear lights, brake lights, indicators etc. and additional consumers such as a mobile phone charging connection.

On the one hand, a display similar to a more or less small dashboard is proposed here, on the other hand, however, that the displays have a Mobile phone or tablet computer because the values can also be stored here and evaluated later and on the other hand because, for example, GPS and route planning can be included and calculations can be made, for example an "optimal" speed, for example based on optimal operation of the drive machine (why? In principle, the human being also counts), the current translation selection and possibly automatic adjustment of it and, for example, under current environmental data such as headwind, temperatures and specifications such as, for example, maximum travel duration. The mobile phone is also suggested in order to keep the risk of theft on the bike low.

It is also proposed to accommodate the mobile phone in a mechanically stable manner, e.g. by means of a holder, e.g. at or under a possible fairing that is favorable to the airstream. The mobile phone can advantageously also be used for data communication, e.g. as an "ignition key" (e.g. for readiness to drive if the correct app, paired with the correct complete vehicle (or part vehicle(s), such as bike, bike trailer) identifies the legal driver, for which e.g. also Encryption and/or entry in database is recommended), display of bicycle data, navigation, communication with infrastructure, people or other vehicles, also with a trailer, etc.

Inexpensive and easily accessible measured values are particularly advantageous, such as ground speed from, for example, the frequency of at least one wheel hub dynamo and/or from GPS, the "air speed" (wind speed), preferably from devices without moving parts, e.g. from a characteristic curve determined air speed from the heating output of a temperature-dependent resistance (and possibly the air data such as temperature and pressure), which can also be accommodated in a streamlined manner, e.g., such as in a headlight housing. The recording and, if desired, display of this air speed is recommended insofar as the propulsion force of a body moving in air resistance increases with the square of the speed and the propulsion power even with the third power. It makes a big difference, for example, whether you ride with a wind that is otherwise hardly noticeable, for example 10 km/h as a headwind or with a tailwind (with a bicycle, for example) with a GS of 20 km/h. You can (similar to airplanes) one Use "indicated air speed" and/or a "calibrated air speed", whereby the "indicated" may not yet have any compensation for the air pressure (or air density), for example, but the "calibrated" may already be compensated for in this regard. The "indicated" would have the advantage that it can be subjectively more correct if, for example, less air speed is indicated due to lower air pressure (or air density) and at the same time the driver feels less resistance caused by air pressure (or air density).

It is also proposed that, in addition to the usual (e.g. GS), the driver should also be offered the meaningful air speed for display (or storage or further processing) or values that can be derived from it, such as drive torque or drive power. These two would otherwise only be measurable with more effort (e.g. by torque measurement in the drive), but if the proportion of the current air resistance (via air speed) is known, they can be determined without additional measuring equipment, especially if the driver is offered a calibration, e.g. that he is on a known incline includes the speed achieved without pedaling or e.g. table values (e.g. height, weight).

With this vehicle electrical system, safety-enhancing functions can also be implemented, such as favorable braking effect distribution on the wheels (also on trailers), avoiding rollover, locking wheels, energy-efficient regenerative braking ("blending"). For safety reasons, these safety-enhancing functions can also be carried out by suitable electronics (HW, SW) remaining on the vehicle, but operation on a mobile phone, for example, would also be possible if a correspondingly safe process (e.g. using an app) is possible. "Safety-capable" can be, for example, that a vehicle may be operated without this safety function (e.g. a bicycle without rollover protection if the front wheel brakes are too strong or ABS) and also with this function in addition, whereby e.g. this function does not (can) cause any additional safety problems to the appropriate extent. allowed.

An "all electric bike" does not have to have two wheels (it can have any shape and number of wheels), it is characterized above all by the fact that a sensible supplement or combination of muscle power is provided by other, preferably electrical energy, which either supports the drive or takes over or just supplies other functions, such as braking. The pure possibility of driving with muscle power is also one of them, even if it is not used. Many of the suggestions made here can also be used without muscle power.

The muscle power does not have to act directly on the drive, it can also be used to generate electricity and it can also be done by several people. So you can e.g. the mech. Save power transmission and, for example, by controlling or regulating power generation and electric drive, offer the driver an optimal or comfortable pedal setting, similar to an automatic transmission. This can also be saved by charging the battery and used at any time, even later. Both power generation and power storage can, for example, also be made available as a power supply for other purposes, e.g. via plugs, e.g. as a 12V camping supply, USB supply, but also all other supplies that can also be switchable or adjustable, including mains voltage (here the necessary safety devices are recommended), also as an emergency power supply. The inclusion of additional sources is also recommended here as possible, such as photovoltaics (on the vehicle or additionally) or others such as fuel cells with e.g. camping gas or charging devices for the vehicle battery (e.g. from the mains or 12V). Bidirectional converters are also recommended, e.g. for the grid and vehicle battery, whereby e.g. both battery charging and (converted) battery power delivery to a grid or consumer can take place.

Of course, this electrical use of human power also opens up other possibilities, such as the suggestion here that the vehicle may also be used as a fitness device, home trainer or similar, for example, and that the electricity generated be stored or fed in and, if necessary, displays on the Vehicle represents performance, work, speed or also, for example, the animation of a landscape in front of the training one on a screen.

Bicycles today usually have no lights apart from the lighting. Here it is proposed that bicycles, their trailers, etc. in addition to more stable lighting (through on-board power supply and fixed installation on the vehicle), the usual functions such as brake lights and indicators, possibly also hazard warning lights or rear lights (similar to reversing lights). Standards and laws can conflict with this, for example if no brake light is prescribed, but this also means that it is not allowed to have its own brake light. In such cases, it is suggested that the effect of such security-promoting Brings lights in accordance with the law and, for example, increases the brightness of the red rear light with a certain braking effect or actuation or, for example, changes the brightness of part of the red rear light to the extent that this is permissible and beneficial when flashing. Radio control of lights (brake lights, indicators, etc.) has already been proposed, for example, in U.S. Pat. No. 4,859,982 for trailers and in DE000002726322A1 for bicycle headgear. It is therefore proposed here that both light-emitting parts that are permanently mounted on the vehicle and light-emitting parts that are not part of the vehicle can be controlled arbitrarily, i.e. wirelessly, e.g. to promote safety or attention and, if necessary, to solve the task of legal conformity, i.e. whether it must or may not be part of the vehicle (and e.g. as a transported object may not be permanently combined with the vehicle), with which e.g. persons (driver, co-driver, passengers) or objects, even animals, are provided with lighting devices such as e.g. Jackets, helmets, collars, bracelets, clastic bands (there are no limits to how they can be attached) or light devices are incorporated or the light devices become part of the vehicle in accordance with the law. However, screen-like displays are recommended, for example to achieve safety, attention or compliance with the law, for example an OLED film could show a company logo, which then changes to a flashing or braking screen content, for example, in order not to be considered legal possible blinker to be classified.

Other common devices can also be substituted: if, for example, no horn is allowed, a different signal tone could be possible at the push of a button, such as a chime-like one or even one selectable by the driver. To protect against theft, one could either prevent the functions from illegal operation or even use them to draw attention, for example by emitting special, conspicuous signals. Of course, other messages can also be sent, such as position via the telephone network or WIFI. Infrastructure can also be controlled, such as switching traffic lights (under certain conditions) or opening entrances. Multi-standard (composite) vehicle A future trend is both the mixture of pedestrians and slow, also powered vehicles (e.g. electric scooters and bicycles in pedestrian zones) as well as covering larger distances on e.g. cycle paths or at higher speeds (e.g. in traffic with cars). The latter would e.g. for a An electric motorcycle or an electric delivery van with a car registration, for example, and thus entering a pedestrian zone, for example, could be prohibited. For an e-delivery bike, however, entry could be permitted with an operating permit limited to, for example, 25 km/h. A "switchable" vehicle would therefore be desirable that, for example, has several approvals or types (all these designations are summarized here as vehicle categories) and selects one of them in accordance with the law. Furthermore, a legally compliant "switching" of the vehicle categories is proposed, which can carry out technical interventions, e.g. activate the current maximum speed limit or technically produce other legal conformities such as recording the weight or the axle or wheel loads and only enable operation in the selected category if all legally prescribed conditions are met or implement these required conditions: for example, a turn signal on a bicycle may not be legally permitted, but may be mandatory in another vehicle category and thus it is used by the vehicle control system depending on the current category or not.

In general, a multi-standard (composite) vehicle consists of at least one movable object, of which at least one other can also be moved mechanically or by control (e.g. bicycle with trailer, delivery van, boat, airplane), whereby an advantage arises or will arise if the operating conditions can be changed (e.g. entering a pedestrian zone, environmental protection area) such as by switching off or switching drives, speed control by braking etc.

The vehicle category change can e.g. be made by identification, so that e.g. a car or moped license plate number has to be flipped over in order to temporarily give up this vehicle category and be restricted to an e-bike vehicle category, for example. For example, it may be necessary to stop so that the vehicle can only be put back into operation in the new vehicle category if, for example, the weight conditions are met and from then on the speed is also technically limited, for example to 25 km/h. Of course, the category change can be made arbitrarily or sensibly.

11 uses a controller 10 or regulation (preferably electric or electronic) and input data 101 (e.g. measured values, e.g.

speed, vehicle weight, axle or wheel loads or the like) to drive or brake 2201 and outputs 2204 (e.g. blinkers, brake lights) as well as inputs and outputs to/from the driver 2202 can lead to at least one license plate being flipped over, for example, warnings being exceeded or input and outputs to/from others, e.g. infrastructure 2203 being made.

FIG. 11 thus shows how a multi-standard (composite) vehicle controls at least one drive and/or at least one brake (preferably indirectly or directly electrically actuated such as electromechanically, also non-linearly actuated) to the necessary extent in such a way that at least one vehicle category is complied with (e.g. by enabling or switching off or controlling the drive), also actuating at least one brake, use (or not) of vehicle functions such as indicators, brake lights, lights. A vehicle category can be changed by input or output from the driver, e.g. flipping the license plate (e.g. manual flipping, actuator-operated flipping, screen-like license plate) or by e.g.

Exceeded warnings or prevention of impermissible operation. A vehicle category change can also take place without making any changes to the vehicle, for example by issuing warnings that the limit is exceeded. Monitoring can also take place from the outside, e.g. by wireless signals (e.g. speed, location, identification) to an infrastructure or monitoring personnel. This function can also take place separately from the control, e.g. from the driver's mobile phone (e.g. GPS reports via WIFI, Bluetooth or similar) or e.g. by radar and output of the infrastructure, e.g. warning signals. At least one speed measurement, force measurement, load measurement, compression travel measurement, for example, but also the infrastructure can serve as inputs to the controller. For example, a vehicle category change can reach the control inputs wirelessly via GPS, panels, and also act automatically. Changes in the network, such as coupling or uncoupling trailers, can also carry out a vehicle category change or make it available as a control input. For example, the drive control or braking of a towing vehicle can be influenced when a trailer is coupled, or a trailer can be approved for higher speeds, for example, if the towing vehicle is suitable, but only if there is no external speed limit (e.g. outside the pedestrian zone). Also arbitrary actuation to change the vehicle category is possible in order to be allowed to operate the multi-standard (composite) vehicle, for example, pushing it (e.g. with or without drive power assistance). braking concepts The suggestions, descriptions, etc. presented here relate to objects to be braked in general (such as lifting devices, machine parts, propeller shafts, aircraft, etc.), but in particular to vehicles of all kinds, such as cars, trucks, single and multi-track, such as Motorcycles, mopeds, bicycles, but also trailers for all vehicles and also to the combination, e.g. Control behaving together. These vehicles or connected vehicles are referred to here as compound vehicles, i.e., for example, a towing vehicle or, for example, a trailer, or, for example, both together. In particular, a range of solutions is also proposed: it may make sense, for example, to offer a trailer that can brake well on its own with a deceleration-controlled brake (as shown here) without having to use equipment outside the trailer (such as sensors, detection of the driver brake actuation, etc.) required. An additional offer to the user can be, for example, additional stability (such as ABS, ESC, sway control) and a further offer level can be, for example, additional braking request detection by the driver, for example in order to initiate braking more quickly or, for example, to follow the driver's request more precisely. The range of products can also include, for example, an electromechanically actuated towing vehicle brake, for example a front wheel brake of a bicycle, for example, which can also be provided with, for example, ABS or, for example, rollover prevention as further options. A further expansion option can be, for example, that at least one electromechanical brake (EMB) can also be actuated non-electrically, for example via a cable pull. Non-linear EMBs are preferably proposed here, i.e. those in which the movement of the lining and the movement of the actuator are not linearly related, because they have advantages for the methods shown. If the non-linearity is optimized at different points of the actuation for different tasks, instead of just one optimization (e.g. operating the actuator at maximum power), the following recommendations can be achieved particularly well. A combination of regenerative braking and braking with the EMB is of course possible here, for example in which the regenerative braking is preferred and only the additionally necessary deceleration effect is generated by the EMB. Braking from deceleration measurement In FIG. 2 it is shown with speed decreases 18 how braking of a part of a connected vehicle (e.g. a trailer) can be derived from a determined (e.g. measured) deceleration: A driver (or also automatic driving) makes a braking request (e.g. "weak braking undelayed request 1801" in FIG. 2), e.g. by a specific pedal or lever position. For example, actuation speed and other time delays would result in the compound vehicle showing a "light braking 1802" curve. The course "a little too strong 1803" would be less desirable, but not better achievable, e.g. for regulatory reasons.

If the "brake request" cannot be detected directly (e.g. if there are no values for the pedal or lever position from an actuation measuring device 2605 in FIG. 18), it is proposed that the brake detection device 2601 in FIG. 18 carry out a deceleration measurement in the form of a deceleration sensor 2602 or a Delay Calculation 2603 can be performed at the compound vehicle, which first measures the deceleration generated by a part of the compound vehicle (e.g., the towing vehicle). Now, in a simple procedure, for example, a second vehicle part (e.g. trailer, hereinafter "trailer") would conclude that the additionally required own braking force could be e.g. "own mass times measured deceleration", treat this value with a correction k (e.g. multiply) and thus overall, i.e. for the entire composite vehicle, achieve a deceleration corresponding to the favorable curve "weak braking 1802" or, if possible, corresponding to the braking request.

However, since, according to the proposed method, the deceleration that is initially measured is added to that of the trailer braking that is building up, the situation "a little too much 1803" can also occur, for example, if the required trailer braking effect is insufficiently estimated. This can be tolerable, also in that, for example, the driver (or the machine) can additionally reduce the braking request somewhat. However, the status "escalating braking 1804" could also occur if the trailer braking triggered by the deceleration measurement results in so much additional deceleration that it cannot be compensated for by reducing the braking request. The additional braking of the trailer would then sway up to a limit (e.g. locking wheels), so each additional braking would cause so much more deceleration that a runaway increase (in FIG. 2 ", escalating braking 1804") would occur.

An opposite effect is indicated with "heavy braking instantaneous request 1805". As shown, for example, the braking "heavy braking 1806" set by deceleration measurement could not follow the immediate request. Reasons for this could be limits such as blocking or a correction value k, which is favorable for weak braking, but less suitable for strong ones.

Therefore, improvements are already suggested here. First, the correction value k can be made dependent on influences, such as the magnitude of the measured deceleration, i.e. a higher correction value can be used in the case of strong deceleration, which can be implemented in different ways, e.g. using characteristic curves or equations such as a+bx+cx. This means that for special (e.g. weak) braking, the trailer can be braked very little or not at all, e.g. to allow an intentional unbraked roll downhill. The deceleration achieved or associated values, such as the development of the deceleration over time, can be used as a measure of the contribution of the trailer braking effect and conclusions, assumptions or improvement measures can be derived from this, such as that a deviation from the expected e.g. requires an improved assumption of the trailer weight or e.g. the EMBs react differently than expected. From this, of course, an improved correction value k can again be obtained.

Secondly, it is proposed here that the stability against escalation is examined for an intended determination of the correction k. This can be done with model calculations, which contain at least the most important influences, such as masses, forces, decelerations, and/or with tests under different conditions, whereby various influences such as towing vehicle mass, trailer mass, blocking limit (possibly wheel loads), etc. should also be included. Previously, knowledge of the trailer mass was necessary for the above estimation of the required trailer braking effect. This can, for example, be relatively constant and known, as in the case of caravans, it can be adjustable (e.g. via mobile phone or, for example, in stages such as full-empty) or it can consist of observable behavior, such as deflection, component positions, vibrations, acceleration or Braking behavior, driver behavior etc.) can be derived and/or also learned or estimated, e.g. by means of machine learning, fuzzy logic or similar. For cases in which the mass is not well known or unknown, it is suggested that it be included in the correction value k can be included (which can be specified or adjusted by the driver, for example).

An alternative for dealing with the inaccuracy of the trailer mass determination is presented below. It is proposed to use model calculations to investigate how deceleration-controlled braking affects various combinations of actual trailer mass, the trailer mass on which braking is based, vehicle mass and other influencing factors, such as e.g.

Braking request, wheel grip, etc., reacts. From this, a setting of e.g. correction k and/or underlying mass etc. can be determined which covers the main operating ranges well. For example, "heavy braking 1806" (FIG. 2) with the correction k assigned to this deceleration can correspond to the braking request and other requirements, e.g. roughly g/2 with a fully loaded trailer. In this case (full trailer), normal braking could proceed with correction k derived from the deceleration, such as "weak braking 1802". With an empty trailer, however, the same k could, for example, cause significant over-braking. The decisive factor is then the analysis of whether an "escalation", i.e. an increase in the braking effect that cannot be controlled by adjusting the braking request, can take place.

If it turns out that even under the most unfavorable conditions, e.g. heavy trailer and minimal gross vehicle weight, no escalation can occur, one could accept the correction method applied, i.e. the derivation of the factor k or the possible consideration of a trailer mass estimation, and implement it in the trailer braking, possibly with additional input or setting option for correction k or trailer mass or additional improvements and additions. This implementation would preferably also prevent inputs from being made that would result in an escalation, or such inputs that, for example, develop too little full braking effect, or those with other undesirable effects.

The fact that, for example, the trailer is overbraked quite quickly to the blocking limit when the trailer is lightly loaded can also be helpful. This can be perceived as inconspicuous by the driver due to the low braking force that can be achieved with an empty trailer. The really caused one Slip (or another measure of the tendency to lock) can also be used, for example, to derive a smaller trailer mass or another correction k and then to take this into account in trailer braking. In addition to determining the trailer mass or wheel load, additional helpful signals can also be included in the control of the trailer brake, such as whether the brake light switch has responded and/or whether the drive is driving or whether the trailer should not support the braking, for example if the towing vehicle wants to brake alone (e.g. to charge the battery).

Of course, this method can be improved by using, for example, driver inputs in the brake detection device 2601 in FIG. 18 or effects resulting therefrom. For example, an actuating force (or position or both) can be determined, forwarded to the brake control in whatever way and used in the brake control, for example to react quickly to an actuating force. For example, an impact force can also be used or included, or a detection caused by the impact force, such as a switch position.

Since a control or regulation designed with this method preferably takes into account the forces in the parts (e.g. braking force in the towing vehicle and trailer), it can also be used with overrun brakes, for example to determine the drawbar forces under different conditions or to detect unusual overrun braking to design: normally, an overrun brake regulates in such a way that only a small overrun force remains compared to the vehicle weight. However, it may be desirable (also depending on the situation), for example, to brake with a pulling trailer instead of a pushing trailer. With the method shown above, "pulling" trailer braking can of course also be set (in which, for example, the target value is not small to zero as with conventional overrun brakes, but can have any other value, e.g. a specific pulling) and, above all, also handle it. If only the drawbar force were available as a controlled variable, trailer braking could no longer be released, because in certain cases the end of the towing vehicle braking would still be maintained with trailer braking or possibly even regulate to even more pulling despite the termination of braking. However, with the above method based on the observed deceleration, braking would always be controllable. Of course, it can be helpful for the method to also include other input variables, such as the Driver brake request according to brake pedal or lever position or the corresponding actuating force. For example, depending on the driver's request (or a brake assistant or automatic driving, etc.), a pushing, powerless or pulling trailer could be controlled, also (e.g. temporally) variable or depending on the brake request, with it being recommended to include ABS, since a pulling trailer is lighter would block than a non-pulling one. As a simple solution or part of a more complex one, it is also proposed that, for example, a towing trailer (e.g. due to the driver's request, deceleration determination, impact force determination, etc.) is regulated, which, particularly in the case of clear to strong pulling, comes early to the ABS blocking avoidance (e.g. in which the EMB control is reset to a value that is not yet assumed or determined to be blocking). This could give the driver a relatively strong but stable braking effect. This can also be used in addition to or instead of a trailer mass, axle load, wheel load, etc. determination, in which it is used that a light trailer reaches the blocking limit with less brake actuation, but a heavier one only with more brake actuation and thus over the Blocking avoidance, for example trailer mass, axle load, wheel load, etc., is braked correctly, even without having to record it yourself (but of course it can be helpfully included). Of course, it is also recommended to use the blocking or slip behavior (e.g. from how much brake activation how much slip occurs), e.g. as a trailer mass, axle load, wheel load, etc. estimate.

In addition to suppressing frequent changes to the setpoint braking specification that reaches the EMB (which does not contribute to any particular improvement in the overall braking behavior), it is recommended that other setpoint braking specifications that are expressed as unpleasant should also be suppressed, e.g. not using small deceleration or overrun force values or changes for braking, because This can be, for example, zero point tolerances, pedaling vibrations, disturbances from the road, for example, or not assigned to a braking request. A certain incline, for example, can also be provided without a braking effect if, for example, it is to have a rolling effect.

An extension or modification of the method shown above is also proposed, so that the above deceleration measurement can be gained in any other way, e.g. from determination of impact force or determination of effect such as e.g. switch position, but also e.g. from change in wheel speed. Again, it is beneficial to be direct Driver inputs to be used as well, such as actuating force or position. While a conventional overrun brake represents a (often proportional) control loop that tries to keep a certain (usually small overrun force) constant with (often only low) control amplification, it is recommended to use at least one sensor or switch to determine the overrun force, the signal to filter in such a way that on the one hand there is a short delay time but on the other hand there is good interference suppression (e.g. with analog or digital filters, also of a higher order). This electronic regulation is preferably designed in such a way that on the one hand a desired behavior is produced, but on the other hand those short-term changes in the brake setting are suppressed which do not make a particularly good contribution to normal braking behavior but would use constant actuator energy. This can be done with the usual means such as hysteresis. It is also recommended to use the electronic overrun control to make the target/actual comparison favorable (which is hardly possible with conventional overrun brakes): The overrun force can be regulated electronically to a small one and a better control behavior is also recommended, e.g. integral differential (PID). It is recommended to apply the improvement that can usually be achieved with this, so that, for example, the PID parameters are set in such a way that, for example, a good impulse response results, i.e. the EMB is activated quickly, but also approaches the target value well, i.e. not or not uncomfortably overshoots. It is recommended to include or take into account the actuation time behavior of the actuator for the PID parameter determination. Furthermore, it is also recommended that the target/actual comparison with the electronic overrun control does not necessarily have to adjust to zero or little overrun force, but also to other setpoints, e.g. to a towing trailer, which can result in a good braking feel. It is recommended, particularly with such target specifications, that additional information be used, such as driver input, in order to switch off the pulling state when the braking request is terminated. A deceleration measurement, for example, can also be used, for example, to take back a pulling state when the braking request is withdrawn, for example if the driver causes less deceleration by braking less and the trailer braking is thus reduced. One sees, above deceleration-controlled braking and this electronic overrun braking can and should be treated as common task. The target specification can also change, for example over time loading, via ABS behavior, etc. With any type of sensor signal use (e.g. from manual force, pedal force, cable pull force, overrun force), it is also recommended that a zero point stabilization is provided if necessary, which has an offset zero point or output value (e.g. that which occurs without actuation and changes e.g. changes over temperature or time) stabilized, e.g. that the minimum value of this signal serves as a starting point, to which the useful signal relates. In addition, excluding, calming, averaging, etc. procedures are recommended so that, for example, a short disturbance does not count as a new reference value and, for example, a real actuation, for example when the brake electronics are switched on, does not become the reference value. It is recommended, for example, to only accept longer minimum values or to exclude implausible ones, for example, but to take into account that, for example, after a longer standstill, a reference value is available again to an extent that does not or hardly interferes with the operation of the brake, be it an earlier one, the new one or a combination of the reference values involved. In order to receive an actuation signal from a hydraulic brake, for example, it is recommended, among other things, to insert or add a pressure sensor to the hydraulic line, e.g. branching off. The usual transducers, which are based, for example, on strain (e.g. strain gauges) or, for example, "Force Sensing Resistors" (FSR), are recommended for force measurement. The brake system shown consists of parts such as power supply, processor circuit, sensor, actuator. For safety and/or availability reasons, for example, parts or the entire system can be present in duplicate or more than once. A possible solution would be, for example, two EMBs, each with its own generator (e.g. for power supply, wheel speed determination for e.g. ABS) and its own actuator, arranged and operated in such a way that certain failures are unlikely, e.g. prolonged blocking or non-braking e.g. both wheels. An additional non-electrical actuation force transmission to at least one EMB can also be provided, for example, also designed in such a way that it only comes into effect from a certain degree of actuation, for example only "in an emergency". The brake control can use temperatures (e.g. of the friction pairing such as brake disc, drum etc. with e.g. linings) from e.g. measurement or e.g. modelling. Saving would also be possible, but can become very extensive due to the many different developments in the states (e.g. over time, speed, braking effect), which is why a simulation that develops with the operation of the brake is recommended. As modeling will suggested that the braking power (e.g. braking torque multiplied by angular velocity) goes as an input into the modeled friction pairing with thermal resistances (e.g. air cooling at standstill or, depending on speed, thermal radiation, etc.) and thermal capacity(s) and further to parts such as brake pads, calipers, anchor plates a drum brake, housing, actuator. These parts can also be simulated several times or twice, such as outboard lining, inboard lining or brake shoes with different self-reinforcement, and the braking power can be divided among the parts accordingly. For example, low-pass filters (heat resistance, heat capacity) or cascaded low-pass filters can be recommended for the simulation. Provision can also be made for the heat flow not only to flow in the direction away from the braking power (e.g. at the friction pair(s)), but in some cases also in the opposite direction, so that e.g. Brake shoes) is heated or kept warmer or that, for example, an electric actuator becomes warmer due to the flow of current and derives this, for example, to a housing of a brake.

The temperature model is preferably calculated in a slower loop of the processor of the brake control (e.g. to reduce processor load), e.g. only with repetition rates from e.g. a few milliseconds to more than a few 100 milliseconds or also, if necessary, not all values or temperatures together per run, but e.g. successively. Situation-related thermal resistances are preferably used, i.e., for example, current (via, for example, factors for airstream, wheel speed), temperature with radiation cooling. In order to react to possible rapid changes even with a low repetition rate of the calculations (e.g. emergency braking on a car motorway can lead to glowing brake discs in a few seconds and at the same time reduce the airstream for cooling to almost zero), it is recommended to monitor the temperature development(s) over time if necessary, to be calculated using the known e-function(s) or it is recommended to replace the e-function(s) with approximations to reduce the processor load, e.g. Taylor or other series or even with very short series that even can also only consist of a constant and an x-proportional term as a replacement for e to the power of x. These modeled values can also, based on the assumption that the values have to be saved due to the very large number of different developments in the states (e.g. via time, speed, braking effect) would be too extensive to be related to measured values (e.g. on the pad carrier, at a housing area that is preferably well heated by braking, etc.) (or the measured values could be related to one another and, for example, the result to model values be brought into relation) and used for improvements, e.g.

It can also start with a temperature measurement (e.g. on a part that is well heated by the braking power, such as the brake pad carrier, but also on a lighter part that is protected against the loads occurring in the brake, such as the actuator or its motor) and the temperature the model (or the temperatures from the modeled parts) in the brake control can be used to find an explanation, e.g. it is assumed that a measured temperature that deviates from the model (e.g. too high) can be associated with a different (e.g. higher) braking torque than from the brake control/Regulation can be explained in a way that can be expected and this explanation finding can be used to adjust the brake control/regulation, for example to improve the accuracy of the brake control/regulation. Of course, other explanations can also be included, such as spray or rain water, wind, etc., and temporal differences in the explanations can also be included, such as that one-sided spray water can be shorter than longer observable temperature differences from e.g. inaccurate braking torque. In particular, brakes can of course be compared with one another to find explanations, e.g. that left and right should mainly produce very similar braking torque.

Furthermore, to increase the accuracy of the braking effect, a detection and storage of brake changes (e.g. determination or estimation of tangentially or radially unequal wear, e.g. disc brake linings that have been worn further out due to A-shaped caliper expansion under clamping force) and application of compensation measures (e.g. where the average friction radius is in relation to the current contact pressure force and the estimated driving-off history) are carried out or, if necessary, values for this are stored.

Advantageously, values that have already become known during operation of the EMB (e.g. current, speed during actuation, for example) can also be used in future to use changed settings or parameters (e.g. to release the brake more slowly in order to be able to stop the release movement more easily). In the case of measured values with poor resolution (e.g. if only certain HAL sensor positions can be measured), calculation methods can generate better values (e.g. "Observer"), but in particular the actuator motor control can also be used for variables that are difficult to derive from them (e.g. slow speed from jumping HAL sensor positions). be brought into another, suitable mode of operation, which, for example, only continues to turn the rotary field without using a determined speed for this, for example. For example, the current can also be increased until the rotor rotates as well.

Advantageously, the moment acting in the brake from elastic parts (which are tensioned when actuated relax when released), also with additional moments (e.g. from spring(s), actuation friction losses or e.g. from mass inertia) can be included in calculations. So, for example, these moments can also be offset against the moment of the actuator motor with the correct sign (that, for example, the brake generates a moment against the direction of actuation when it is applied and in the direction of release when it is released) in order to bring about improvements, for example in the actuator motor control, in which, for example, this results in acceleration and/or speed and/or position can be determined better, for example if there is no new position measurement or if this is problematic (e.g. at different times). For all improvement measures that can be gained by controlling/regulating one or more brakes (e.g. finding the above explanation, determining the current air gap, the current thickness of the lining, the rigidity of the brake, etc.), it is also recommended to influence the (also improving) which can or should form in the control/regulation, to weight a decision: A decision could, for example, mean that a determination is not used (because, for example, the basis of the knowledge is classified as insufficient, for example the measurement is classified as too faulty which could also lead to the fact that under certain operating conditions (e.g. when braking is often only weak on longer snowy roads) such knowledge is never incorporated to improve it. Therefore, it is also suggested that weights can also be given to the respective findings, that they, for example, can only be compared with one enter a certain proportion depending on how well they are rated, but this does not necessarily mean that there can be a complete exclusion.

Of course, other methods such as ESC (Electronic Stability Control) can also be implemented with this deceleration or, in general, acceleration measurement method.

Rollover Prevention

In particular, a method for preventing rollover in the direction of travel is also recommended here, which can work together with the above method or alone or with other methods. Vehicles with a certain center of gravity (the entire compound vehicle or just one of them, e.g. the towing vehicle) can roll over to the front (e.g. bicycles, motorcycles, articulated lorries, etc.), backwards (e.g. motorcycles if the acceleration is too great) and of course also sideways when braking hard. A suitable time window is used here to avert such a rollover. For example, a forward rollover could still be avoided as long as the direction of the resulting force (from the weight force in the center of gravity and the remaining acceleration forces) is again within the contact area (which is e.g. spanned by the wheels touching the ground) if the braking deceleration is partially or completely avoided comes. With correct spatial, vectorial and sign-correct application, a rollover in all directions can be avoided, e.g. forwards, backwards, sideways. The time window or time behavior taken as a basis here can be determined as follows (or something similar), e.g. when preventing a forward rollover. If, for example, a bicycle is to be prevented from rolling over at e.g. 36 km/h (10 m/sec) and the center of gravity is 1 m behind the front wheel road surface, you would have ¹⁄₁₀ sec (for one meter at 10 m/sec) time to avert the rollover by releasing the front wheel brake. Of course, this can also be determined more precisely or in any other way, e.g. also modeled. A rollover movement or danger can be determined, for example, with acceleration, yaw rate and/or magnetic field sensors or with sensors that combine several functions. For example, the forward yaw rate (i.e. pitch angular velocity) or change in this could be determined, or e.g. the angular position or change in the earth's magnetic field.

Figure 17:
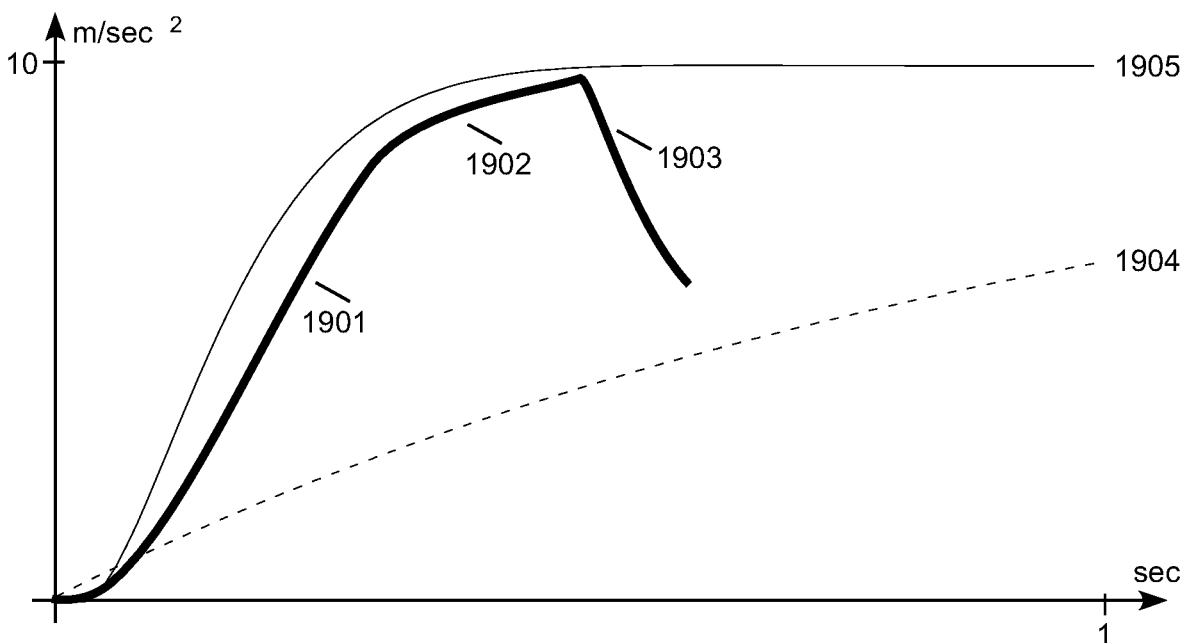

With the methods described here (e.g. delay-controlled braking, impact sensor, rollover prevention) there are several important timing behaviors and it is recommended to design and use them advantageously. In FIG. 17, 1901 shows the actuation speed of the EMB.

The actuation speed can be made slower with stronger braking or a slower behavior can be used to advantage, such as 1902. The speed when releasing can be made faster, such as 1903, or a faster behavior can be used to advantage. This could be used to advantage that the EMB, like 1901, quickly builds up a good braking effect, but can then slow down in areas with a tendency to lock up and/or roll over, in order to give sensor measurements or evaluations more time for a possible reaction, e.g. to recognize it whether it is necessary to release it, e.g. to prevent a rollover. A possible faster release speed 1903 can then very advantageously avert a blocking or rollover (or other unfavorable behavior) quickly enough. Here, for example, with 1903 one can imagine that, including and despite the time taken for a sensor evaluation, it would be possible to avert the rollover within ¹⁄₁₀ of a second, i.e. a recommended advantageous design of the speeds 1902 and 1903 including sensor evaluation has been successful.

A rollover possibility is determined by the center of gravity and the resulting total force in relation to the contact area. It is thus proposed that this method should also be used with regard to changing the center of gravity. For example, a small and light driver would have a significantly lower center of gravity than a large, heavy one. The center of gravity (also unfavorable with regard to rollover) can also be changed, for example, by driving downhill or by leaning forward. The property of this method should therefore also be designed and used in such a way that it also classifies a change in the resulting force over time as dangerous in good time. For example, if the braking effect increases, knowing the center of gravity and the position of the contact area (which, for example, when driving downhill can be at a different point than on the level with regard to the center of gravity), that deceleration (or acceleration for backward or sideways rollover) can be calculated that has a resultant outside of the contact area causes, so rollover. However, it is still more conceivable to estimate the vehicle position than the center of gravity despite the forces acting on it, since this can also be influenced by the driver. Since the change in the resulting force over time (or a variable that says something similar) cannot be used unequivocally as a statement about the possibility of a rollover, two are used here measures proposed. Firstly, safety can be provided so that, for example, braking with a maximum deceleration of 0.8 g is classified as harmless, with which, for example, a good or lawful braking effect can be achieved with a low risk of rollover. It is also proposed that when using an electrically actuated brake, the braking effect could be limited in such a way that rollover prevention together with the desired maximum braking effect could also be achieved.

Second, it is proposed that an effect that varies greatly over time is used. For example, when the rear wheel lifts off (or the wheel to be considered in other rollover directions), a rotational movement suddenly occurs in the rollover direction, which was "not" present in the stable state. So it is recommended to use this "sudden" movement (e.g. angular velocity, angular acceleration, component of a force, change in the angle of the Earth's magnetic field, etc.) alone or in addition to rollover deterrence. Also this "sudden"

Physically ideally, movement occurs spontaneously at take-off, but in reality it is again a sensor signal, which has to be smoothed according to above explanations and thus has a time behavior (which is designed favorably according to above). Time behavior 1902 can also be used here, with slower braking in the suspected rollover area in order to then reduce the acceleration or deceleration effect in good time, not increase it further, or only increase it further in such a way that is considered safe or advantageous. In particular, the time behavior of the electric brake can and should also be designed or used in such a way that the release process 1903 runs quickly, e.g. faster than the actuation process.

To avoid rollover, it is also suggested that different avoidance strategies work together. For example, at low speed, e.g. cyclist speed, the time it takes to come to a standstill when braking hard can be very short, e.g. less than one second. If you also take into account the time the brakes were applied, for example, there would be little time for Rollover avoidance processes in the risk of rollover, strong braking area. Therefore, a procedure is recommended that avoids such heavy braking (also dependent on influencing factors such as speed, time, etc.) that it comes close to the risk of overturning. This can, for example, also consist of at least braking, a mass estimate can be made and/or other parameters can be determined, such as gradients. In any case, general parameters that influence rollover behavior can be used to limit the braking effect to avoid rollover. For example, the speed can also be used and influence the rollover avoidance behavior, so that, for example, at higher speeds, for example, the detection of the onset of rollover movement is used to avoid and at low speeds a braking effect that endangers rollover is not achieved at all. Of course, these areas can also merge into one another non-abruptly and can also be influenced, for example by mass estimates or, for example, by previous behavior, such as deflection, rollover tendency.

Mass Estimate

A mass estimation can be advantageous for all methods shown here, so it is recommended that the mass or wheel or axle loads can also be estimated as follows. The vehicle mass can be determined from an acceleration or deceleration force via the acceleration or deceleration if, for example, the braking or driving force is known. This is also recommended in the event of changes, for example to observe how the deceleration changes during, for example, a build-up of braking force. Axle loads can of course also be recorded as usual via deflection, but also, for example, based on a change in angle of a sensor on a swing arm or wheel suspension, for example. If a (advantageously: multi-axis) accelerometer is present, the following is also recommended. The vibration frequency of a vehicle or a part (e.g. a wheeled trailer) depends on the mass and spring action, which can be, for example, the spring action of the wheel or axle suspension in the up-down direction or, for example, a spring action in the direction of travel, such as the drawbar. With an acceleration sensor, the acceleration can be measured over time (even continuously) and a frequency (preferably a resonance frequency) can be determined from this, or several frequencies, such as with a Fourier transformation or Fast Fourier Transform (FFT) or even simpler, in which, for example, a number representing the time is increased as long as the signal to be examined for oscillation does not change and a list is kept of which number representing the oscillation period occurs how often, and from this it is concluded that the oscillation behavior has been changed by mass, i.e. essentially one List of occurring periods. One or many suggestions for vibration (e.g. bumpy road, getting in) can be converted into frequencies (e.g. from the acceleration measurement of the sensor or a related variable) and the mass can be estimated with the help of the frequencies (or periods) because the spring force and determined frequency(s) are connected to a specific mass. The mass estimates can of course be combined, such as those from overall vehicle deceleration or acceleration and those from trailer behavior, such as vibration behavior, and plausible assumptions can also be used, such as that the towing vehicle mass is relatively invariant and therefore the estimates are mainly different Affect trailer masses.

Detachment Acceleration

According to known physics, it is basically not possible to distinguish whether a force occurs due to gravity or acceleration, i.e. measurements and effects resulting from a gradient from the vehicle could not be clearly assigned (e.g. whether a force in the direction of travel is a component of gravity or an impact force when braking), such as in an airplane, for example, it is not easy to tell whether a force is due to gravity or a curved path. A solution for separating these effects using assumptions is proposed here in general (e.g. also for ABS, ESC, rollover prevention, etc.). It is assumed that at least one acceleration can be recognized directly or from effects (or this value is implicitly present in others), e.g. best in three spatial directions, but e.g. only in one direction of travel relative to the roadway. As the simplest solution, it is proposed to determine a reference to outside the vehicle, e.g. to the spatial position of the earth's magnetic field (e.g. with a multiple sensor as in mobile phones, which measure acceleration, rotational acceleration, magnetic field in several axes), but also e.g. to GPS geodata. The comparison between the wheel speed and the "determined acceleration" can also be evaluated in such a way that the position relative to the vertical (or a similarly meaningful value) is determined. For example, a force in the direction of travel combined with a constant wheel speed would not mean an acceleration in the sense of an increase in speed, but only a component of the acceleration due to gravity. But also procedures without values from outside recommended (similar to e.g. an artificial horizon). For example, rotation values (e.g. rotation rate or rotation acceleration) can be used to determine whether the vehicle is going ("rotating") down a slope or an uphill slope, and slope values can be determined. The determinations can also be weighted (e.g. in terms of time, e.g. with regard to their long-term or short-term stability) and combined, e.g. the rotation rate of the path curvature or curvature change with the position of the earth's magnetic field or the wheel speed or change.

Figure 3:
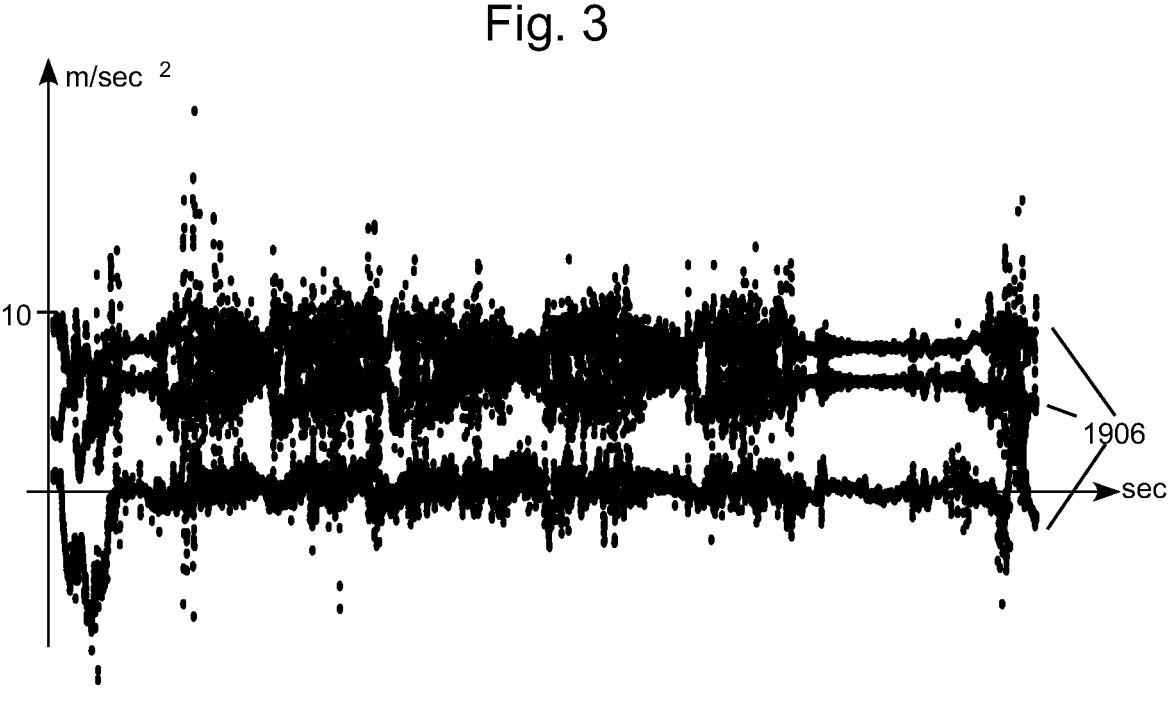
FIG. 3 shows a so-called raw sensor signal recorded from reality with all measured values with acceleration over time in order to show with the many black measuring points that such signals have a very high proportion of distortions, FIG. 4 schematically shows the signals smoothed with a digital filter of a higher order and number of poles, FIG. 5 schematically shows a schematic graphic representation of an advantageous embodiment of a brake (here duplex brake) with actuating cams, FIG. 6 schematically shows a particularly advantageous adjustment with a wear adjustment lever, FIG. 7 schematically shows an advantageous embodiment of wear adjusters for drum brakes (left) or disc brakes (right)

The curve 1904 in FIG. 17 shows how quickly a sensor evaluation can follow a jump from 0 to a deceleration of g. It is assumed that the raw sensor signal requires an averaging or smoothing in whatever way that is achieved and that further time delays or dead times can also occur. 1904 would be, for example, the behavior of a simple low-pass filter (e.g.

resistor and capacitor or corresponding IIR digital filter) or the behavior of an averaging, here moving average, with the effects for 1904 being designed in such a way that the sensor signal is smoothed well, as will be shown later. 1904 has an unfavorable time behavior here, because only roughly 0.6 g can be measured in 1 second. Interestingly, with more complex filters, such as higher order than 1 or other properties, with a suitable choice of filter data (such as filter type, cut-off frequency, edge steepness, number of poles, etc.), a fast response like 1905 can be achieved on the one hand and good smoothing of the output values at the same time of the filter. The method shown here consists of designing the time behavior of the EMB by designing the non-linearity and controlling the EMB in such a way that the EMB causes very little additional time if it is operated in such a way that it can essentially follow the control signal and the control signal is smoothed or filtered in such a way that even faster behavior of the control signal does not cause any particular increase in the overall actuation speed (from filtering and EMB actuation), in that the filter data and parameterization are purposefully designed for this. From the selected behavior (e.g. 1905) smoothing or filter values such as e.g. type and parameters of e.g. IIR or FIR e.g. digital filtering of e.g. second order are determined. It is therefore important here to design the interaction of the time behavior of the smoothing and the EMB correctly in order to enable a good (e.g. timely) reaction of the overall system. FIG. 3 shows a raw 3-axis sensor signal with a sampling rate of 10 ms, recorded from reality with all measured values, that the raw sensor signals 1906 of the accelerations in mainly the y-direction (travel direction, 1906 up), mainly the z-direction (down, 1906 center) and x-direction (sideways, 1906 bottom) as points over time (in about 80 sec). The many black dots are intended to show, in a way that preserves reality, that such signals have a large proportion of falsifications.

This shows that the e.g. 3-axis sensor can be installed differently than with the z-axis exactly vertical and it is hereby recommended to correct the installation position if necessary, which can also be done from the sensor data (e.g. assuming that in the longer term there must always be a vertical vector, i.e. a pendulum averaged down over a longer period of time). The gravitational acceleration is also contained proportionally in y and z and it is hereby recommended to calculate these proportions correctly if, for example, delays in the direction of travel are to be determined.

Figure 4:
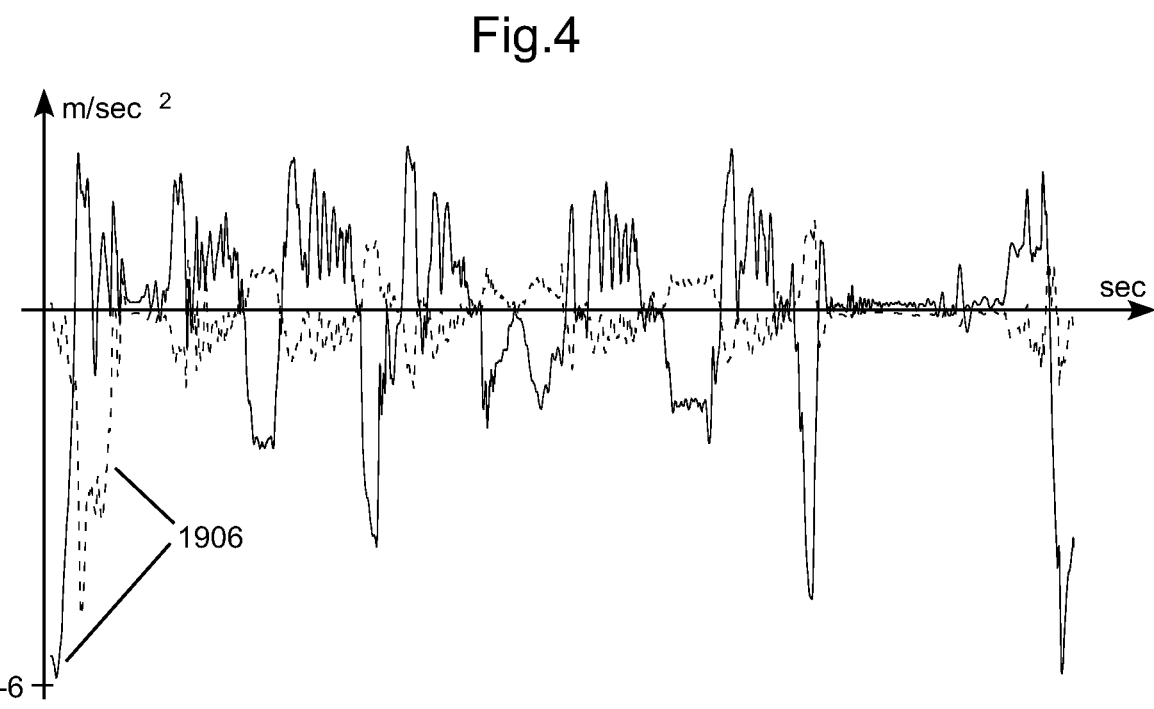

FIG. 4 shows the signals 1906 smoothed with a digital filter of a higher order and number of poles, whereby 1906 have now been treated pointing to the correct position in such a way that 1906 (dashed) shows the now vertically aligned z-axis at the top (which can be caused, for example, by interference how deflection is influenced by driving) and 1906 below shows the y-axis now pointing in the direction of travel and therefore braked against the direction of travel with up to −6 m/sec².

It is therefore recommended as a method or in a device to select the order and number of poles in such a way that the requirement for time behavior (e.g. delay, group delays, etc.) and the requirement for signal quality (e.g. suppression of non-braking-relevant components) is met, which e.g. can also mean that, e.g. also switchable, variable or e.g. several parallel different filters with different parameters can be used, e.g. to enable a quick reaction in case of heavy braking (e.g. emergency braking), but also to get a brake signal that is calm enough that e.g. Actuator adjustments are not constantly required, e.g. in the case of longer or weaker braking. On the one hand, the "target values" can be defined, but unfortunately they can also be blurred in practice if they include driving sensations, compromises, etc. For example, a practical goal is that an acceptable compromise between delay time and the suppression of useless actuator adjustment is achieved, which can be expressed in numbers afterwards, but is not defined here in advance as a delay time of 73 ms, for example. If the optimization of the filter parameters (e.g. filter type, limit frequency, order, number of poles) shown here leads to an overall behavior that is acceptable to the user, then the purpose is fulfilled.

The time behavior of the smoothing of the signals 1906 in FIG. 4 would emit well-smoothed deceleration signals, which, however, have a longer time behavior than FIG. 3 and thus achieve a later braking effect. The difference can still be, for example, reaching half the full braking effect in roughly 1 second or less than 0.2 seconds when dimensioned as suggested. It is hereby recommended to keep vibrations of the acceleration in the direction of travel, e.g. from pedaling, away from a brake control, especially if they partially reach into the negative acceleration, i.e. braking, which can occur e.g. due to weight shifting when pedaling. Since the signal does not have to be completely stable even with good smoothing, further measures may also be proposed so that not every small and possibly insignificant signal change causes an actuator movement. For example, a Schmitt trigger or a flysteresis can avoid small readjustments, or actuator positioning could only take place after a certain cumulative change, or further time dependencies could be built in, such as strong changes being passed on quickly and weak ones being calmed down for the time being.

Of course, the deceleration signal in the direction of travel (FIG. 4) does not have to be calculated out exactly, any other can also be used with the filtering or smoothing suggested here, so one could, for example, also determine the angle from y and z that a pendulum would indicate or the resulting force on the pendulum and use this as a value for braking or rollover prevention. Suitable filtering is understood here to mean that the delay caused by the filtering does not significantly delay the entire response time up to the braking effect (i.e. the actuator speed can be used well) and that fluctuations or disturbances in the individual measurements are suppressed to the extent that unnecessary braking is not disruptive be triggered and it is left open with which method exactly this is achieved. The same principle (the selection of the appropriate filter) can of course also be applied to other measurement signals, e.g. in order to supply the methods presented here and possibly those based on them with a fast and well-filtered signal.

Delay detection is advantageous for the method shown here, which could be determined, for example, from the reduction in wheel speed and/or deceleration sensor (also in several axes).

In summary, the procedure proposed here can be presented as follows:

Definition of a range of necessary braking actions (from e.g. light braking to e.g. legally prescribed or up to e.g. emergency braking);

Definition of tolerable deviations in the braking effect from the braking request;

Determination of the tolerable deviations of the trailer weight from calculation variables (or something similar that can be known or estimated or unknown and therefore assumed, such as wheel loads);

Determination of the behavior of the correction k (how strong it should be or how dependent on which variables, e.g. increasing with heavy braking, e.g. decreasing with weak braking);

Analysis of stability (e.g. escalation behavior);

Design of the correction K or specification of the permissible operating range in such a way that required criteria such as deviating actual braking effect or escalation conditions are within the required range;

Supplementary specification of operating limits, such as minimum weight of towing vehicle or trailer, maximum weights, etc.;

Advantageous use of ABS, e.g. in the case of a light trailer, trailer braking that is clearly too strong is permitted and ABS avoids locking.

It is also recommended as helpful that, for example, simulations or results from practice are used, and from this the desired extent and behavior of the correction K and/or escalation, e.g. on average or e.g. for areas or points considered important, is also determined including avoided blocking or excessive slip.

Inclusion of an overrun braking function: with this method, for example (also situation-dependent), a special overrunning force could be set, e.g.

"Pulling" in which the trailer brakes harder than for a pushing impact force. vehicle stability Here, vehicle stability is understood to mean, among other things, avoiding wheel locks, staying in the desired lane, avoiding rollover, avoiding snaking (e.g. in the case of trailers, "sway control"). Here, the option of the EMB to resume an actuator position that was still classified as "good" is particularly recommended. It is important to draw attention to the difference between force or pressure controlled brakes and the possibility of controlling the position (e.g. brake pad position relative to the friction surface, actuator angle, etc.) of the EMB. Force-controlled or pressure-controlled systems are common, in which the pressure is reduced if a limit for a measured wheel value (e.g. drop in speed) is exceeded or not reached. However, the resulting position (e.g. of the coating) or the required amount of fluid is not recorded separately. Theoretically, one could set the best possible pressure (and thus the contact pressure) in a stable manner, but in practice the well-known oscillations are caused by pressure build-up and pressure reduction, among other things because valves are switched open and closed. Here EMBs are proposed in which the braking effect is determined by the position (e.g. brake pad position relative to the friction surface, actuator angle, etc.). Other values such as braking torque, contact pressure, etc. can also be considered equivalent because their change in these EMBs is linked to the change in position. Even if values other than the position are used, in contrast to fluid-based solutions, there is a usable relationship between, for example, the braking torque or contact force and the position, for example the actuator position, so that these values can be converted into one another (if necessary, for example, only briefly, for example during the braking process). With fluid-based systems there would of course also be connections such as, for example, that a volume flows when the pressure changes, but the position equivalent (e.g. volume) is normally neither measured nor directly controlled, nor used like the position in this method. Here, if the limit of a measured wheel value is exceeded or fallen below, the position (position-equivalent values are also meant below, such as braking torque) is noted and this position or a position considered better is approached again to produce a wheel measurement value that is again found to be "good".

Equally, one could use the braking torque still found to be good, the contact pressure determined in the process, or another variable describing the braking effect, provided that the actuator position is also brought into a state that has been found to be good again. Since a good position can be approached in a stable manner, it is suggested that the change between "more" and "less" braking can be advantageously avoided if necessary, so that better braking is possible (because over- and under-braking do not have to be optimal). However, the variable describing the braking effect (e.g. position) can also be changed in order to find out, for example, whether general conditions, e.g. roadway properties, have changed. It is recommended here to use the wheel speed compared to an estimated ground speed for exceeding or falling below a wheel measurement limit value for ABS, whereby the ground speed estimate can be obtained from a faster rotating wheel or, for example, from the integral of the deceleration, e.g. summation of the delay measurement (also with appropriate treatment such as filtering or with factors). For rollover prevention, one would use, for example, that wheel speed, wheel deceleration or vehicle deceleration that is still classified as good according to the above statements with regard to rollover prevention, and for ESC, for example, one could use that variable at which a desired force vector (e.g. with regard to the road surface) occurs on the wheel. results. Of course, the chosen setting can change, also for example on a trial basis (e.g. to determine the grip), but the usual ABS vibrations are preferably avoided. What has so far been explained as a single wheel measurement value and a setting obtained from it can of course be extended to several, many or to evaluations from many, so that, for example, a brake setting is derived from several ground speed determinations (e.g. estimates) and several wheel speed determinations (e.g. position) or several brake settings can be derived in order to derive, determine, select, etc., an optimal one (e.g. providing the best deceleration, also e.g. with an additional evaluation, e.g. that no rollover tendency was detected). These evaluations can of course can also be made while the EMB setting is being changed, e.g. while the EMB is being actuated more and more, the delay can be determined and, for example, by correcting the time delay in the measurement or evaluation, it can be determined at the right time, for example when the actual delay is as "cheap" (e.g. maximum or safe, also safe from overturning). value and can therefore be used to select a favorable EMB setting (e.g. position). Even if there If changes (e.g. of the position) are made for further optimization, this is not comparable to the valve switching that dominates the known ABS and ESC, since with the known methods a specific position is not specifically approached and the clear connection between position proposed here at the EMB and other variables that determine the braking effect is not used in known methods. In contrast to the solution presented here, with other methods, for example, a brake pad position is not definitely determined (which is the case in the method presented here with the actuator position and possibly other data such as wear adjustment) and also not definitively, for example, a precisely defined quantity of fluid is drained or supplied, but understandably affected the pressure. The change in the measured wheel value can also be used here to increase the braking effect, e.g. to increase the braking effect in the case of a measured wheel value that indicates an improvement in road grip (e.g. wheel speed increased or not falling so quickly). The use of an estimated ground speed and a measured wheel value (e.g. wheel speed) was chosen above as a simple explanation; of course, more complex calculations can also be recommended as advantageous, such as determining wheel slip and comparing it with one that is classified as good (also depending on the situation).

For measures to improve vehicle stability (e.g. ABS, ESC, sway control, rollover prevention), it is advantageous to also know or determine the current stability condition (e.g. wheel slip, how close you are to the risk of rollover, etc.). For this purpose, it is proposed to make targeted small changes to the wheel (or to the wheels, simultaneously or not simultaneously), e.g. small wheel braking or drive torque changes, which can be a small change in the EMB braking torque, e.g. via small actuator position changes (or equivalent) and thereby determine the change in the measured wheel value (e.g. slip, change in the determined risk of rollover, etc.), e.g. with a wheel speed sensor. Contrary to known ABS, which goes into clear over- or under-braking, here it is recommended to apply only a change so small that it is assumed that it will result in a noticeable change in the wheel reading, especially if this is at the limit of the than well-found wheel measurement is, so for example close to blocking. For example, on asphalt, the small change could lead to a noticeably rapid drop in wheel speed (based on the known slip curves), but lead to almost immediate locking on black ice (whose time course is largely determined by the mass inertia of the wheel), i.e. the small one Advantageously, the change will firstly be so small that the result can be evaluated, but also only so large that a state that has been found to be good can be restored as quickly as possible, with the value being "just barely recognizable under the required conditions" (e.g. asphalt, concrete, pavement, gravel, snow, ice, etc.). In particular, it is recommended that the small change is not made exclusively with the friction brake, but also, for example, with another moment-determining device on the wheel, such as a motor, generator, dynamo, etc. If, for example, a bicycle requires roughly 100 W of drive power, e.g. With a few W of wheel braking power, the "small change" can be achieved, which is even possible with a wheel dynamo, for example, by changing the electrical load up to short-term short-circuiting. Of course, a small drive could also be added if it shows the proximity to the unwanted wheel measurement value, i.e. how far the wheel is from the locking limit.

The above "adding a small change" could of course also be used as ABS, ESC, etc., in which the quick change is made with a quickly controllable device (e.g. electric motor, generator), also to be able to exit an undesirable state quickly. Here, however, the almost opposite effect is also recommended, namely that thresholds for ABS, ESC, etc. are not exceeded, but that the small change determines the limit comparatively unobtrusively and then a better setting is approached with an EMB or regenerative braking. The method shown here can also avoid today's ABS vibrations, for example by using a generator only to determine the proximity to the limit of the undesired state, which can also take place without ABS vibrations at all, by a state found to be good is approached and can remain or further steps can be taken for further release. In contrast to ABS vibrations, the method shown can also be used to avoid them, for example by setting an avoiding actuator position. In particular, this procedure can also be operated in the opposite direction. If, for example, little braking was achieved on a poor road surface (e.g. ice), the road surface can be improved (e.g. on asphalt) and it is necessary to gain knowledge that better braking is possible. Many things are suitable for this, e.g. the wheel speed can suddenly increase again or the rate of descent can slow down. But even the above "small changes" can be run through (also very quickly) until good braking is set again according to the road surface. In addition, the "small changes" can result in an increase in the EMB brake efficiency setting each time, but this can also happen simultaneously by repeatedly adding "small changes" as the EMB increases the brake efficiency setting. The "small change" can also be used as a remedial measure against excessive (e.g. locking) braking, e.g. by quickly adding drive torque again to quickly combat an undesirable condition.

In particular, the above method of "small changes" can also be used for low speeds at which it is not easy to see whether the vehicle is still driving or already stationary. The above procedure with alternating (or also simultaneous) EMB settings and "small changes" would also recognize with a favorable design that the "small changes" at standstill do not bring any wheel measured value changes (e.g. speed change) or whether with "small changes" still a specific one measured wheel value (e.g. speed) occurs. This can also be done on individual wheels at the same time, e.g. to prevent them from rolling away.

Brake Design 5 shows an advantageous embodiment of a brake 01 (here duplex brake) with brake drum 012, brake pads 063 and brake shoes 067. Two actuating cams 032 (which can be combined in one part) press the brake shoes against the drum via rollers 033, here in full braked position. FIGS. 5 and 7 can also be seen as the principle of action and are of course only one of many possible designs, for example only one pad can be pressed and the second pressed by the first ("servo"), it can also be one It can be a simplex brake, many brake shoes can act radially or axially, the brake shoes do not necessarily have to be round, and the friction surface can also have a different shape than a drum or an inner shoe brake. Other designs are also possible, also as servo brakes, in which the braking force of the primary shoe is passed on to the secondary brake shoe as an actuating force, shown here as actuating transmission 058 as an arrow. The lower actuating cam 032 and the lower roller for it 033 would not be required for the servo brake (here a unidirectional one, because the servo effect is only in one direction of drum rotation). There can be an actuating spring 042 in the brake in order to achieve a specific rotation of the actuating cam 032 and thus a specific braking effect. In this way, for example, emergency braking or desired braking with g/3, for example, can also be achieved without electrical actuator actuation. The actuation spring 042 can have any effect on the actuation cam 032, that is, as shown, in the manner of a crank or, for example, with an additional cam. As shown in FIG. 5, the actuating spring 042 acts in the manner of a crank, i.e. with a spring torque that changes over the actuation. The braking effect can be determined together with the torque that arises from the brake actuation and the course of the actuating cam 032, i.e. the angle of rotation of the actuating cam 032. When the brake is fully released, the actuating spring 042 can assume the dashed position, which here, for example, means a dead center position or Can be near dead center position in which no or little electrical energy for the brake actuator is required to hold the released position, which, for example, when driving for a long time, especially at low speed and thus possibly little electrical dynamo power is cheap, so can also be used, for example, at walking speed can.

Larger drum brakes often have roughly tangential contact pressure on the pads, for example via hydraulic cylinders or an expanding part (e.g. between the brake shoes). In the case of smaller ones (e.g. bicycles), the contact pressure can also have a roughly radial effect. However, there is a very important difference between EMB and direct human brake actuation: the brake pad contact force can also reach 0 to roughly 10 kN in bicycle brakes, for example, and require manual force on the brake lever of 0 to roughly 200 N, for example. This large force range is tailored to human behavior, so that bicycles, for example, do not easily roll over due to the manual force required, even during "emergency braking". If the contact pressure ratio is designed as with hand-operated brakes, the electric actuator of an EMB would run with much too slow a ratio over large (most) actuation ranges due to the transmission ratio required for emergency braking. Therefore, it is suggested that the translation into an EMB operates the actuator (if it is operated without additional support such as a spring) in a favorable load range, e.g. in a change ratio ("non-linearity") of the actuator torque from light braking to full braking, which should be less than 1:10 and of course taken into account, how high it can be due to geometric, material-loading and other restrictions. As a physical ideal, a completely constant engine load (preferably at maximum power) would be desirable, but this is viewed here as unrealistic, among other things. A brake that, when operated by humans, generates little or no increase in the actuating force, especially against heavy braking, would be completely contrary to human habit, almost impossible to dose (because almost the same actuating force for very different braking effects) and also dangerous because it could easily block or roll over leading. Therefore, with the EMBs recommended here, the progression of the transmission ratio (through, for example, the actuating cam 032 or its elevation progression) is very significant and completely different from that of manual or foot-operated devices. It is proposed that this non-linearity, which is very important here, depends on the one hand on whether a supporting effect such as a spring is present or not and how the support is provided via the actuation (e.g. it can be a crank-like articulated spring that relaxes from a dead center area). I.e. the non-linearity (e.g. course of survey) can be designed in such a way that the EMB releases without actuation energy or goes into a braked state (e.g. sufficient effect for parking brake, emergency braking, etc.) and/or, for example, requires little current in frequent actuation areas and/or more against heavy braking. The cam 032 is less of a component here, but has a very specific course, which was almost the opposite in other brakes up to now. The course of the non-linearity (e.g. cam elevation over the angle of rotation) is also designed in such a way that the "list of measures" (see below) for important EMB properties is achieved. The "list of measures" can be fulfilled in such a way that on the one hand the spring effect (if available), e.g. as a moment via the actuation (e.g. measured as the actuator angle) is included, on the other hand, e.g. the course of the lining contact pressure (also e.g. via the actuator angle) and the resulting non-linear Transmission ratio (also related, for example, to the actuator angular position) follows if, for example, a specific actuator torque is to be set. To simplify things, for example, the local slope of cam 032 is chosen so that spring (if available) and actuating motor result in the desired contact pressure, of course not just at one point, but via the actuation or significant areas of it. As shown above, other influences such as mech. Losses, different air gap sizes, self-reinforcement, etc.

A reset 039 (the arrow can e.g. represent a rod) is recommended for all of these and similar EMBs if the position (or positions) assumed automatically by the spring is e.g. or can only be operated with a specific return part) e.g. to be changed by the driver: if e.g. the spring is in the parking brake position and the actuator is not actuated (e.g.

there is no electricity), a position that is considered more favorable (e.g. in the a released position remains, e.g. after the released dead center). If the parking brake has another purpose (e.g. anti-theft protection), the EMB can, e.g. as soon as it functions normally again, move out of the position made with the reset 039 and e.g. resume an anti-theft function or normal operation.

Lining wear could, for example, be covered by the stroke of the actuating cam 032.

As usual, wear adjustment can also be carried out at the end of the lining opposite roller 033 (e.g. with an adjustment screw). A particularly advantageous adjustment is recommended in FIG. 6, in which at least one wear adjustment cam 083 presses on at least one wear adjustment lever 084 in order to apply pressure in the direction of the lining pressure on at least one pressure pad 087 (here, for example, a pin that goes through brake shoes 067 and wear adjustment lever 084). To effect movement of at least one brake shoe 067.

The roller(s) 033 would be fastened or mounted or guided in the wear adjustment lever 084 here. Particularly advantageously, the wear adjustment cam 083 can be rotated by, for example, at least one actuating cam 032, for example by turning a driver in an area otherwise not used for braking, i.e., for example, from the released position, for example in the opposite direction to the normal actuating direction. A transmission with a directional effect (can also be described as non-linear), e.g. a ratchet, can turn the wear adjustment cam(s) 083 in the direction of more wear adjustment with each impact in the adjustment direction or it can also be the actuator for each additional wear adjustment, turn a greater rotary movement in the adjustment direction, which can save this ratchet, for example. The wear adjustment cam(s) 083 should also be protected against unintentional twisting, e.g. due to friction or e.g. through an additional directing effect (e.g. ratchet). The wear adjustment can also be done using a spring for the wear adjustment 021 (or spring effect), which can be used, for example, to obtain the correct amount of adjustment by creating a specific spring force with a specific deformation of the spring effect, which from a specific counterforce from the wear adjustment does not cause any further adjustment and, based on this, sets a certain air gap between the linings and the friction surface. This can happen both in the direction of movement normally intended for brake actuation and in the opposite direction, and the specific deformation can occur, for example, through control of the actuator or other limitations, such as mechanical stroke limitation or torque or force limitation, such as slipping clutch(es)). A wear readjustment can also be carried out in both directions of actuation, so that, for example, in the direction of actuation, for example, with each brake actuation, a readjustment attempt is made (e.g. for safety reasons) and an additional readjustment attempt can also be carried out, e.g. controlled, by the normally unused direction (e.g. to increase accuracy or also greater readjustment). Instead of the spring action, the force or the moment of the adjustment can of course also be limited in a different way, for example via the actuator moment or, for example, via friction such as static friction in a slipping clutch. Of course, these adjustment options can be used with all brakes, including disc brakes, for example. The radial readjustment direction in FIG. 6 can also be guided in another direction, e.g. via a thread in the axial direction with respect to the wear readjustment cam 083, which can cause an adjustment movement in the direction of the disk, for example in the case of a disc brake. If wear is readjusted in steps (e.g. a ratchet), it is also advantageous to use a corrective adjustment (e.g. angle) of the brake actuator, i.e. to take into account the movement of the lining that this adjustment step causes, so that changes in the braking effect do not take effect in stages during adjustment steps to permit. 7 shows a wear adjuster that is advantageous in relation to the above embodiment in two (of many possible) variants, on the left for example as shown above for drum brakes (but would be similarly possible for example for ball ramp disc brakes) and on the right according to the same functional principle but with differently arranged parts for e.g. disc brakes.

Known wear adjusters can initiate an adjustment movement, for example, when the planned air gap has been exceeded and until a counterforce or counter-torque from the adjustment process becomes greater than what can be transmitted in the adjuster, with a slipping clutch often limiting the adjustment movement so that ideally it starts at exactly the correct, usually small, contact pressure (of the covering) comes to a standstill. However, friction brakes are comparatively "soft" when the contact pressure is small, and therefore an adjustment movement that comes to a standstill with an incorrectly small contact force means that the brake is incorrectly adjusted and, for example, cannot develop enough full braking effect. Slipping clutches or similar have large tolerances (e.g. preload force, its change, wanted and unwanted friction and its change, such as grease or rust) and thus tolerances of the adjustment. In the case of brakes in which there is sufficient actuating movement, a different and more precise principle is therefore proposed which avoids such slipping clutches (which of course could also be used). It is applied that when a spring makes a defined stroke, it produces a well-defined force (which can also be relatively long-term and temperature-stable). Therefore, a defined spring force is generated here with a defined stroke, which actuates the wear adjuster until the counterforce or the countertorque from the contact pressure exceeds the defined spring force. In FIG. 7 on the left, a movement for braking (here rotary movement of the actuating cam 032) is directed via a path-defining movement 085 (here from a cam) from a certain amount of movement (which also determines the air gap) to a force-defining spring for wear adjustment 021, which, until sufficient counterforce is built up (from lining pressure), moves a further rotation device 086 and forwards this further movement, for example, to the wear adjustment cam(s) 083, whereby, for example, the further rotation device 086 can also act in one direction (e.g. ratcheting) on the wear adjustment cam 083 in order to continue to effect progressive readjustment in the readjustment direction. The spring action for wear adjustment 021 can be any, e.g. Coil spring or, as indicated in FIG. 7, a resilient strip or wire. In the case of a ball-ramp disc brake, for example, the adjustment rotary movement would be given to a thread, for example, which brings the lining closer to the disc, instead of to the wear adjustment cam(s) 083.

Another solution with a deflected adjustment movement is shown in FIG. 7 on the right with, for example, a disc brake (could also be a part used in mechanical drum brakes to press the shoes apart), the circles at 011 showing a segment part of the friction surface of the disc. Here one would look at the narrow rolling surface of an actuating cam 032 standing perpendicularly to position 032 on the right, on which, for example, a circular roller 033 rolls (which in turn can be seen as a rectangle because the axis is horizontal here) and, for example, actuates a lever for pressing the lining (not shown). The path-defining movement 085 would be, for example, on the side of the actuating cam 032. (In none of the adjustments described here does the path-defining movement 085 have to be on an actuating cam 032, you can use any other existing movement or rotation, e.g.

also gears of a transmission). Here, too, a force-defining spring for wear adjustment 021 is actuated with the path-defining movement 085, which can also be a resilient strip or wire, for example. Here too (if, for example, the desired air gap has been exceeded) a further rotating device 086 is turned and this rotary movement can, for example, turn a thread or other feed device in one direction (e.g. via a ratchet) in order to bring the lining closer to the disc. A closer look reveals the force-defining spring for wear adjustment 021 and the path-defining movement 085 and also the geometry (e.g. intentional play from when the wear adjustment is turned) and the spring force at which the counter-force (from the lining pressure) stops the adjustment movement vote (e.g. by tests or calculation) so that the desired air gap is set. In reality, the curves are selected so that they run correctly with regard to the result (e.g. the set air gap), i.e. overlapping and merging and not necessarily one after the other, as described for simplification. The path-defining movement 085 also does not have to make a specific stroke, it can also generally have a stroke profile, as shown, for example, in FIG. 7 on the left by a further elevation at 085. This can be achieved that increasing counterforce from increasing Pad contact pressure is also opposed to, for example, increasing force from the force-defining spring for wear adjustment 021, which can cause the air gap to be corrected not only at one point during brake actuation, but also over a further course of actuation through the interaction of force from the force-defining spring for wear adjustment 021 and the counterforce from the lining pressure, a further course of an adjustment movement is possible. Different elevation courses, path-defining movements 085 with different intentions and effects are therefore possible. Even if the elevation (e.g. cam) appears to consist of only one elevation, the realistic course of the adjustment process will often be such that the increasing elevation with correctly adjusted wear is opposed by an essentially increasing counterforce (from pad contact pressure) that There is no significant readjustment movement, but if the air gap (between the brake lining and the friction surface) is too large over the course of the elevation, there is too little or partially or locally too little counterforce, so that adjustment processes occur over the course of the elevation or over areas of the course, even all the more so more and larger readjustment processes, the greater the readjustment requirement. The components involved can also change, such as a bimetal, for example, which ensures more or less adjustment when the brake is hot. Of course, readjustment processes (more or less readjustment in both directions) can also be possible in a different or additional way, for example manually or through the action of the brake actuator or its motor. A combination of the above adjustment with a force-defining spring with an adjustment made by a special actuator actuation is also recommended, in which, for example, the adjustment with a force-defining spring is carried out each time the air gap is overcome, for example in such a way that the brake is adjusted at least to an acceptably large extent and additionally by a specific, specifically additionally brought about actuator actuation (e.g. in an area otherwise unused for braking) is more precisely adjusted, i.e. e.g. more. This means that an acceptable brake setting can be achieved even if the intentional readjustment is wrong (e.g. if the readjustment requirement is underestimated), because this can be done by the readjustment when the air gap is overcome even without a deliberately induced process purely by the mechanics of the force-defining spring. If the process that was brought about in a targeted manner is incorrectly readjusted too often or too much, the brake actuator can and/or the non-linearity (e.g. due to the power or torque reserve of the engine, due to non-linearity that also applies enough contact pressure in this state) must be designed in such a way that even if the linings are rubbing (with the brakes completely released), the required minimum brake actuation is still required is possible and thus (possibly also limited) safe braking remains possible.

A parking brake drive 047 (or other actuation drive, e.g. additional handbrake function, emergency brake, etc.) can also be actuated in many ways with every EMB of every design, e.g. as usual via lever and cam on at least one shoe (indicated with arrows) or e.g. by turning the Wear adjuster (which of course should return to the correct wear adjuster value after the rotation). How a parking brake drive 047 or other actuating drive can interact with the electrical actuation is also shown in the brake lever in FIG. The brake from FIG. 6 can also be designed as a servo brake by actuating transmission 058 instead of an actuating cam 032 and roller 033, whereby the force otherwise supported in the pad support can be introduced at least as a component, e.g. in the area of the roller bearing. Similar to the one shown, two wear adjusters can be used, also with different adjuster properties, favorably matched to the different wear behavior of the primary and secondary pads, or with just one adjuster (i.e. wear adjuster cam 083, wear adjuster lever 084, among others). 8 shows a proposed arrangement which, in addition to actuating the brakes presented here, can also assume the actuation of other, also conventional, brakes and also non-electrical actuation. The at least one actuator should preferably have a non-linear behavior overall in terms of the movement of the covering, but linear drives can also be used, e.g. with threads, or less non-linear ones, e.g. cables on cranks (levers). A brake actuation 017 (e.g. consisting of an actuator, i.e. also an electric motor, also with springs, preferably a non-linear drive, possibly wear adjustment, if necessary a parking brake, if necessary control electronics, possibly also with a power supply) acts via an actuation transmission 018 (which, e.g. with a cable, Deflection parts such as rollers or levers, Bowden cables, linkages, chains, but also hydraulically or pneumatically, i.e. e.g. with pistons on the brake actuation and on the brakes) on at least one brake. This actuator could even be actuated entirely or partially by non-electrical force, for example, an impact force could actuate a non-linear actuator and, for example, actuate the braking as a non-linearity on the one hand, but also a wear adjustment device, e.g. also in the case of opposite movements, such as when actuating and Solve what would of course also be possible with other, e.g. electric, actuator drives. Of course, it would also be possible to minimize the transmission of the actuation (for example by a transmission element for rotational movement, for example) so that the brake actuation 017 is directly on the brake. It is proposed that the actuation transmission 018 and the brake(s) 01 be designed with as little loss as possible in order to keep actuation energy and any necessary return spring forces (which in turn require actuation energy) as low as possible. For this purpose, for example, in a drum or disc brake, pressing parts that roll as far as possible can be used, i.e. those with as few losses as possible through (also "scratching") compensating movements. Cables can, for example, be steered via rollers, Bowden cables with as few disruptive curves as possible and also with reduced friction, for example with plastic coatings. The upper actuation 018 is, for example, a cable, optionally with a pulley(s). The lower example would be a Bowden cable. Of course, one would rather not pair different variants.

Figure 8:
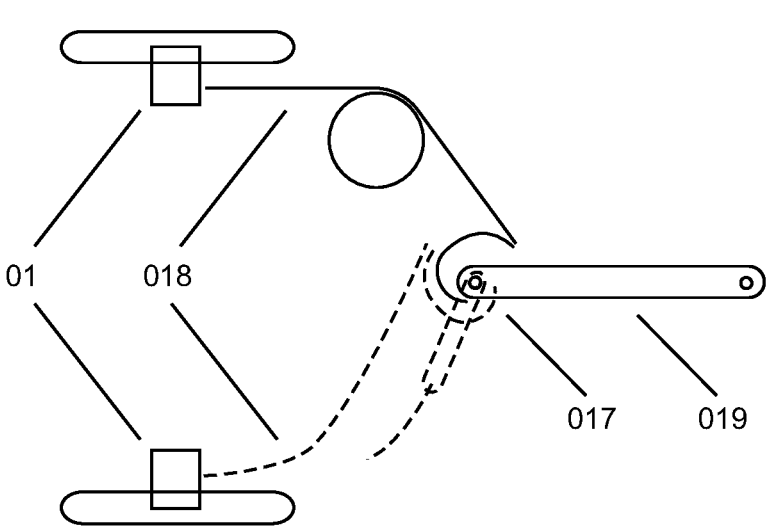
FIG. 8 shows a schematic of an arrangement proposal which, in addition to the actuation of the brakes presented here, can also take over the actuation of other brakes, FIG. 9 schematically shows a possible embodiment of a brake lever or a brake pedal for e.g.

Non-linearities arise in FIG. 8, for example, in the case of brake actuation 017, for example, due to rope windings with a non-constant radius, here decreasing with the actuation. Many other non-linearities are possible, e.g. linkage to levers with a lever effect that changes over the actuation, sensors such as rollers that follow elevations (e.g. cams), etc. In FIG. 8, for each actuation transmission 018 (there can be any number of one, two or more) showed its own non-linearity. However, it is also possible to use the reaction force, so that, for example, the upper actuation transmission 018 becomes non-linear and, for example, the lower actuation transmission 018 uses the reaction force triggered by the upper reaction force, which could be tapped at the pulling part drawn diagonally downwards, i.e. here the lower actuation must be connected. To use the reaction force, the brake actuation 017 would be mounted in such a way that a compensating movement can take place, e.g. via a compensating part 019. A compensating movement (e.g. via compensating part 019) should preferably also be present without using the reaction force, in order to promote good, even application of the actuating force when more than one brake is used. Brake actuation 017 can of course also be attached without the possibility of equalizing the actuating forces, or the actuating forces can also be equalized somewhere else, for example by the actuation transmissions 018 coming from a balancing device, for example a balance beam, on which brake actuation 017 acts.

Wear adjustment would be e.g. possible for the EMBs together by pulling on the compensating part 019, also e.g. by changing its length or by mounting it to the EMB or in the EMB, but the wear adjustment can also be taken over by the brake actuation by continuing to actuate it due to wear. Of course, any other point can also be used for wear adjustment, e.g. on the brakes 01. Existing drives would preferably be used for wear adjustment, e.g. through a specific direction of rotation or a specific range of rotation. Other forces, positions or mixtures of both or other effects can also be introduced into the compensating part 019, such as from a parking brake actuation, from an additional brake actuation (e.g. hand brake, emergency brake, overrun force, etc.). The extent of the initiation or the states can also be measured in order to draw actions or conclusions from it, and superimpositions can also be carried out, for example an initiated position can be passed on by means of the brake actuator to be reduced or increased.

In the case of self-reinforcing EMBs, an advantageous design can be such that the braking effect in the forward direction is, for example, at least 1.5 times higher than in the reverse direction (especially if there are vehicles where you dismount when stationary, e.g. bicycles or bicycle trailers). The braking effect for standstill or for rolling back (which can, for example, also come from at least one spring effect) can also be designed in such a way that in these states only stopping against rolling away (even under unfavorable conditions, such as inclines, loading) is possible. In vehicles that are unlikely to roll backwards (it would be implausible, for example, for a bicycle with a rider to be operated in reverse), the braking effect when driving forwards can be at least twice as high as when stationary or backwards. A duplex brake is therefore proposed, for example for a bicycle trailer, if necessary, in order to enable heavy braking forward and only to prevent it from rolling away or A servo or unidirectional servo design is also proposed if, for example, bicycles can only brake heavily forwards.

In order to save weight and costs (and also for other reasons), brake parts can be subjected to higher loads when braking less frequently than with normal braking, or the non-linearity can also be designed in such a way that it causes this load.

Where appropriate (e.g. in the case of bicycle trailers) it is proposed to make wheels easily removable (e.g. for transport). In the case of a drum EMB, it is proposed that the drum, possibly with wheel bearings and, if necessary, generator or motor, can be easily pulled off an axle journal (e.g. after loosening a push-button lock, a nut, a bayonet, etc.) and in doing so, e.g. Loosen the engine or generator. Brake shoes with associated parts such as drive, wear adjustment should remain on the axle journal, preferably also with a base plate or base unit that carries these parts or carries them encapsulated. This drum brake is preferably designed in such a way that it can easily be used for an axle outlet on both sides (e.g. as is usual for bicycle forks), in which at least the axle journal is redesigned in such a way that two axle outlets (e.g. in the usual assembly design with thread) result.

In the case of a disk EMB, a design with a removable impeller is proposed so that the brake disc with the caliper remains on the vehicle, possibly also e.g. the generator or motor and the impeller (possibly with a wheel bearing) by means of a rotary connection, e.g. after releasing a push-button lock, a nut, bayonet, etc.

Figure 16:
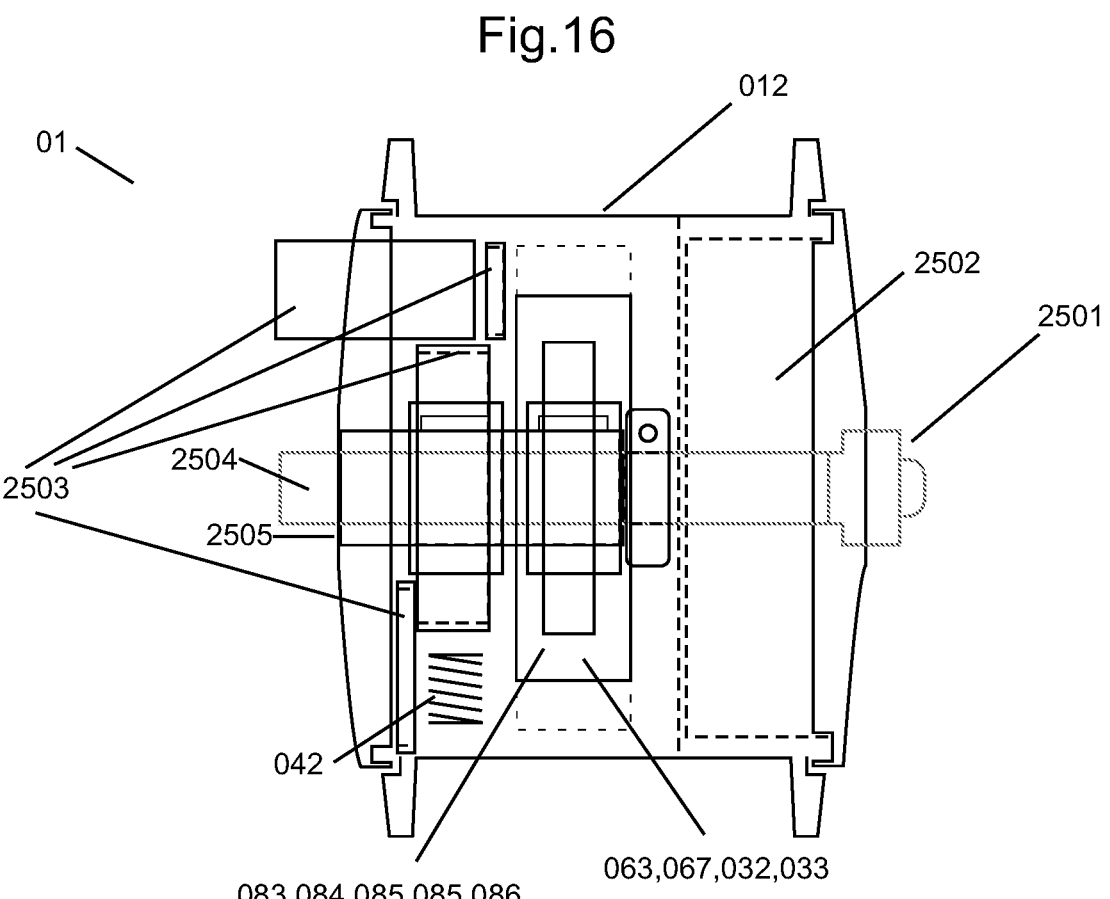

In FIG. 16 one of many possible versions of the brake 01 (here drum brake, brake drum 012) is proposed, which is also suitable for spoked wheels, for example, takes up the above suggestions and has an axle on both sides (e.g. as for swingarms or bicycle forks with nuts on both sides, for example) or as shown with a one-sided axle (similar to the stub axle in car drum brakes), in which case it can be attached, for example, with a wheel nut or, as shown, with a simple release device 2501 (in any case in such a way that nothing comes loose) (such as a push-button lock), which can release locking parts, for example via a pin, even against spring force): It can be an electrical Machine 2502 can be installed (with or without gears, e.g. dynamo, generator, drive motor) which can also provide power supply (e.g. for the brakes or controls, etc., possibly also lighting, etc.) or signals for the speed (e.g. for ABS speed, wheel speed, etc.). Additional or alternative sensors can also be used, such as magnetic sensors, temperature sensors, etc. If electrical parts can be removed with the wheel, an electrical connection that can be easily separated and established is advantageous, for example via spring contacts. In a further area (e.g. indicated by 012), the actual brake parts such as brake pad 063, brake shoe 067, actuating cam 032, roller 033 for example etc. can be similar to those in FIG. 5 and FIG. 7, in the same or another area (preferably nearby) may be parts such as wear adjustment cam 083, wear adjustment lever 084, pressure pad 087, path-defining movement 085, further rotation device 086, etc. Also in the same area or another area (preferably in the vicinity) there can be, for example, an actuating spring 042, for example with a pivotable or tiltable support (or fixed support, which directs the changes in geometry during the movement into spring deformation) and linkage to the brake actuation movement (e.g. crank-like). The components and areas can also be arranged differently or in a different order. The actuator 2503 (e.g. electric motor with or without gearing, indicated by several dashes 2503, which also indicate several components and positions) can in principle also be separated from the brake 01 or also on or in the brake (entirely or partially), but is preferred at least somewhat away from the effects of brake dust, e.g. spatially or e.g. protected such as e.g. completely or partially covered, possibly also water-protected or sealed, whereby protection against penetration (e.g. water, dirt, etc.) also extends to more parts (up to all parts) in the EMB can obtain. An axle 2504 and armature assembly 2505 can serve as an attachment to the outside (e.g. to vehicle parts such as wheel suspension, chassis, etc.) or also as an internal attachment, so that, for example, the components that carry the brake force can be attached to an armature assembly 2505 that is designed to carry force and extends into the interior of the brake or can be articulated, as well as, for example, parts around the actuating spring 042 or this inwardly guided armature assembly 2505 also protrudes in a force-bearing manner over other parts, for example over gear parts or spring parts. An additional, non-electrical actuation (e.g. similar to that in FIG. 6 as a parking brake drive 047 designated) can be led to the outside, which can also fulfill other tasks, such as for safety reasons as an additional or alternative actuation or, for example, as a brake in a non-electrically actuated operating state, such as pushing or pulling.

It is proposed as particularly advantageous to design the EMB in such a way that as many applications as possible are opened up or made possible. This means that longer braking using spring force can be recommended as an advantageous design (which, for example, reduces the electrical energy consumption even if the vehicle is stationary for a longer period of time) or that such a parking brake position is provided in which, for example, without additional measures or components (apart from those required for the at least one spring is necessary), especially preferably without releasing a brake can be brought into a parking brake state (or goes automatically), which causes no or permissible low power consumption. This longer braking from spring force or parking brakes can also be provided for safety reasons, so that the EMB, for example in the event of a power failure or error, goes into a clearly but essentially harmless strong braking state, i.e. for example in the range from 0.2 g to 0.5 G. This condition can also be solvable (e.g. by an action) in order to enable the vehicle to continue driving without electricity, for example. In particular, in addition to the electric brake actuation, another one (e.g. mechanical or pressure-actuated) can also be provided, which is applied or engages automatically (e.g. after a certain actuation) or as a substitute. In particular, a vehicle that is also operated particularly slowly, for example by a walking person, should also be mentioned as a possible application. In this mode of operation, the available electrical energy can be particularly small, e.g. only that which is generated by at least one vehicle-driven power generator (or other generation such as light effects, wind, etc.) and instead of, for example, an additional (e.g. mechanical or pressure-actuated) brake actuation In this case, it was proposed to design the EMB in such a way that it uses as little power as possible when the brake request is "released", for example, and switches to a power-saving position if the brake request is longer. In particular, it is recommended that the non-linearities in the EMB be designed favorably for this. For example, a spring on a crank can rotate to support the actuation or a non-linearity in the surface pressure can act in such a way that the spring can achieve a desired braking state and stronger braking up to full braking, for example with additional power consumption, can be possible. For a longer period of non-braking, for example, the spring on the crank can assume a dead center position or a position close to the dead center. An actuated state when stationary can also be recommended for safety reasons if, for example, a vehicle or object is to be secured against accidentally rolling away (e.g. with a child on a sloping ground, in the wind, etc.), whereby it can also be recommended here to design this braking effect in such a way that that, for example, with a full load and a conceivable gradient or wind (e.g. of a passing train) there is no rolling away, but the braking effect that can be achieved with this can also be designed in such a way that it does not develop a dangerously strong braking effect when driving (which can lead to blocking, rollover or loss of control, for example). could lead) if it should occur, e.g. due to a fault or e.g. an operation (including incorrect operation, e.g. unintentionally while driving). A good one from many possible combinations can consist of an initial switch-on of "complete" switch-off (residual currents that do not lead to any functional impairment would be possible), e.g. a switch that can also switch on other brake functions (e.g. also switch a brake light). can, also for example for safety reasons, only allow braking when switched on, etc.) and a brake request detection (e.g. cable force, pressure or position, deceleration, impact force detection), whereby additional combinations may also be recommended as advantageous, e.g. that the first switch-on is also possible with the support of electricity from a generator, for example, i.e. when the wheel begins to rotate. This can be done, for example, by means of a device that can be inserted into the cable pull (preferably at one end), through which, for example, the cable is threaded or, for example, the cable is passed through a slot or the cable is attached to it. Several of the above functions that switch on or want to brake are also possible, for example at least one on the towing vehicle and at least one on the trailer, which can be used, for example, when the trailer is being pushed.

List of Measures

From the above, the following "list of measures" (which was mentioned above because it also includes the non-linearity, spring effect, self-reinforcement, etc.) is recommended, where power is required for electronics, for actuator when holding position or moving actuator (with Actuator motor rotation), for short standstill and for long standstill, power generation from generator, power storage in battery or accumulator (here summarized as battery) are included:

Normal ferry operation: The generator energy output is designed in such a way that all braking functions are possible, including ABS and ESC for a plausible time. A battery (even a small one) is preferably charged. A non-electric auxiliary braking function, e.g. mechanical (also e.g. from a certain brake actuation position), may be available.

A change to other companies should be possible, e.g. in the parking brake position.

Slow ferry operation, including walking (e.g. "jogging"): The generator energy output is preferably designed similar to "normal ferry operation" in order to arrive at a sensible generator dimensioning. However, it is designed in such a way that only a minimum function is created, e.g. seldom actuator movement, but longer actuator position maintenance. For this purpose, the spring effect and geometry are preferably designed in such a way that holding them released is possible with little or no electrical energy and the braking operations that can be expected during slow ferry operation (e.g. normal gradients with normal loading) are possible either without actuator energy absorption due to the spring effect and friction losses in the brake actuation the generator energy output is designed in such a way that it is also possible to hold such an actuator position for a longer period of time, preferably for a very long time. A low "emergency braking power requirement" for slow ferry operations can be provided by the battery, since it is only a matter of significant braking when one person is pushing the vehicle, for example. Additional power saving measures are recommended, e.g. that the brake electronics only needs more power or if a brake application (e.g. by a switch) is detected and the processor or the electronics are working in a power-saving state, for example. The "slow ferry operation" can also or only non-electrically brake. A non-electric auxiliary braking function, e.g. mechanical (also e.g. from a certain brake actuation position), may be available. It should be possible to switch to other companies, e.g. in the parking brake position.

Short standstills: They are covered without generating energy from the generator (or with something other than driving, such as photovoltaics), but with as little battery support as possible. Preferably, the EMB only accepts currentless positions, such as fully released or braked in such a way that plausible gradients and influences such as wind, headwind etc. remain secured against rolling away. The electronics (including the processor) are also operated in a highly energy-efficient manner and react, for example, only to changes (e.g. braking request, vehicle movement, etc.) or only react slowly (without, for example, being disturbingly slow). This condition can also be covered or supported non-electrically. It should be possible to switch to other companies, e.g. in the parking brake position, starting to drive. At or before battery power failure, the long standstill (see below) can be activated.

Long standstills: Coverage without generator energy output, possibly with other energy generation such as photovoltaics or absorption of stray fields (e.g. electromagnetic nearby power lines). An actuator position is preferably set prior to power failure in which plausible gradients and influences such as wind or headwind remain secured against rolling away. A theft function can also be achieved with the actuator, so that, for example, moving the vehicle or removing wheels (due to the pad contact pressure) is made more difficult and also occurs again if unauthorized use occurs. This condition can also be covered or supported non-electrically. Switching to other companies should be possible, e.g. For example, an input can be made, e.g. a button is pressed or the brake lever is pulled briefly in order to switch on the power again and react with the electronics. With this, many things can be possible, from immediate driving authorization to unlocking functions, e.g. interaction with an authorized mobile phone for unlocking.

Long standstills without the possibility of restarting (e.g. due to a defective battery): It is preferred that power can be made available, e.g. through a USB connection, battery charging, unlocking the brakes and pushing or Driving for power generation. In this phase, if necessary, no anti-theft protection should initially have a preventive effect.

Other states: Can be added through the many possibilities of the EMB and would be (e.g. also through interventions from outside) e.g. braking, if e.g. a child does not do this, ending the possibility of driving, unbraked parking (if e.g. pushed to another place more often should be triggered, also by remote control or also limited in time, also with transition to parking brake function and anti-theft protection under certain conditions, such as long distance, prolonged movement, etc.), also intentionally uncontrollable up to dangerous driving behavior, e.g. in the event of theft, etc., group behavior (that e.g. entire groups of vehicles can be locked, braked, unlocked, etc.) that activate certain functions depending on the presence of control signals (e.g. reception of radio signals, signal to cable or receiver, etc.). are or can also be changed in function or switched off in a time-controlled manner without these signals and so on. The reverse data direction can also be possible, for example by sending data from the brake(s) of at least one vehicle or others, such as position, speed, images, films, environmental data such as temperature, etc., to an output (e.g. for the driver) and/or recorded, for example displayed/recorded with Bluetooth on a mobile phone, for example. A controlled triggering of such functions is also possible, so that, for example, with a certain braking effect (or, for example, delay or speed of value changes), functions are changed in the function, e.g. recording(s) are started or made more detailed, also with tachograph Function, i.e. also with passing on the data, for example to obtain an insurance tariff or, for example, a permit, such as operation in a pedestrian zone. For example, the brake control (or parts thereof) can also be performed externally, i.e., for example, by a mobile phone, also including measured values, such as the deceleration measurement of the mobile phone.

Other features may also be possible, such as the brake (or parts thereof) being easily removable from the vehicle (e.g. the wheels of a bicycle trailer including the brake drum can be easily removed, e.g. by pressing a button, that parts of the brake or the actuator are covered e.g. against brake dust), that e.g. a drive motor interacts with the brake or is assembled or installed and can also be removed with the drum, that such a motor can also act as a generator, e.g. for battery charging or for regenerative braking that regenerative braking is preferred or that the friction brake is only used if this is not sufficient, that a generator or motor also emits wheel speed signals (e.g. use of alternating current for ABS speed), that the generator or motor emits other information, such as e.g. temperature (e.g. via the copper resistance of the winding(s), for which e.g. the brake actuator can also be used) or e.g. wheel load-dependent changes, for example, of the air gap (and thus, for example, enables a wheel load estimate) and others. Especially for car trailers (or heavier ones, or also for other uses such as agriculture, construction sites, etc.), but of course also generally as a safety aspect, for example (e.g. also from the list above), a secure power supply can be recommended, e.g. as a further list item "Loading or buffering" a safe power supply: this is recommended, for example, preferably without expensive additional parts such as larger generators (which could feed certain braking operations directly, such as up to part of the full braking torque), e.g. preferably only one battery or accumulators (which, for example, can already be present on the trailer), also in combination with a small power generation. For example, the ABS wheel speed signal can be generated in such a way that charging current (e.g. for a battery, capacitor, etc.) is also generated (e.g. by coil(s)). A type of statistic is preferred, e.g. how long you have to drive at which minimum speed in order to get a certain number of brakings of a certain strength available again, e.g. that from 25 km/h, for example, another one in 5 minutes "Normal" braking with e.g. g/3 should be possible. This is primarily based on reasonableness and typical driving behavior, i.e. that a certain driving time between braking is typically possible, but can rule out, for example, that constant starting and braking in a traffic jam, for example, does not or only partially contribute to the charge. Even a small photovoltaic system can, for example, keep the battery in the required condition or offer this option if the trailer is not used for a long time.

The above "list of measures" serves as a beneficial collection of points and their details and can be fulfilled in whole or in part (or not if inapplicable).

Control or Regulation of the EMB(s)

For the control or regulation of at least one EMB, it is proposed (generally, i.e. also independently of the explanations and applications mentioned here) that a control loop is also formed, which compares the setpoint value of a braking effect specification with a determined actual value of a braking effect and thus activates the Brake regulates, e.g. adjusts the actuator position in such a way that the deviation between target and actual is as desired, e.g. becomes small, which is possible with the usual PID regulations (or parts thereof) with regard to time behavior or accuracy. Many things can be used as a value for the braking effect achieved, such as E.g. deceleration, braking torque, overrun force, braking force, pad contact pressure force, actuation force. In particular, it is recommended that the actual value is measured, determined or estimated or, for example, is obtained from a model behavior or behavior that describes the brake, or that the pad contact pressure force is inferred from measurements within the brake and/or calculations, e.g. from the actuator torque, or An actual braking effect is determined via the current coefficient of friction or friction radius. It is advantageous that at least one of these values is output by the brake, i.e. analog or digital, for example. The setpoint braking effect can be limited in terms of increase (e.g. per time) or, for this purpose, it can be filtered (e.g. low-pass filter) and thus, for example, intermediate values can be formed in the event of a jump in the setpoint braking effect, with the time behavior of the increase preferably being selected in such a way that the brake can follow So there is no to tolerably small additional delay in the actual braking effect. The PID or similar control parameters are preferably also selected so that there is no or a tolerably small additional delay in the actual braking effect, since the motor also needs time to adjust and the time behavior of the increase and the control (PID) are selected in such a way that the brake does not need or only tolerably needs longer than the motor or the entire actuation (including e.g. spring(s), non-linearity, etc.) allows. Since there can be non-linear relationships between actuator activation and braking effects, it is proposed in particular to examine this regulation using the known methods of regulation technology for the known advantageous properties of a regulation, i.e. for example stability against a tendency to oscillate. There will be time behavior between the input and output variables (e.g. target and actual braking effect) and this can (depending on e.g. amplification) result in a tendency or condition to oscillate, for example due to the phase position. It is therefore recommended to examine this if necessary for stability or stability reserve (in the event of possible influences and tolerances), which can take place within the brake control, but also outside of a model and e.g. through different parameter combinations (e.g. PID or parts thereof) or Variation of possible influences or tolerances can happen and e.g. have good jump or time behavior as the goal but can also recognize or detect a tendency to oscillate, e.g. with variable (e.g. constant or a digital representation of constant). should exclude. The known methods of control engineering can be used.

It is also particularly advantageous if different brake-effective parts are treated individually in the control or regulation, e.g. the two linings of a disc or drum brake or the individual friction surfaces, e.g. those lying further outside and lying further inside. It is suggested as "individual" that (e.g. also iteratively or in approximation steps) the e.g. influencing connection is solved or approximated, i.e. how e.g. a certain actuating force causes a e.g. causes a certain coefficient of friction and thus a certain braking force per pad or group and the respective frictional force with the respective speed of the frictional movement causes a certain heating of the pad or group, which in turn determines the coefficient of friction or a possible self-energization and this improved or more precise state e.g. is used in the next run of calculations (which can be as described above or similar). Essentially, this suggestion serves to gradually solve the mutually influencing variables when calculating with two or more friction pairings. The two or more braking forces can of course be combined to form an overall braking effect (e.g. braking torque) or it is of course also possible to combine several friction pairings and use the method in a similar way with, for example, one friction pairing representative of all. On the actuator side, it is of course conceivable that several actuators are used for the friction pairings, but it is also proposed that the contact pressures are carried out, for example, by "an actuator", with "an actuator" being, for example, an electric motor, possibly other energy storage devices, such as at least one Spring, or additional operations (e.g. for safety reasons and/or for example as a parking brake) may exist. If it is favorable for the brake control or regulation, for example the actuator position or the actuator torque (or similar expressions with a similar effect) can be divided individually for the friction pairings. In particular, it is proposed that the actuator torque can be divided according to the actuating forces for the corresponding friction pairings, for which purpose that division can be used as helpful, which is described above described (e.g. also determined iteratively or in approximation steps) allocation to braking parts arises. So if, for example, the above division results in a specific ratio of the actuating forces, this can in turn serve as a measure (e.g. distribution ratio) for dividing an actuator torque.

It is suggested that if necessary at least one wheel is braked with a slight time delay or with a slightly different braking effect in order to draw conclusions about the road grip from the different wheel speeds that may occur and, if necessary, to derive from this how far a braking effect can or could be increased. This can be suggested both in the event of actuation and/or in the event of release and/or in the event that an anti-lock braking or slip control measure is used, for example by inferring from the behavior of a wheel how at least one other wheel is also developing with regard to slip or traction The blocking limit is behaved and the above knowledge is used to prevent excessive slip, blocking or also insufficient braking. Insufficient braking can mean that more braking would be possible (e.g. due to a change in road conditions, e.g. from bad to better) and that is hereby supported or applied. Determination of speed (e.g. over ground) can also be made possible or improved or supported with it, whereby of course other speed determinations or estimates can also play a part, such as by integrating or summing up from acceleration.

It comes from a "brake request" of whatever origin (from e.g. lever, pedal, emergency brake assistant, automatic driving, sensor such as force, axle or wheel load, impact force, deceleration, speed, location such as with GPS and any other variables and estimates or determinations such as mass or vehicle mass) in any size (e.g. deceleration, percentage, "brake force", unitless, etc.) a state of an electrical actuator (electric motor, magnet, etc.) caused, e.g. motor angle, current, etc. . . . This can be done here via software (e.g. C, Simulink, etc.) or an analog circuit, but in principle any way, e.g. via fuzzy logic, neural networks, tables, switches (e.g. step switch, brake light switch) or in combination, so that e.g. the EMB can only brake or is supplied with power from a certain switch position. Also the combination of input variables is recommended, i.e. braking request and vehicle data such as current axle load(s).

It is particularly advantageous if the control or regulation can also output the set values, e.g. from measurement, estimation, determination, etc. or combinations thereof. In connection with this issue or in general, one of the many options suggested is that, for example, a controller controls the actuator state, e.g. its motor angle. The braking effect can be measured or estimated or determined by e.g. brake data such as instantaneous stiffness, instantaneous deformation (e.g. caused by the actuator actuation), instantaneous actuator data (e.g. current), other influencing variables (e.g. instantaneous coefficient of friction and/or friction radius). of a braking effect (e.g. braking torque). Another suggestion is to use the determined or measured braking effect in a control system for comparing the actual braking effect and the target braking effect and to derive new or improved actuator setting data (e.g. actuator position or angle) from this. A potentiometer, for example, can determine a current angular position and a DC motor, for example, can be moved until the target angle (which is determined, for example, from the braking effect that is currently required) and the actual angle are sufficiently close, or a brushless DC motor (BLDC) receives and regulates the improved position as a target value via, for example, a Field Oriented Control (FOC) in a position control loop.

In a simplified variant, it is proposed to carry out the target/actual comparisons of the braking effect on the one hand and the actuator position control on the other hand as only one common control, i.e., for example, to carry out the actuator position control directly as a braking effect control or to interpret it in such a way that only one controller is used instead of two controllers operated one after the other whose abstract task is to approximate numbers from target and actual values, whereby it doesn't have to matter what the numbers express (e.g. braking effect or actuator position). This is proposed, among other things, for simplification, but also for more stability against possible oscillation behavior, since several interacting controls can be more problematic in this respect than a smaller number of controls. Of course, this could also be related to other simplified regulations, such as contact pressure or actuator torque or current. It is also recommended a conceivable to solve erratic behavior (which can make control more difficult, for example, due to the lack of intermediate values) by taking suitable precautions (e.g. with executable instructions for those cases that otherwise have no clear instructions for a solution). For example, states with a braking effect of 0 can be all states before the contact of the brake pad with the friction surface and states with changing contact pressure from the beginning of the braking effect and e.g. for "all states before contact" only one actuator position that is favorable for this is used, e.g. 0.

For example, the actuation status of the brake (e.g. actuator values such as e.g. position or force) in a control or regulation in such a way that e.g. a certain impact force (whereby "specific" can be pushing, pulling or impact forceless or arm) or e.g. a certain deceleration or another variable, which e.g. even at least one temperature of brake parts (e.g. as a measure of the braking effect) is achieved.

Detection of a braking request using a brake pedal or brake lever simulator If, for technical reasons, there is no braking force-dependent operating resistance in the operating element (e.g. brake pedal or lever) when controlling brakes, the user can be given a familiar feeling for the generated force using appropriate simulators (force-generating devices).

It is proposed here that materials and/or geometries be used in the brake pedal or brake lever simulator and/or that different combinations of these interact over the course of the actuation, so that an actuation force that changes in a controlled manner over the actuation path is created and that this is in particular of a proportional force-path relationship may deviate. This relationship can be more progressive, i.e. with more actuation disproportionately more force is developed, e.g. by a material (solid, liquid or gel-like) that exhibits stiffness or toughness that increases with the force or, for example, has a load-rate-dependent stiffness or toughness. Alternatively or additionally, the geometry can change via the actuation, for example variable leverage, thickness and/or area (in that, for example, more area is created or becomes effective in the event of compression) of an elastic material. Various parts can also interact one after the other over the course of the actuation, so that, for example, with more actuation, more and more parts that generate the actuation force become effective, which can take place in stages or with a transition. Other effects can also be added or felt in areas of actuation, for example the actuation force originating from an additionally actuated brake system after a specific actuation. For example, for safety reasons (or because, for example, a further braking effect is desirable), a mechanical or hydraulic brake can also be actuated from, for example, a larger lever or pedal travel and also contribute to the actuating force or to the actuating feeling. Wherein in, on or in connection with levers or pedals, which are (also) used as a simulator, force, displacement or both and also additional values such as time courses, i.e. sudden actuation, can be determined.

9 shows a basic, possible embodiment of a brake lever or a brake pedal 20 for e.g. manual or foot operation. Here, for the sake of simplicity, the word lever is always used, which therefore also applies to a pedal, i.e. the parts are shown and described according to their function, but can also be arranged in any other way and parts or functions can also be omitted or additional ones can be added to supplement. A purely electrical output of an actuating force 2001 is possible. A lever 2002 (as the actuating part of the entire brake lever or brake pedal 20) is guided, e.g. rotatable about a bearing point 2003 and is restricted in the actuating movement by limitations 2004 (of which e.g. at least one can be adjusted, but which can also be e.g. shaped geometry arise).

The type of setting option is arbitrary for this, i.e. all settings. e.g. by screwing, bending, adding, removing, but it can also be a fixed setting without any intended adjustment.

The lever can still be in the first operating range without triggering a braking effect and can be brought in this first range with a lever play spring 2005, for example, in a position as far away from the actuation as possible or, if the lever play spring 2005 is omitted, without spring force. If the lever is actuated further, a presser 2006 (for pickup 2007) will also move the pickup 2007 via any adjustment option, i.e. rotate it around a bearing point 2003, for example. For example, in a bearing point 2003 there can be, for example, a rotary sensor, i.e. at least one resistance that can be changed by rotation or movement (e.g. at least one potentiometer) or at least one sensor for sensors 2008 (e.g. distance sensor), with all such sensors or sensors an initially electrical signal (e.g. analog, digital, PWM, etc.) (which can contain a variety of information, such as brake lights, brake request, timing, etc.), which can then be further processed (e.g. on the lever, in the housing of the lever, elsewhere) and e.g. via wire or wirelessly (e.g. electromagnetically, sound, etc.) and ultimately serves to control or regulate a braking effect of an EMB and can also be understood differently as a signal corresponding to the braking strength, e.g. as a deceleration signal (where the difference can be that a brake signal can have a relationship with the braking effect, i.e., for example, a proportionality to the braking torque, which means that, depending on the mass, a different deceleration occurs with the same brake signal The mass can be derived from acceleration, ABS behavior, etc. estimated or even be "unnecessary" in the sense that heavy braking is always requested and this leads to increased wheel slip at an early stage, e.g. with a lower axle or wheel load and thus also produces less braking effect with less axle or wheel load due to wheel slip limitation or ABS. Any adjustable pick-up stop 2009 can define the start of the lever movement with output of the braking effect, i.e. a recognizable variable sensor or pick-up signal is preferably produced from here, but also an actuating force that can be felt by the operator, which is generated here, for example, with a first actuating force spring effect 2010 (which is also can be set arbitrarily).

An advantageous embodiment would have at the beginning of the lever movement a movement with very little or no spring force without a braking effect (similar to a hydraulic brake until it comes into contact with the master brake cylinder) and from a certain lever position, best defined by the pickup stop 2009, with a first actuating force spring effect 2010 from a movement of the Pickup 2007 the lever actuation reproducing sensor or pick-up signal, whereby both from recognizable sensor or pick-up signal and actuating force spring effect 2010 is present and the operator has the best possible feeling for the braking effect starting from here. This behavior can be designed to be as tactile as possible in order to clearly signal to the person braking when the braking effect begins. The further course of the characteristic curve (e.g. actuating force, lever travel, braking effect, deceleration) with well-dosed, light braking will preferably transition into increasingly stronger braking with the corresponding lever feel, which can be easily implemented with the design shown compared to simple springs. Spring effects can be brought about with springs or with other solutions that behave like springs. Advantageously, more and more actuation force 2001 is generated with increasing braking lever movement, which can or should also be disproportionately high for the usual feeling of actuation, for which purpose the further actuation force spring effect 2011 serves. This can be generated with at least one spring effect, but also by a combination of several, for which the geometry can also be used, e.g. that different positions cause different moments and thus leverage forces and different starting points can also be used due to e.g. different contact positions, which is 2011 is indicated by different springs and lengths, which can also have any adjustment options. This serves to make the course of the actuation force 2001 advantageous over the actuation path. In particular, at least one actuation force spring effect 2011 can also be carried out by an elastic part 2012. A part made of an elastic material (e.g. rubber, foam rubber, silicone, plastic, etc.) can also have different cross-sectional geometries over the length or consist of different materials in order to achieve easily designable elastic behavior over the course of actuation and also to achieve significant to high To cause actuating forces 2001, as they can be low, for example, against emergency braking.

Brake Actuation and Force Measurement

Figure 9:
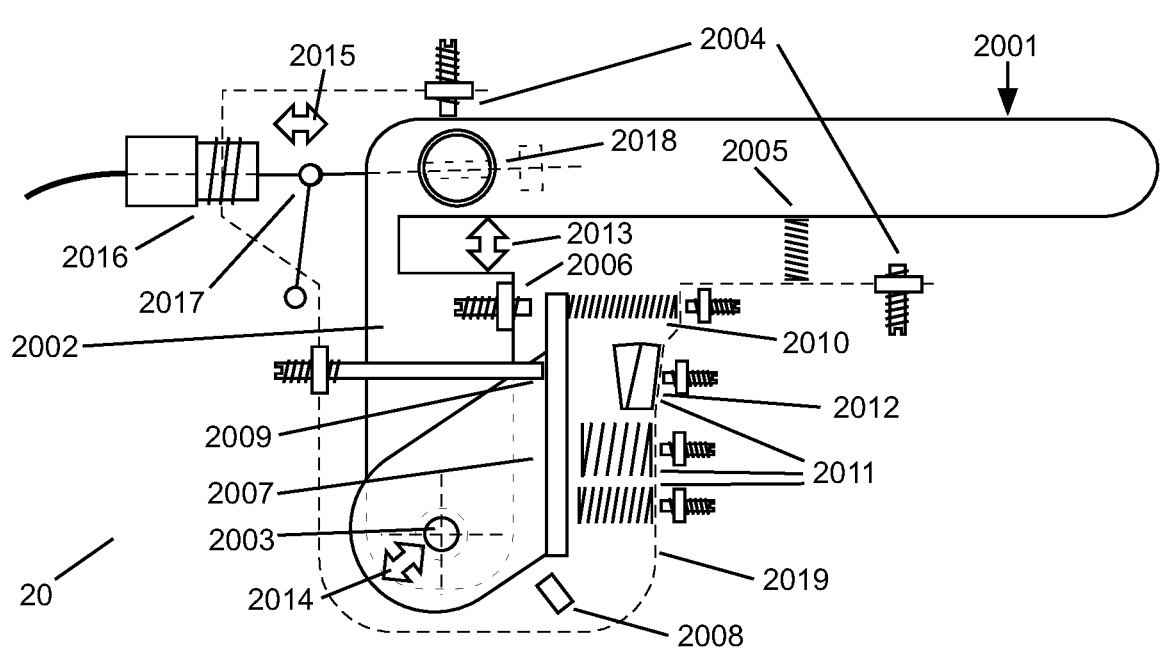

At least one leverage measurement 2013, reaction force measurement 2014 (e.g. measuring force on a fastening or bearing that is related to the leverage) or transmission force measurement 2015 is also proposed where appropriate, with a transmission force measurement 2015 measuring, for example, forces that are applied to other functions, such as e.g. a pressure or power-actuated brake, to be passed on, for example, in addition to generating an electric brake signal or to use such as an emergency brake, for example, if, for example, the lever is pulled particularly far. In FIG. 6 it was shown that an additional parking brake drive 047 or other actuation drive (e.g. as an emergency braking function) can advantageously be present on each of the proposed EMBs and in FIG. 9 it is shown at the cable connection 2016 how a non-electrical brake actuation can take place in addition to electrical signaling. How electrical and non-electrical actuation can work is shown here using two different methods. Firstly, a case of simultaneous electrical and non-electrical actuation is avoided because, for example, it can have a disruptive effect if, for example, the person operating the brake feels the rope behavior at the same time, i.e. the flat friction, a rope actuation force (which can also interfere with the force generation in the lever). or can feel several application points of the brake actuation (e.g. if the force generation in the lever allows you to feel a different point of onset braking effect than, for example, the cable actuation). Therefore, when combining electrical and non-electrical actuation, it is recommended that a clear separation of the electrical and non-electrical actuation should take place, particularly advantageously, so that both actuations should not take place at the same time, at least not in normally used actuation areas. The lever from FIG. 9 would, for example, be equipped with an intermediate lever 2017 and, for example, intentional play in such a way that the rope only starts to pull after a certain lever has been actuated, for example only when the lever is pressed far, for example into the full braking range (i.e. similar to a car dual-circuit brake, which requires more pedal operation if one circuit fails). Of course, a rope, for example, could also be hinged to the lever with play (e.g. in an elongated hole) (but it can act in a disordered manner, e.g. due to friction, in the elongated hole on the lever). An intermediate link similar to 2017, which avoids or reduces disordered non-electrical actuation influences through its design, is cheaper. Regardless of whether the electrical and non-electrical input of the actuation takes place at the same point (e.g. on the brake lever), it is fundamentally advantageous in this first method if the electronic control also has this splitting behavior (that the electrical and non-electrical actuation normally do not act at the same time) is supported, i.e. the EMB(s) are controlled in such a way that normally (e.g. without an error) the EMB takes over the braking, i.e. acts earlier or more strongly than the non-electric one, in particular normally only brakes. A second, different method is also presented. Instead of simulating the actuation force in a lever or pedal as in FIG. 9 during EMB actuation, a non-electrical actuation can also be intentionally provided at the same time as the electrical actuation, so that the tactile actuation force comes from the non-electrical actuation, but still supports the electrical actuation of the EMB or mainly acts and thus reduces the driver's actuation force or also essentially preserves the actuation feeling that comes from a non-electrical actuation, but reduces the force. Nevertheless, force-generating parts can of course still be in or on the lever or pedal or act there.

In addition to the conversion into a change in length (e.g. via a spring), mainly strain gauge-based (e.g. DMS, load cells) or capacitive or piezo-based force sensors are known. In this sense, for example, the minimal change in length of a brake cable would also be suitable for measuring the tensile force. Here, however, it is assumed that zero point errors in particular are disruptive for the methods shown and, for example, tolerances under force can also be less disruptive because zero point errors can trigger constant braking, for example. Tolerances under force would mainly affect heavy braking, but drivers also apply them quickly and less purposefully, so they would also be less noticeable.

Other instabilities and costs arise in known methods, for example, due to amplifiers (which in turn can have a zero-point instability) or, in principle, because piezoelectric voltages, for example, should be recorded with almost no current, which can cause problematic changes overall when braking for a long time. The advantage of these measurements would be the mostly good linearity. However, it is proposed here that a method is also advantageous which, on the contrary, is based on strong non-linearity of the sensor and, in particular, that such sensors are used. In the case of friction brakes, there is often a directly proportional relationship between the driver's force and the braking effect, which means that when a force is measured (e.g. a cable pull force on a cable connection 2016 or any other force controlling the EMB) for an EMB actuation, the suggestion of a strongly non-linear force sensor behavior only occurs in the following explanation needed. Such a proposed sensor can, for example, have a (also strong) logarithmic relationship between force and signal (e.g. resistance). This would have the opposite causal effect on the required zero point stability, because the resistance, for example, can change very significantly with small forces. But that is exactly what will happen here used to stabilize the zero point tolerance by using the area of the sensor in which these changes caused by small fluctuations no longer play a role. In the case of a Force Sensing Resistor (FSR), for example, a range from e.g. Megaohms to e.g. 10 kOhms can be defined as non-braking by operating it in such a way that the force to be measured in the non-braking force range falls within such a resistance range. In this exclusion range it would of course have an (up to extremely) unstable zero point, because the very slightest change would immediately cause a change in resistance of, for example, a few megaohms to a few hundred kiloohms, and only the use of the preferred non-linear (here, for example, logarithmic) behavior makes operation in one range that can be described as zero-point stable. Furthermore, a braking range can be used, which can range from 4 kiloohms (e.g. beginning braking) to 400 ohms (e.g. full braking). Here, too, it is advantageous to select the signal range, the force and the braking effect in such a way that the non-linear behavior supports the accuracy requirement, e.g. by selecting the braking range in such a way that for weak to normal braking (e.g. from g/10 to g/3) a larger signal (e.g. resistance) change takes place in order to achieve good accuracy with these braking operations and a smaller change in resistance is used against full braking. The previous explanation of "zero-point stability" and "use in certain areas" can also be extended because it can refer to stability at any force if the parts (e.g. also springs) and areas in FIG. 10 are designed accordingly and it will For such a stably operated force measurement, the term "stabilized force gauge" is used in the following. If these sensors do not have the property of a particularly high accuracy (e.g. a few percent inaccuracy), this selection of the operating range can still be used to solve the brake control in such a way that the driver has a well-controllable and accurate impression. For this purpose, it should also be used that in the case of sensor changes, the signal range that controls the brakes occurs with approximately the same actuating force, i.e. it is not noticeable how the actual actuating force changes a little if the braking is mainly due to the driver's perception (e.g. deceleration, noise, optical) is made.

One of many possible embodiments is shown in FIG. About force distributor 2101 forces to a suitable according to the above illustration Force sensor 2102 is guided in such a way that its force-sensitive surface is loaded in such a way that the above relationships (in particular areas) result and the design of the force distributor 2101 results in a favorable force distribution over the surface (i.e. they are chosen so thick that the force distribution on the surface is even enough). The device from FIG. 10 can thus be inserted into a cable pull, for example, in that the cable is passed through and one force distributor 2101 rests, for example, on the cable sheath and the other force distributor 2101, for example, on the nipple into which the cable sheath was previously inserted. A spring 2103 can be present in order to further increase the zero point stability, e.g. to definitely push the force distributors 2101 apart if no or only a small force is introduced, e.g. from an actuating cable 2104 (or another force transmission such as a rod). can originate.

To make installation easier, a slit can go through the stabilized dynamometer, for example, so that a rope does not have to be threaded through the parts, but can also be inserted through the slit, for example. Instead of a rope, any tensile or compressive force transmission is possible, e.g. a rod. At least one spring 2103 can also be used in particular to keep the force sensor 2102 in the stabilized operating range required here. For this purpose, e.g. a spring 2103 can relieve the force sensor to such an extent that the zero-point stable range (e.g. if the force increases beyond this) can be used. Springs can also be attached parallel and/or in series to the force sensor 2102, e.g. to keep overloading high forces away in such a way that e.g. a portion of the force is parallel to the force sensor and thus not on the force sensor and e.g. force sensor there. This means that force sensor 2102 can be operated in such a way that, depending on the spring design, the cable pull shows stable behavior even in non-zero forces and the cable force can also be higher than that on force sensor 2102.

Of course, FIG. 10 can be modified or also detect tensile forces or tensile and compressive forces and the actuating cable 2104 can run through the force sensor 2102, but the force can also be applied to the force sensor 2102 as desired. Of course, the characteristic curve of the force sensor 2102 can also be linearized or assigned braking effects. Of course, this method can also be used for other force measurements such as impact force, axle load, wheel load, recording a load, payload, the presence of a person or the weight. If, for example, a force within a composite vehicle is to be kept or regulated at a certain value, instability (e.g. of the zero point) can be very disruptive. If, for example, a drawbar force is to be kept as small as possible (e.g. regulated), a drive motor could, for example, recognize a drive requirement if the force measurement is incorrect at zero point (e.g. drawbar force), although braking force has already been set elsewhere, for example, or vice versa. Of course, this applies to any consequences and incorrect settings resulting from a zero point shift or an inadequacy with the same or a similar effect. This could be used, for example, to represent a trailer drive with relatively zero drawbar force, which reacts as neutrally as possible without the above problem of exactly the wrong force, e.g. in an area that can be described as "unrecognizable", i.e. e.g. goes into regenerative braking when the tiller extension is detected and, for example, also applies additional brakes if the tiller force is higher than that which can be controlled regeneratively. Any combinations can of course be made, such as only driving combined with braking, only neutral combined with braking, only neutral combined with driving.

A stabilized dynamometer is also particularly advantageous for the combination of electrically controllable brakes with manual or foot-actuated brakes if the force of the manual or foot actuation is measured and used, among other things to avoid the need for a simulation or the artificial generation of a hand or foot force to be able to For this purpose, for example, a stabilized dynamometer would be inserted into the cable of the rear wheel brake of a bicycle, for example, and thus the front wheel brake would be controlled electrically, whereby of course not only the effect could be achieved as if only an additional cable would also go to the front wheel brake, but also improvements would be achieved can, for example, that the front wheel brake also adjusts disproportionately more braking effect when braking harder as required. With needs-based brake adjustment, of course, it can also be achieved that regenerative braking is controlled and, for example, driver actuation force is noticeable, but e.g. as much regenerative braking as possible takes place and as little energy as possible through friction braking get lost. The actuation of the friction brake and a brake that can be controlled by force measurement (e.g. regenerative brake) would therefore be essential. How exactly the distribution to the brakes takes place can be optimized in various ways. The location of the brakes is also arbitrary within a compound vehicle, i.e. also on the towing vehicle and trailer. Another combination would be that the same brake is actuated both electrically and mechanically (e.g. with cable pull). A kind of "servo brake" would be created in which the electrical actuation facilitates the non-electrical actuation, so that the driver can brake with (also significantly) less force than without this support, and the safety function can also exist so that if the electrical actuation fails, the non-electric remains available. Several brakes can also be operated from this stabilized dynamometer, even at different points in a compound vehicle.

In general, any additional sensors or pickups can be used, such as a switch, for example, which switches on a brake light or, for example, switches on the power supply of a brake actuator from a certain position. A brake cable can, for example, be connected to the lever with a cable connection 2016 (e.g. a standard nipple with an adjustment thread) directly or also via at least one intermediate lever 2017 (3 are shown, the one running downwards also having a rotating guide around the lower one, for example). Bearing point can take over to guide the lever combination). An advantageous embodiment is, for example, a bolt with clearance 2018, which can be used instead of the normal bolts pressed onto the end of the rope: Here, one end of a lever 2017 (e.g. a pull rod) or a rope goes through the bolt with play, only to Lever position to build up traction and before that to keep the lever free of cable or pull rod force and to keep the presented feeling of actuation free of the drag influence of the cable or pull rod. The cable or the lever (e.g. pull rod) can also be adjustable, indicated by a nut or other adjustment option in 2018. In particular with a multiple lever as an intermediate lever 2017, good guidance can influence the brake lever before the brake force is transmitted as little as possible to as good how to be completely avoided, which comes against a particularly good feeling of actuation. driver perception It is recommended (with your own brake lever but also when recording the actuation force, actuation path, pressure, etc. with at least one existing brake) to adapt the interaction of several behaviors to a pleasant feeling for the driver: Above all, the driver wants a pleasant feeling between lever travel (everything is related on a pedal), leverage and braking effect. A disproportionately increasing lever force is also recommended, so that, for example, less than half the maximum force occurs at half the lever travel. Against full braking, we recommend that the actuation force increases disproportionately to such an extent that you either do not get into a blocking even with the quick, usually unprepared application of the full brake, or even intentionally if the ABS is well suited for this, i.e. the ABS prevents blocking. The braking effect can, for example, be proportional to the feeling of force, but for the connection between braking force and braking effect, it can also be advisable to develop a less than proportional braking effect when the lever force (or lever travel) is still low, because, for example, careful braking on poor roads can be dosed more pleasantly. Particularly in the case of vehicles with large wheel load fluctuations, disproportionately careful braking in the weak braking range is also recommended, because, for example, on a bicycle without the rider's weight (or not at full), sensible braking behavior is also pleasant, and less of the stronger braking torque that would be needed with the rider's full weight. Appropriate trailer braking could be stronger, however, since the trailer could also be loaded or have an empty weight. In this way, you can prevent a trailer from pushing a lightly loaded bicycle or causing it to reverse if, for example, the driver has dismounted or does not have his full weight on the bike. In the case of non-linear EMBs in particular, the actuator can overcome the air gap very quickly and from then on, the braking effect can increase sharply at the beginning, because the actuator of a non-linear EMB can make a rapid feed movement with a low contact pressure. This behavior would be hidden or can be hidden from the driver because he only knows how the lever is actuated and the braking effect, but not the internal braking states. Even if an EMB can be controlled with good accuracy, i.e. the desired braking effect and the actual braking effect correspond well, a small accuracy error with a very low braking effect can be unpleasantly noticeable: If, for example, an unloaded bicycle reacts much too strongly to weak braking when pushed, or not yet although leverage is already occurring, this can be annoying, but hardly or not at all with normal weak braking with a load. As a solution, it is recommended to provide an initial range in the context of lever actuation to braking effect (lever or pedal characteristic) which, with a correspondingly weak braking request, also with tolerances (too much or too little actual braking effect), conveys the feeling of actuation that light braking corresponds to the wish follows, in which, for example, with a still small lever movement (or force) a particularly sensitive braking effect control is provided in the lever characteristic.

Simplification

Of course, the brake lever or the brake pedal 20 can also be greatly simplified (e.g. for reasons of cost) and a cable can be mounted directly in the lever 2002 and the lever can be a common part with the pickup 2007 and just a sensor for pickup 2008 or e.g. For example, leverage measurement 2013 must be present and all other spring effects that generate the actuating force are omitted if the actuating force comes from a pressure or power-actuated brake, for example. This means, for example, that an existing bicycle brake lever can be exchanged for a greatly simplified one as described, for example to obtain an electrical brake signal for a bicycle trailer, for example, possibly with an additional brake light switching function (which can also be derived from the sensor signal, for example). A fixed part 2019 (which can be the housing, for example, which can be attached to the vehicle or can be imagined as being connected to the housing) shows that spring effects or settings, for example, can act on it. The sensors or pickups are preferably operated in such a way that the measured value in the case of no error can be distinguished from a measured value in the event of an error or that errors can be determined by other values, such as current consumption. Several sensors can also be used for the same or similar measured variables, for example for reasons of security or availability. Other measured values can also use the installation option in the brake lever, such as those for e.g. temperature, brightness, camera, rain, etc. The brake lever can also be designed as a unit with something else, such as a common handlebar part, common carrier for e.g. handle, telephone, speedometer, mirrors etc. and he can also add additional ones Have connection options, such as USB, electricity or wireless communication such as Bluetooth, infrared, radio.

Implementation Option

FIG. 11 shows a possible implementation of the components shown for a vehicle or a combination vehicle (e.g. towing vehicle with trailer).

In general, at least one controllable torque 2201 (here a controllable braking effect is to be understood in a broader sense), e.g. an EMB or e.g. a combination of EMB with also regenerative braking (e.g. an electric motor in motor or generator operation) of at least one Vehicle dynamics control 10 (which controls the behavior of the vehicle, for example, a part of the brakes, regenerative braking, the interaction of brakes and drive, etc.) controlled or regulated. The driving dynamics control 10 receives signals 101 in the electronics, e.g. from at least one sensor 2202, e.g. i.e. e.g. wheel speed, as well as possibly those that can come from the driver, e.g. from a driver input 2203 (i.e. e.g. at least one cable sensor like FIG. 10 or a brake lever like FIG. 9). The vehicle dynamics control 10 may also send signals 102 from the electronics, which can be output or displayed, for example, at an output 2204 (e.g. a mobile phone can display data from the brakes, such as braking torque, temperature, or emit warning tones. However, inputs can also to e.g. the vehicle dynamics control 10, such as the desired strength of the braking or e.g. the correction value k for an initially explained "braking from deceleration measurement").

An arrangement as in FIG. 11 or with the same effect can also be added to an existing electrically actuated brake by adding or subtracting the mean control variable to the existing brake signal (control variables such as current, voltage, PWM, control signal), i.e. adding a PWM pulse, for example (e.g. for more braking effect) or e.g. PWM pulses removed (e.g. for e.g. less braking effect) in order to achieve an improvement, such as enabling or improving ABS, ESC, sway control or, for example, improving the accuracy of the braking effect. signal transmission It is recommended that improvements are added to the basic principle from FIG. 11 or FIG. 12 individually, jointly or partially. The signals into the electronics 101 or signals from the electronics 102 can be both bidirectional and unidirectional, they can take place using the same medium (e.g. CAN bus, radio) or a different one and they can also contain other information, such as brake lights, drive requirements (e.g. gas position), temperatures. Furthermore, it is also recommended that, if necessary, faults or failures are dealt with in an orderly manner, i.e. e.g. detections are provided for them or alternatives. If, for example, a driver brake signal from 2203 does not arrive or does not arrive in an acceptable manner, braking from a deceleration sensor 2202 is operated, for example, or non-electrical actuation is used, for example.

It is also recommended to allow or strive for partial implementations of the concept according to FIG. For example, a controllable braking effect or a controllable moment 2201 (e.g. EMB and/or regenerative braking, e.g. on a trailer) could be formed locally on a trailer without the need or availability of facilities on the towing vehicle by using data available locally on the trailer is worked. For example, braking can be controlled with a deceleration sensor, e.g. In an improvement, e.g. a cable pull sensor could be added with a function similar to that in FIG.

Furthermore, it is recommended that the driving dynamics control 10 be designed specifically for the properties of the sensors 2202, if necessary. For example, it can be taken into account that a land force signal from driver input 2203 has a time behavior and/or a temperature behavior. This behavior can be compensated and/or a reaction can be made to changes in the sense that, for example, slow changes in the time behavior of the sensor are filtered out or suppressed, while faster changes are interpreted as the driver's request. That can also be combined with other things, such as the "braking from deceleration measurement" mentioned at the beginning, so that a rapidly occurring driver braking request (e.g. at a driver input 2203), an activated or suddenly activated brake light, a change in a throttle lever position, etc. causes a rapid change in a braking torque causes, while e.g. "braking from deceleration measurement" takes over the longer term, i.e. from roughly a few seconds to several minutes, the more precise or, whatever, better braking effect setting. Another such "better" braking effect setting can also be derived from other measurements, even if these are not suitable for short-term braking effect setting. For example, the change in the wheel speed and the deceleration or force component in the direction of travel can contribute to determining a gradient and thus to an improvement, as can the position of the earth's magnetic field, for example. Further data can or should be included, such as an axle load estimate.

As an advantageous modification of the principle according to FIG) is controlled (e.g. via pressure, force, travel) to increase (possibly down to a negative impact force) or weaken (possibly to 0) in such a way that braking is "better" than with uncontrolled non-electrical actuation. The control effect can be achieved using different methods, such as friction, locking, electric actuators (also in combination), whereby the methods used can directly actuate one or more brakes and/or can act indirectly via the non-electrical power flow. If the "control" or an electrical component (control 10, actuator, etc.) malfunctions, a suitable device (e.g. by means of spring force) can ensure that the non-electrical actuation acts as uncontrolled, at least sufficiently.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A method for braking a towed vehicle connected to a towing vehicle, wherein the towed vehicle comprises at least one wheel, a first braking device for braking the at least one wheel, in particular a non-linear electro-mechanical friction brake, a detection device for detecting braking of the towed vehicle, and a brake control device for controlling the first braking device, wherein the brake detection device is one of a speed measuring device for calculating a deceleration from the changing instantaneous speed of the towed vehicle and/or a deceleration sensor for measuring a deceleration, the method comprising:

the brake detection device converting the detected braking into a brake detection signal, transmitting the brake detection signal to the brake control device, wherein a brake actuation signal is generated by the brake control device in response to the brake detection signal by determining a brake actuation signal for actuation of the first brake device based on the brake detection signal using interpolation tables, using conversion functions, and/or using a simulation model, wherein the brake actuation signal is transmitted from the brake control device to the first braking device for controlling the first braking device, and wherein the brake detection device and the at least one wheel, which can be braked by the brake control device and/or the first brake device, are arranged on the towed vehicle.

2. The method according to claim 1, wherein an actuation device for actuating a brake device is arranged on the towed vehicle, wherein an actuation measuring device is arranged to measure an actuation of the actuation device, wherein the brake control device and the at least one wheel are arranged on the towed vehicle, wherein the deceleration sensor and the at least one wheel are arranged on the towed vehicle, wherein the wheel speed sensor and the at least one wheel are arranged on the towed vehicle.

3. The method according to claim 2, wherein the towing vehicle has at least a second braking device, in particular a non-linear electro-mechanical friction brake, for braking the towing vehicle, whereby the at least one second braking device can be actuated independently of the first braking device, wherein there is at least one more brake detection device on the towing vehicle for detecting braking of the towing vehicle and the at least one more brake detection device, is independent of the first brake detection device, wherein braking is detected by the further brake detection device and further brake detection signal is generated, and wherein the further brake detection signal is transmitted to the brake control device, wherein the brake control device detects which brake detection devices are present on the towing vehicle, wherein the transmitted brake detection signals are taken into account by the brake control device when generating the brake actuation signal by weighting the brake detection signals according to predefined parameters.

4. The method according to claim 1, wherein a brake actuation signal is generated by the brake control device, through which a predefined behavior of the towing vehicle and the towed vehicle is set relative to one another so that the towed vehicle generates a pushing or pulling force on the towing vehicle, whereby the brake control device sets a different braking effect of the braking device arranged on the towed vehicle than on the towing vehicle, wherein the brake control device generates a brake actuation signal, through which a predefined behavior of the towing vehicle and the towed vehicle relative to one another is set, so that the towed vehicle generates a pushing or pulling force on the towing vehicle part, whereby the brake control device sets a different braking effect of the braking device arranged on the towed vehicle part than on the towing vehicle part, wherein the force between the towing vehicle and the towed vehicle is measured by a sensor, whereby the measured force is taken into account by the brake control device when generating the brake actuation signal.

5. The method according to claim 1, wherein the towing vehicle is designed for local to regional traffic with a planned operating radius of a maximum of 100 kilometers, wherein the towing vehicle is an electric passenger bike, a cargo bike, a small electric vehicle, or a logistics vehicle, wherein the brake control device is set up to operate the towing vehicle to control a drive motor of the towing vehicle and/or the braking device, so that a predefined speed is maintained, and wherein the towing vehicle is a multi-standard vehicle and/or a multi-standard composite vehicle, which means that the towing vehicle can be operated in the city as a bicycle and/or e-bike and outside the city as a motor vehicle, motorcycle, passenger car and/or truck.

6. The method according to claim 1, wherein the brake control device detects an interruption in the connection between the towing vehicle and the brake control device, and if an interruption is detected, the interruption is taken into account by the brake control device when generating the brake actuation signal by generating the brake actuation signal on the basis of the deceleration measured by the deceleration sensor or the wheel speed measured by the wheel speed sensor.

7. The method according to claim 1, wherein the brake detection signal, the further brake detection signal, a vibration sensor signal, an angle sensor signal, a position sensor signal, a locking signal, the location of the towed vehicle, a pedal vibration sensor signal and/or an impact force signal is an input variable of a simulation model, and the brake actuation signal and/or at least one variable for the brake device is an output variable of the simulation model, the simulation model being carried out by the brake control device, wherein simulation calculations are carried out in the brake control device and/or in advance outside the towed vehicle based on the brake detection signal, the further brake detection signal, the vibration sensor signal, the angle sensor signal, the position sensor signal, the locking signal, the location, the pedal vibration sensor signal and/or an impact force signal, wherein the results of the simulation calculations are taken into account by the brake control device when generating the brake actuation signal, so that a predefined state of the towed vehicle is reduced and/or avoided.

8. The method according to claim 1, wherein the brake control device carries out simulation calculations to calculate the rollover probability of the towed vehicle to prevent the towed vehicle from rolling over, whereby the towed vehicle acceleration, the braking deceleration, and/or the cornering acceleration of the towed vehicle are calculated in the simulation calculations, whereby the brake control device takes into account at least one wheel support force of the towed vehicle, determined directly or indirectly, in particular via deflection and/or rebound, in the simulation calculations, whereby the brake control device recognizes a movement, rotation, or change in the determined wheel support force as a rollover that has already begun or is in progress and is used to prevent a rollover, and wherein based on the simulation calculations for rollover prevention, the braking device of the towed vehicle, the drive of the towed vehicle, the steering of the towing vehicle, and/or the control of the towing vehicle are operated in such a way that a rollover of the towed vehicle is reduced and/or prevented, by reducing the brake actuation signal for tightening the braking device of the at least one wheel the brake control device as the probability of rollover increases, so that the braking effect of the braking device can be increased more slowly.

9. The method according to claim 1, wherein when the brake actuation signal is generated by the brake control device, further braking effects of the towing vehicle such as the driving resistance, the flow resistance, a regenerative braking effect of an electric drive, and/or the braking effect of other braking devices, are taken into account by subtracting these further braking effects from the brake actuation signal so that the brake actuation signal is reduced.

10. The method according to claim 1, wherein the towed vehicle comprises at least one power generation device, wherein the power generating device optionally includes a rechargeable battery, a battery, a photovoltaic module, and/or a wheel hub dynamo, wherein the braking system of the towed vehicle, in particular the first braking device, the brake detection device, and the brake control device, can be operated by the at least one power generating device, whereby an actuation predetermined by the brake actuation signal of the brake control device is achieved when the energy supply from other towed vehicle parts fails and/or is interrupted.

11. The method according to claim 1, wherein the towed vehicle comprises at least one drive motor, wherein the at least one drive motor is regulated and controlled by the brake control device, wherein the drive motor is controlled and/or regulated by the brake control device taking into account the brake actuation signal, whereby the brake actuation signal is optionally adapted by the brake control device to the driving conditions, such as an incline of the road, a load of the towed vehicle, a speed of the towed vehicle, and/or the energy consumption of the brake system, in such a way that a braking effect is generated by regenerative braking with the drive device, so that the braking energy is stored and/or a conversion of energy into heat is avoided and/or prevented, and wherein the brake actuation signal is optionally adjusted by the brake control device in such a way that conditions of the braking device are avoided and/or prevented in which electrical drive energy is simultaneously supplied and frictional heat is generated by braking.

12. A towed vehicle comprising:
at least one wheel,
a first braking device for braking the at least one wheel, in particular a non-linear electro-mechanical friction brake,
a brake detection device for detecting braking of the towed vehicle, and
a brake control device for controlling the first braking device,
whereby the brake detection device is formed from a speed measurement device for calculating a deceleration from the changing instantaneous speed of the towed vehicle, and/or from a deceleration sensor for measuring a deceleration, in particular for measuring a deceleration effect in at least one direction, preferably in the direction of travel, preferably a multi-axis, micro-electro-mechanical system, and
wherein the brake detection device and the at least one wheel, which can be braked by the brake control device and/or the first brake device, are arranged on the towed vehicle.

13. The towed vehicle according to claim 12, wherein the brake detection device converts the detected braking into a brake detection signal and transmits it to the brake control device via a wired or wireless connection device, wherein the brake control device generates a brake actuation signal in response to the brake detection signal, whereby a brake actuation signal for actuating the at least one first brake device can be determined based on the brake detection signal using interpolation tables, using conversion functions and/or using a simulation model, wherein the brake control device transmits the brake actuation signal to the first brake device for controlling the first brake device, whereby a control, in particular an actuation, preferably a tightening and/or a loosening, of the first braking device and thereby braking of the at least one wheel can be achieved.

14. The method according to claim 1, wherein the brake actuation signal generated by the brake control device is determined by the brake control device setting a braking effect where escalating braking is avoided.

* * * * *